(12) United States Patent
Wang et al.

(10) Patent No.: US 10,952,248 B2
(45) Date of Patent: Mar. 16, 2021

(54) METHOD AND USER EQUIPMENT FOR TRANSMITTING AND RECEIVING SIGNALS

(71) Applicant: Samsung Electronics Co., Ltd., Gyeonggi-do (KR)

(72) Inventors: Yi Wang, Beijing (CN); Shichang Zhang, Beijing (CN); Yingyang Li, Beijing (CN)

(73) Assignee: Samsung Electronics Co, Ltd

( * ) Notice: Subject to any disclaimer, the term of this patent is extended or adjusted under 35 U.S.C. 154(b) by 0 days.

(21) Appl. No.: 16/075,035

(22) PCT Filed: Feb. 1, 2017

(86) PCT No.: PCT/KR2017/001069
§ 371 (c)(1),
(2) Date: Aug. 2, 2018

(87) PCT Pub. No.: WO2017/135668
PCT Pub. Date: Aug. 10, 2017

(65) Prior Publication Data
US 2019/0045544 A1   Feb. 7, 2019

(30) Foreign Application Priority Data

Feb. 2, 2016 (CN) .......................... 201610073518.7
May 25, 2016 (CN) .......................... 201610353893.7

(51) Int. Cl.
*H04W 74/08*  (2009.01)
*H04L 25/02*  (2006.01)
(Continued)

(52) U.S. Cl.
CPC ....... *H04W 74/0808* (2013.01); *H04L 5/0007* (2013.01); *H04L 5/0048* (2013.01);
(Continued)

(58) Field of Classification Search
None
See application file for complete search history.

(56) References Cited

U.S. PATENT DOCUMENTS

2010/0067472 A1    3/2010  Ball et al.
2010/0273494 A1*  10/2010  Iwai ..................... H04L 5/0007
                                                      455/450
(Continued)

FOREIGN PATENT DOCUMENTS

CN        102655680        9/2012
CN        103428868       12/2013
(Continued)

OTHER PUBLICATIONS

PCT/ISA/210 Search Report issued on PCT/KR2017/001069 (pp. 3).
(Continued)

*Primary Examiner* — Christine T Duong
(74) *Attorney, Agent, or Firm* — The Farrell Law Firm, P.C.

(57) ABSTRACT

Provided are a method for receiving, by a terminal, a scheduling signaling transmitted by a transmitting node; then, deciding, by the terminal, whether a gap is to be reserved between an uplink signal symbol and an uplink physical channel symbol, and determining a time-frequency resource mapping of an uplink signal and/or an uplink physical channel; or, deciding, by the terminal, whether a predefined signal is to be transmitted on a predefined time-frequency resource within an uplink signal symbol, and determining a time-frequency resource mapping of an uplink signal and/or an uplink physical channel; transmitting, by the terminal, the uplink physical channel and/or the uplink signal, or quitting scheduling and transmitting the uplink physical channel and/or the uplink signal. Thus, when an uplink signal is transmitted on the basis of an LBT, mutual (Continued)

hindrance between an uplink physical channel and an uplink detection signal is effectively reduced.

8 Claims, 34 Drawing Sheets

(51) Int. Cl.
  *H04L 5/00* (2006.01)
  *H04W 72/14* (2009.01)
  *H04W 16/14* (2009.01)
  *H04W 72/12* (2009.01)
  *H04L 27/26* (2006.01)

(52) U.S. Cl.
  CPC ........ *H04L 5/0094* (2013.01); *H04L 25/0224* (2013.01); *H04L 27/2602* (2013.01); *H04W 16/14* (2013.01); *H04W 72/1289* (2013.01); *H04W 72/14* (2013.01); *H04L 5/0044* (2013.01); *H04L 5/0051* (2013.01)

(56) References Cited

U.S. PATENT DOCUMENTS

| | | | | |
|---|---|---|---|---|
| 2011/0306335 A1* | 12/2011 | Yang | .................... | H04L 5/0051 455/422.1 |
| 2013/0324112 A1 | 12/2013 | Jechoux et al. | | |
| 2014/0016620 A1* | 1/2014 | Singh | ................. | H04W 56/0005 370/336 |
| 2015/0043465 A1* | 2/2015 | Ouchi | ................... | H04W 72/12 370/329 |
| 2015/0072720 A1 | 3/2015 | Kim et al. | | |
| 2015/0098369 A1 | 4/2015 | Song et al. | | |
| 2015/0124667 A1 | 5/2015 | Yang et al. | | |
| 2017/0222776 A1* | 8/2017 | Dinan | ................... | H04L 1/0004 |
| 2017/0325215 A1* | 11/2017 | Takeda | ................. | H04W 74/08 |

FOREIGN PATENT DOCUMENTS

| | | |
|---|---|---|
| CN | 104488213 | 4/2015 |
| WO | WO 2013/168901 | 11/2013 |

OTHER PUBLICATIONS

PCT/ISA/237 Written Opinion issued on PCT/KR2017/001069 (pp. 6).

Chinese Office Action dated Sep. 24, 2020 issued in counterpart application No. 201610353893.7, 15 pages.

* cited by examiner

[Fig. 1]
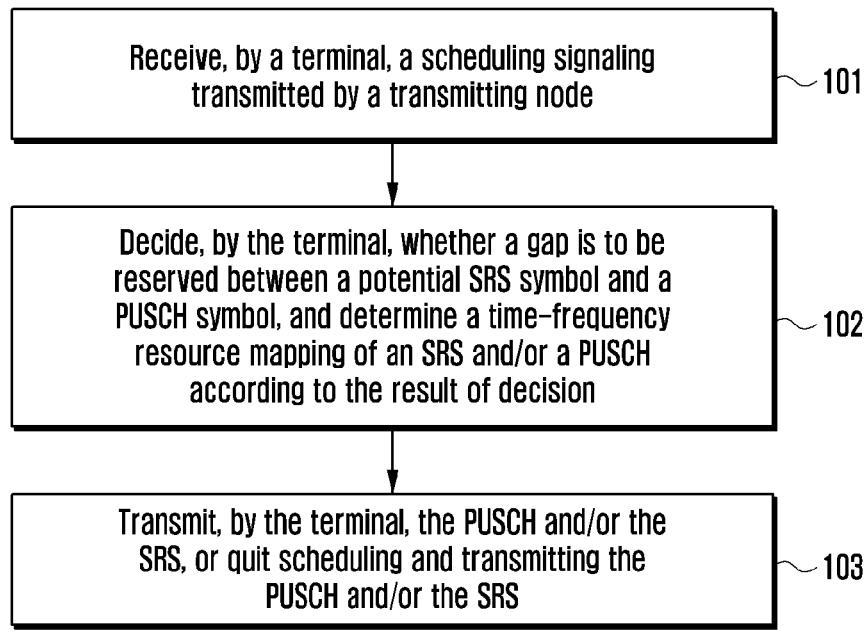
[Fig. 2]
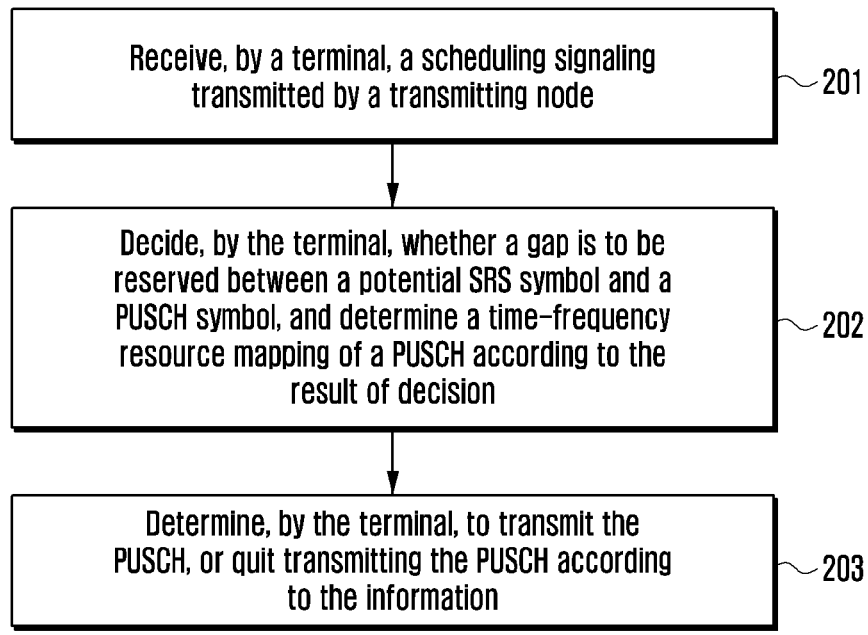

[Fig. 3]
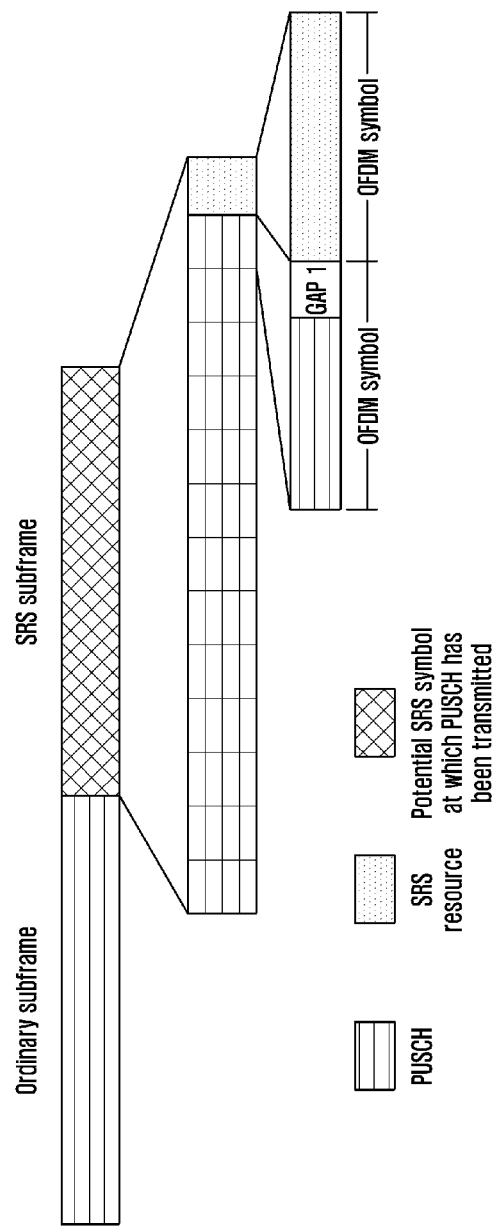

[Fig. 4]
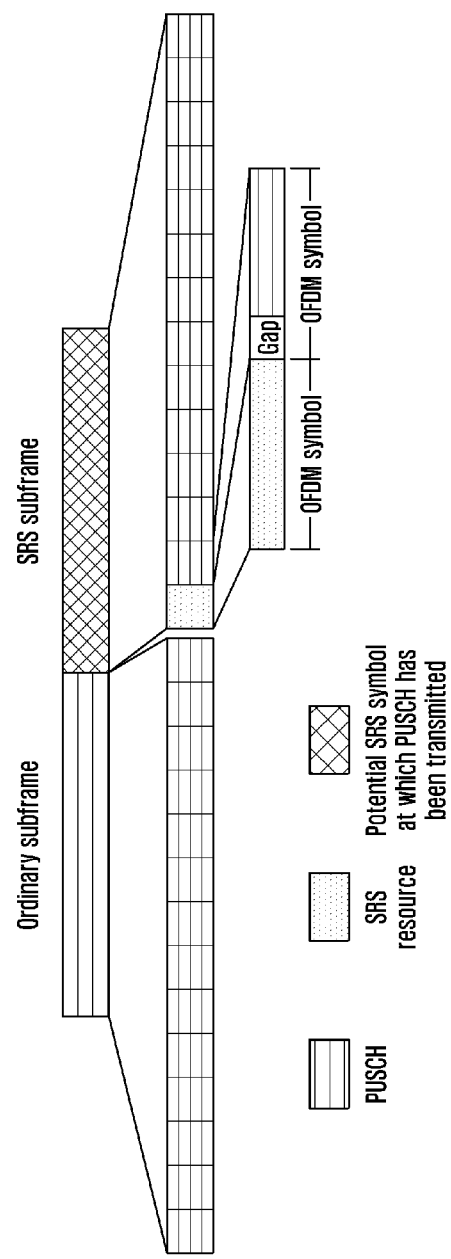

[Fig. 5]
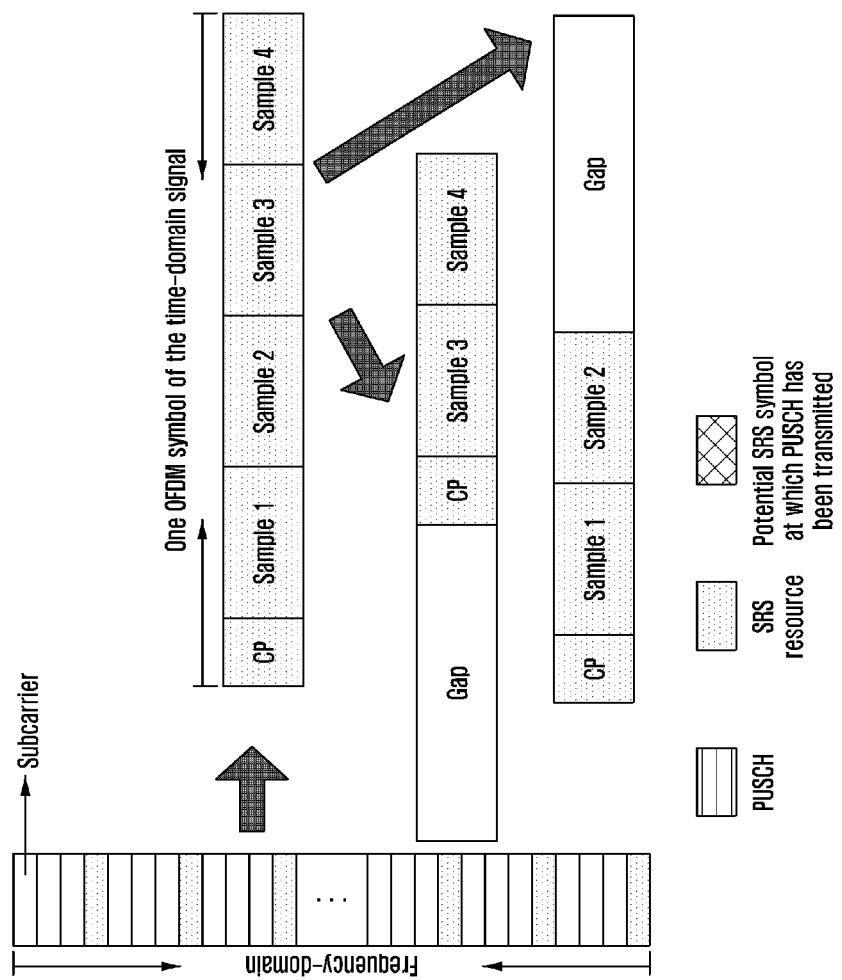

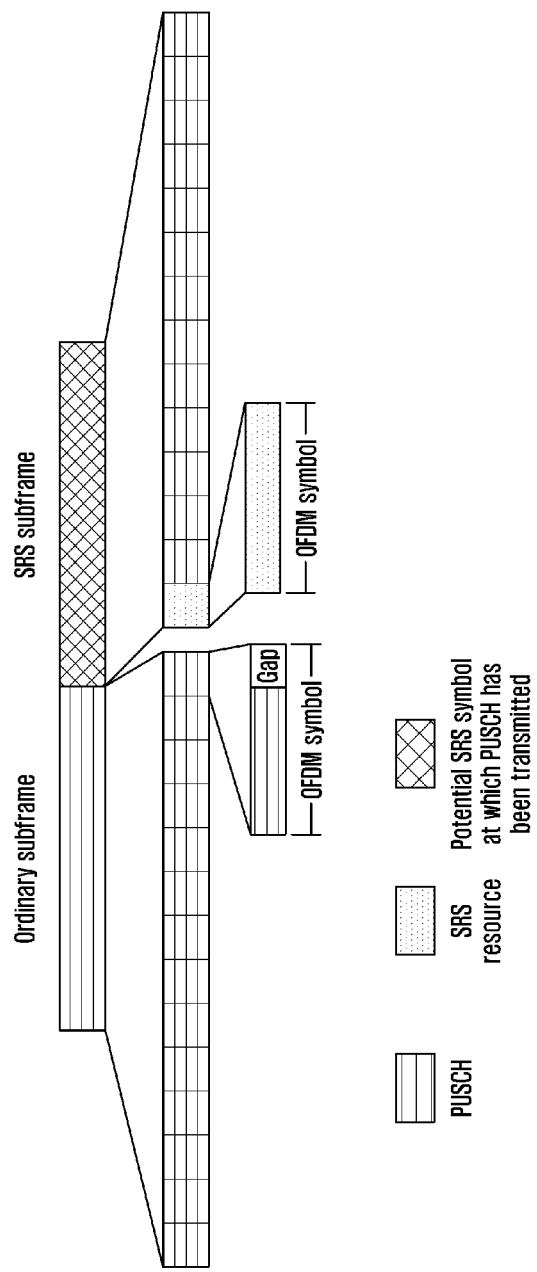
[Fig. 6]

[Fig. 7]
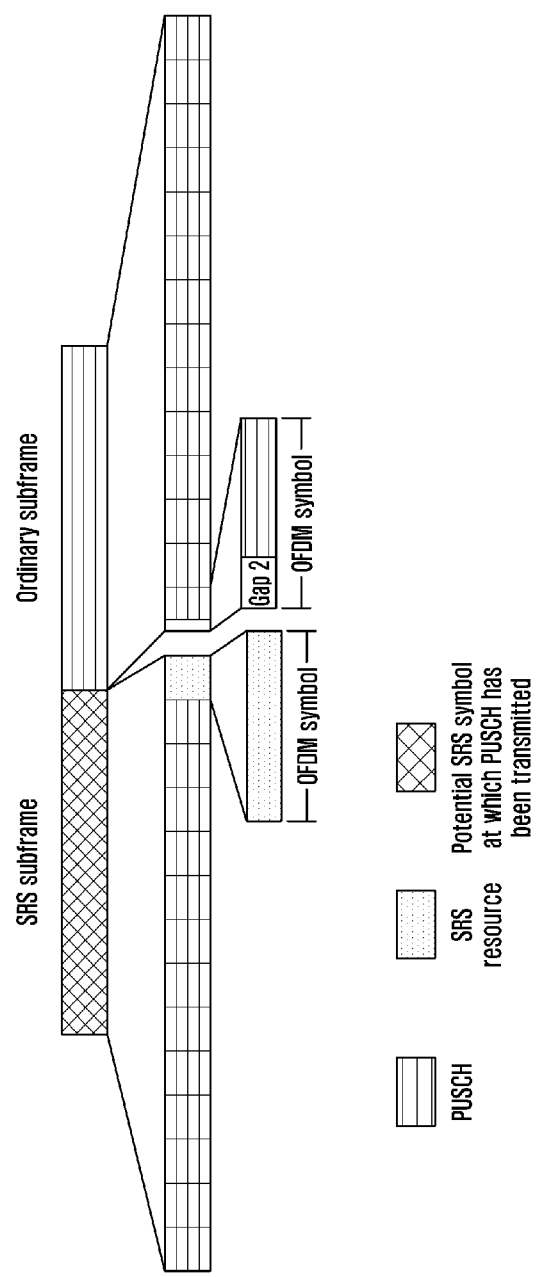

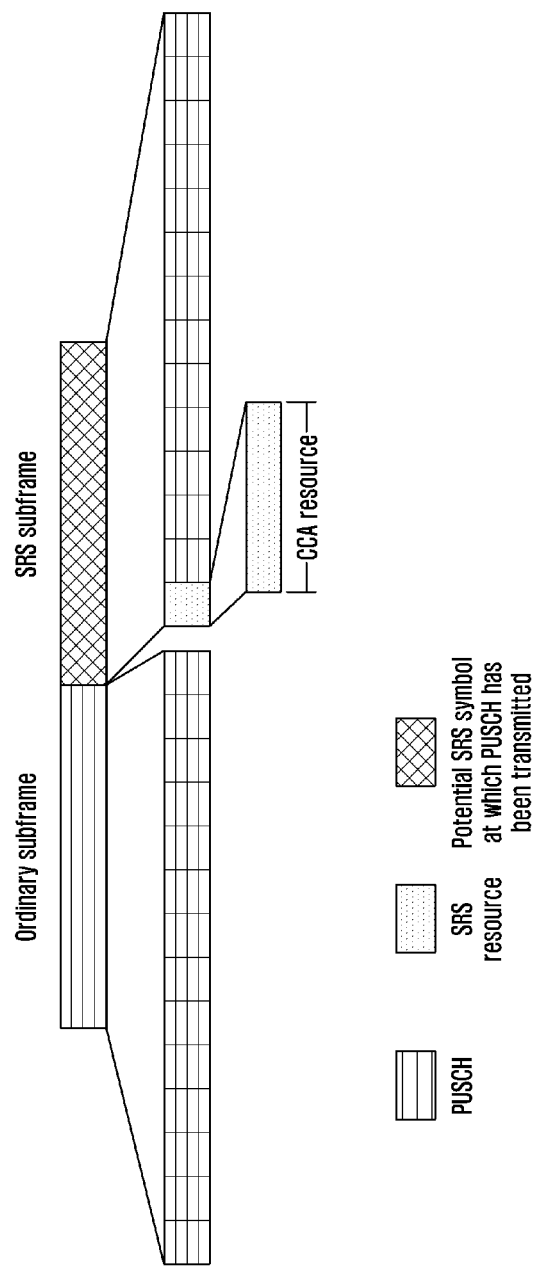
[Fig. 8]

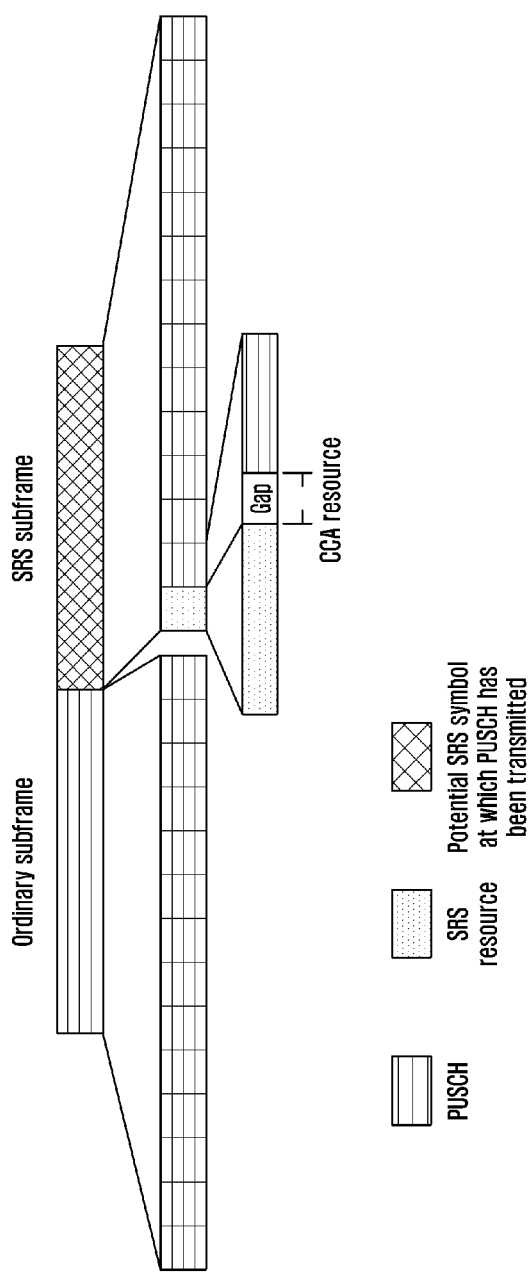

[Fig. 10]
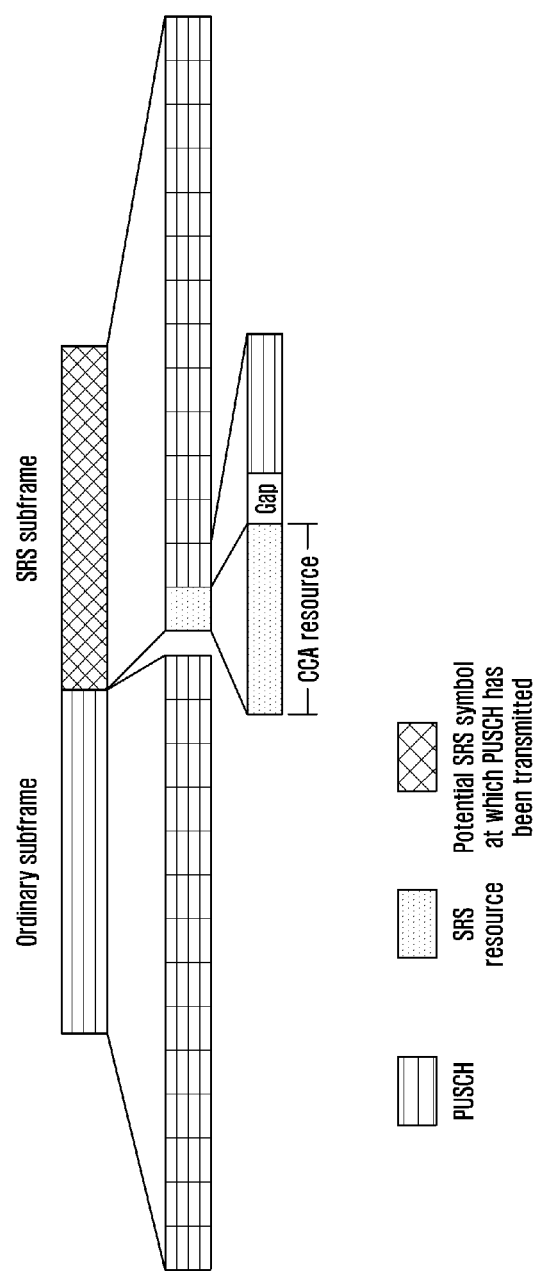

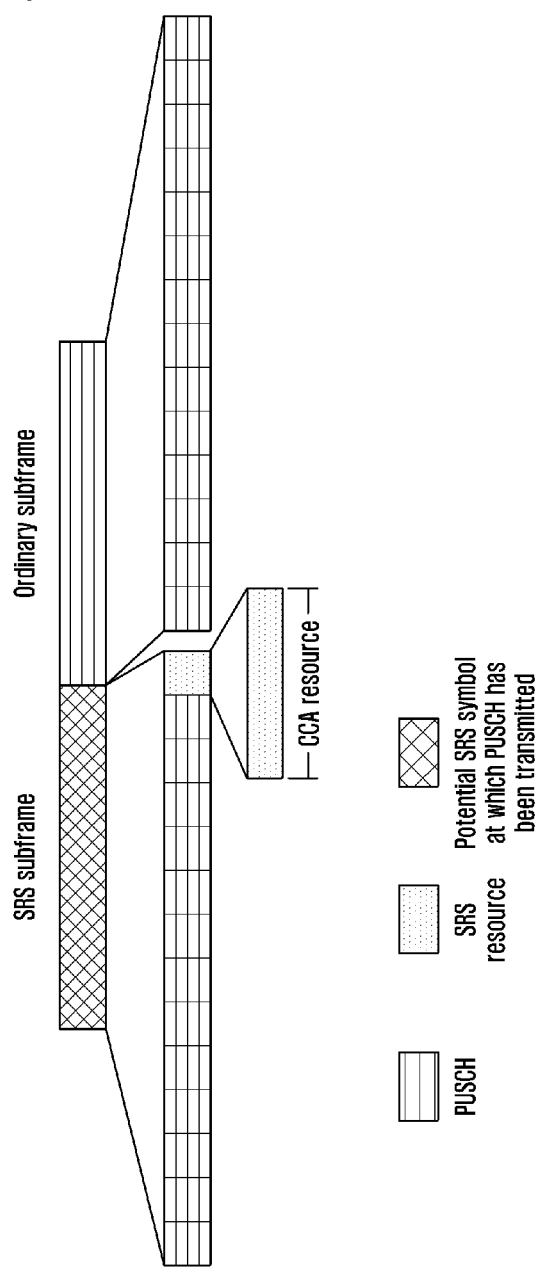
[Fig. 11]

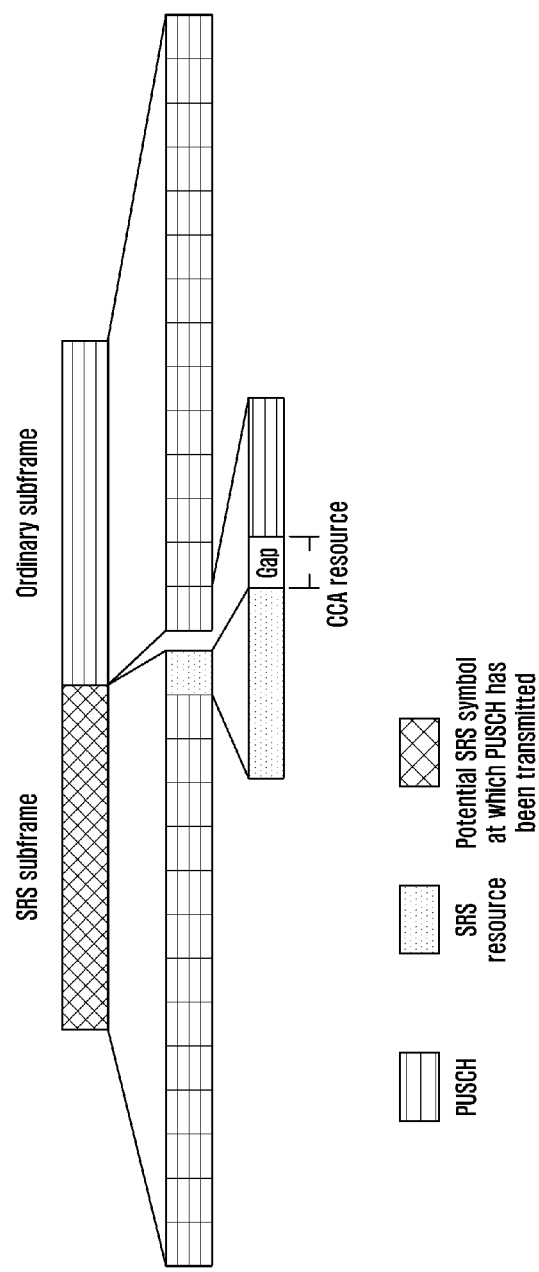
[Fig. 12]

[Fig. 13]
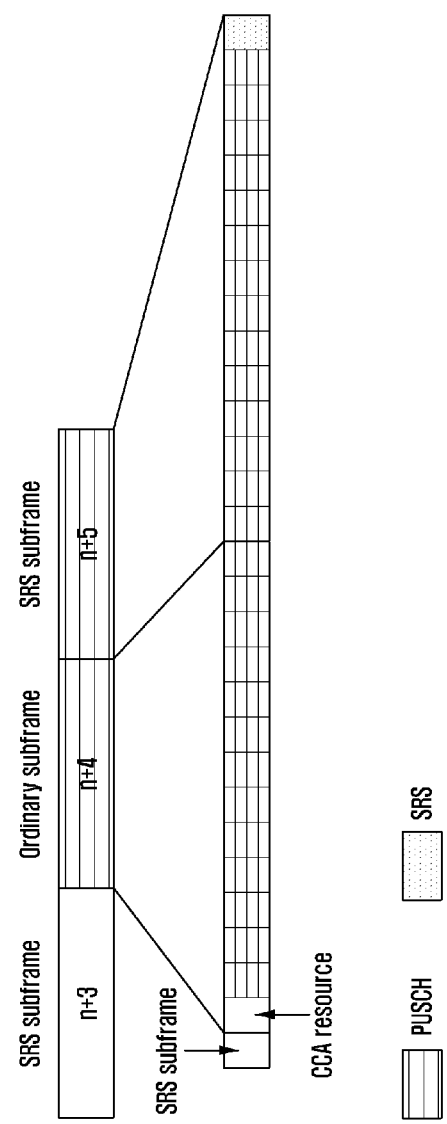

[Fig. 14]
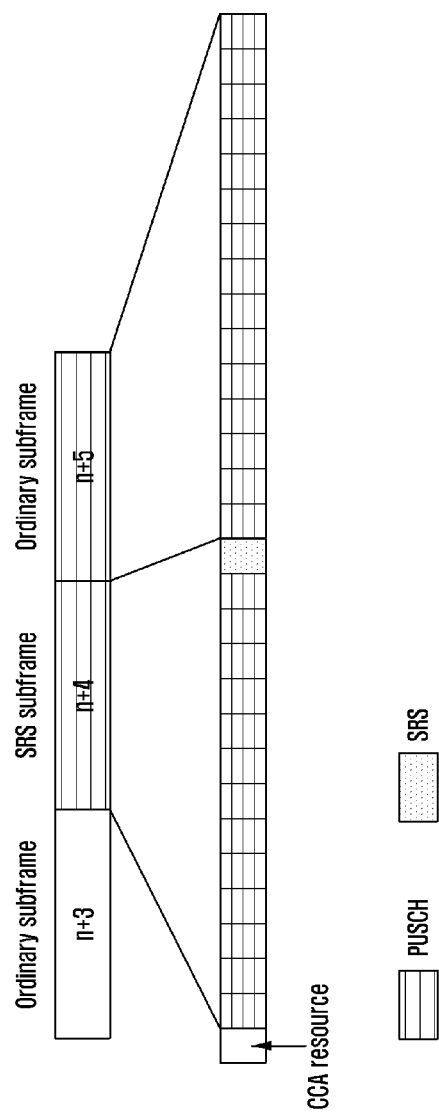

[Fig. 15]
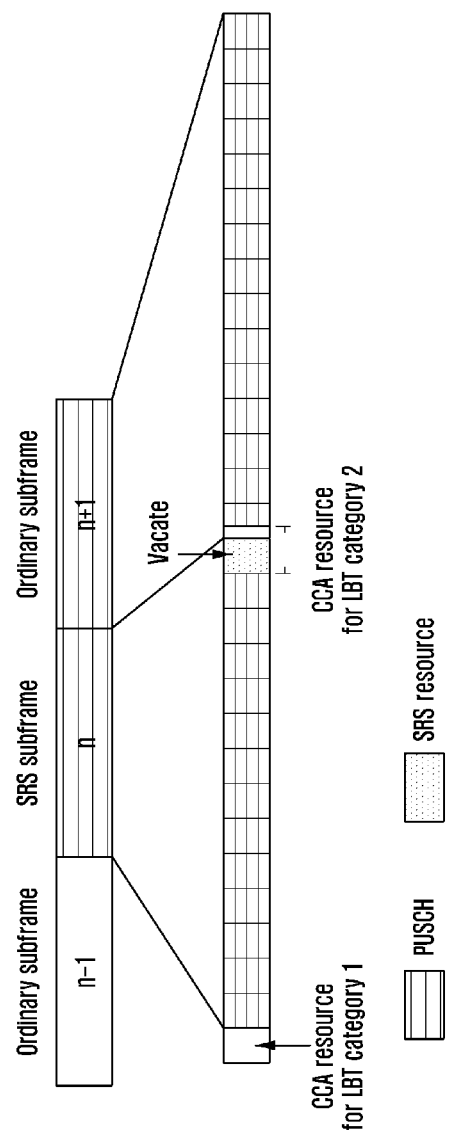

[Fig. 16]
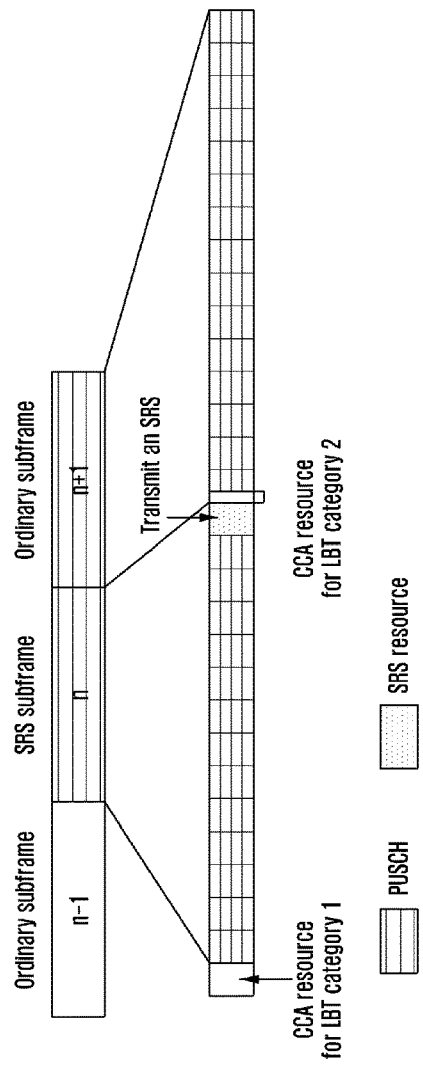
[Fig. 17]
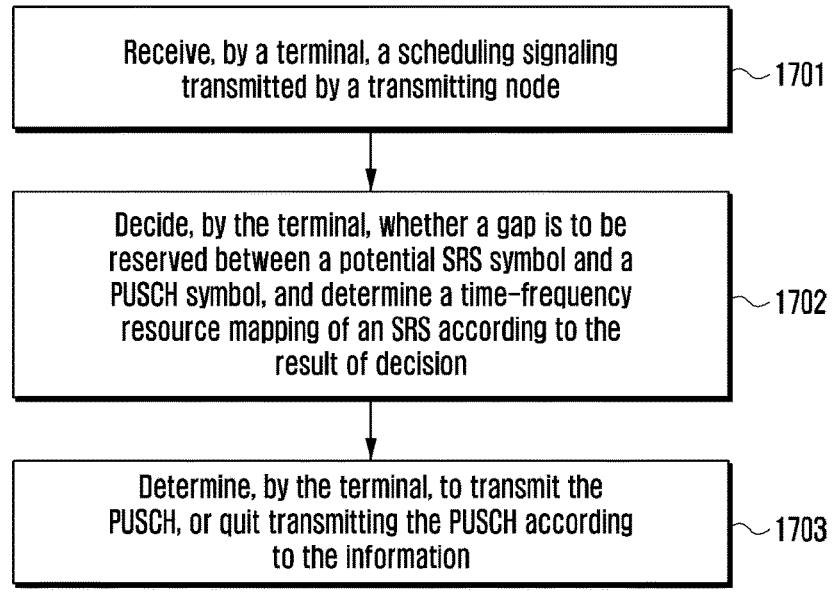

[Fig. 18]
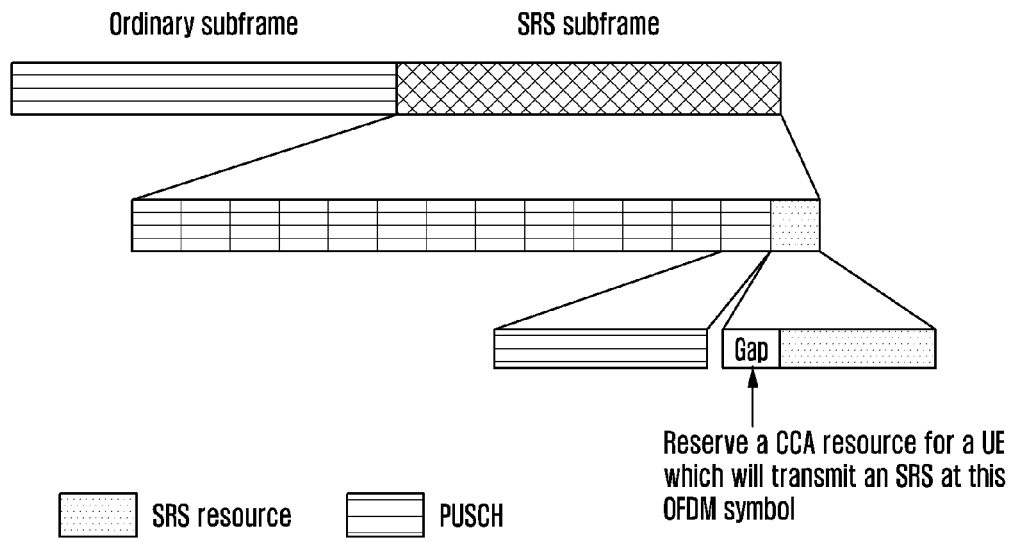
[Fig. 19]
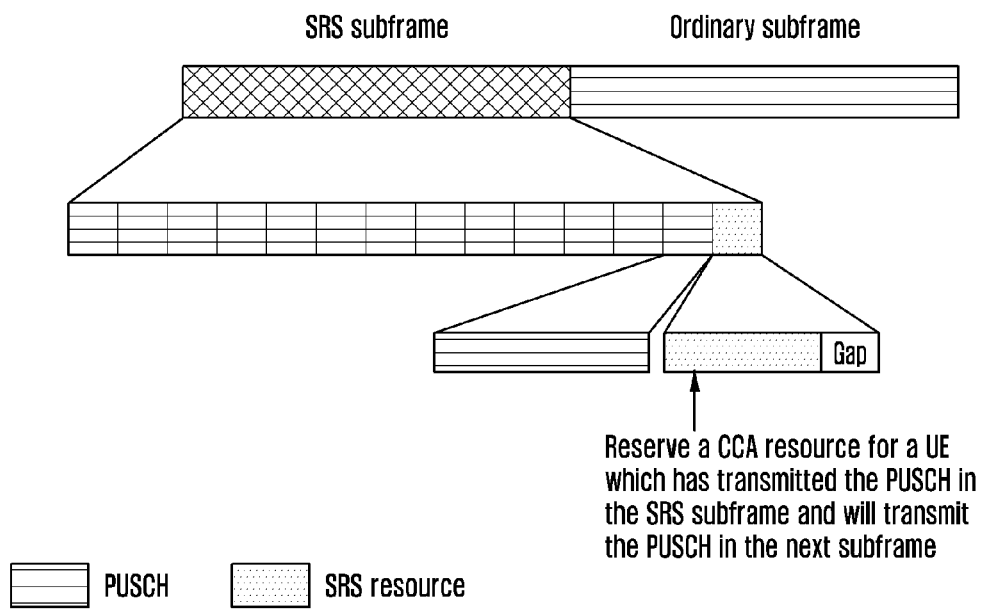

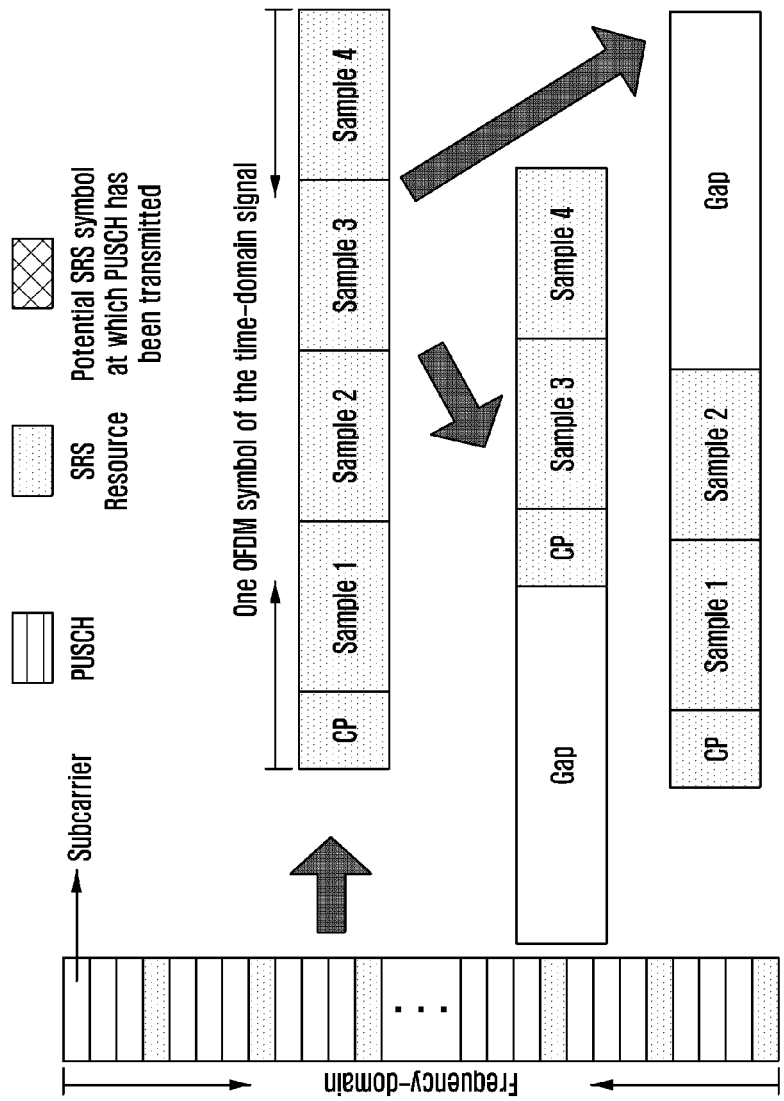
[Fig. 20]

[Fig. 21]
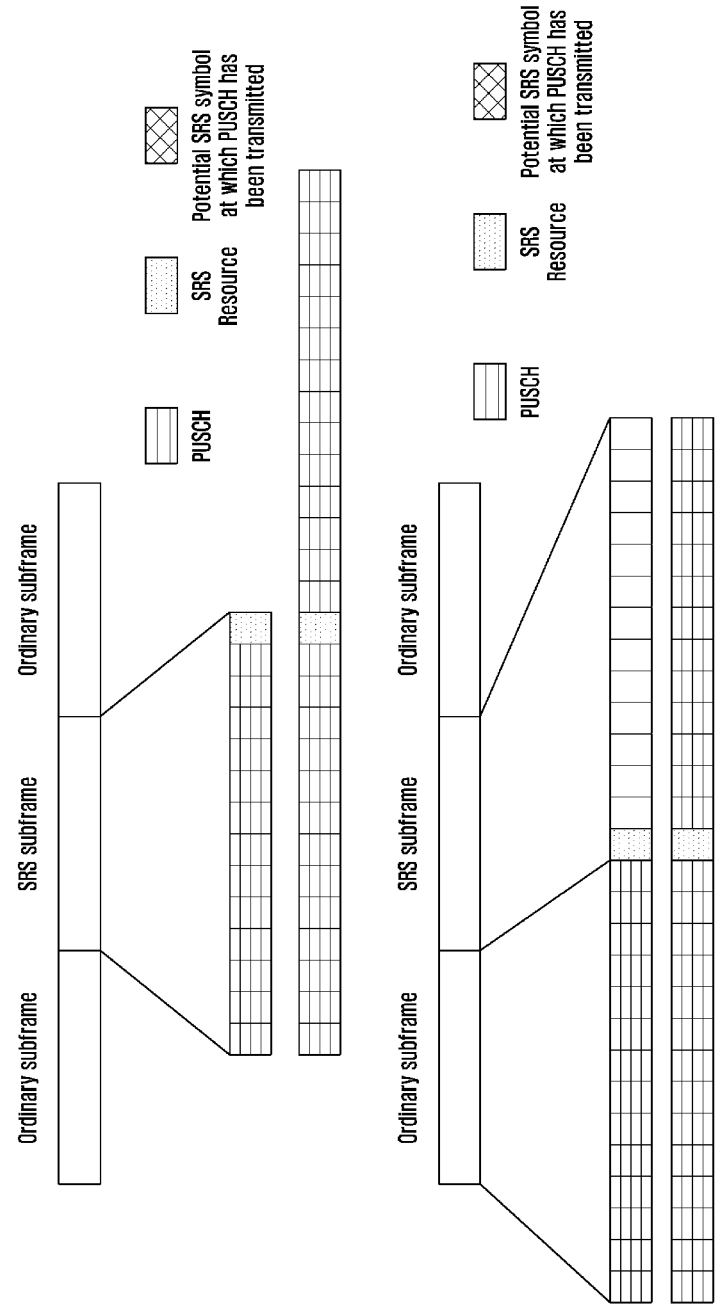

[Fig. 22]
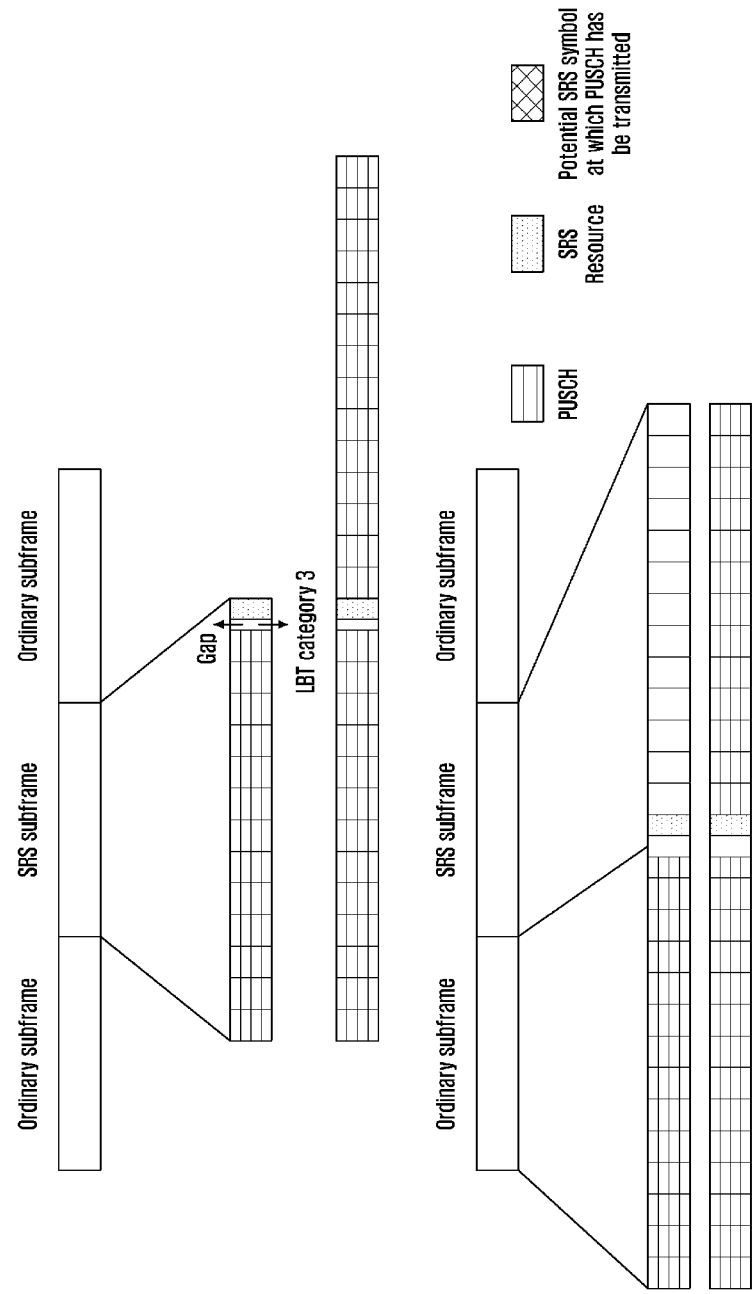

[Fig. 23]
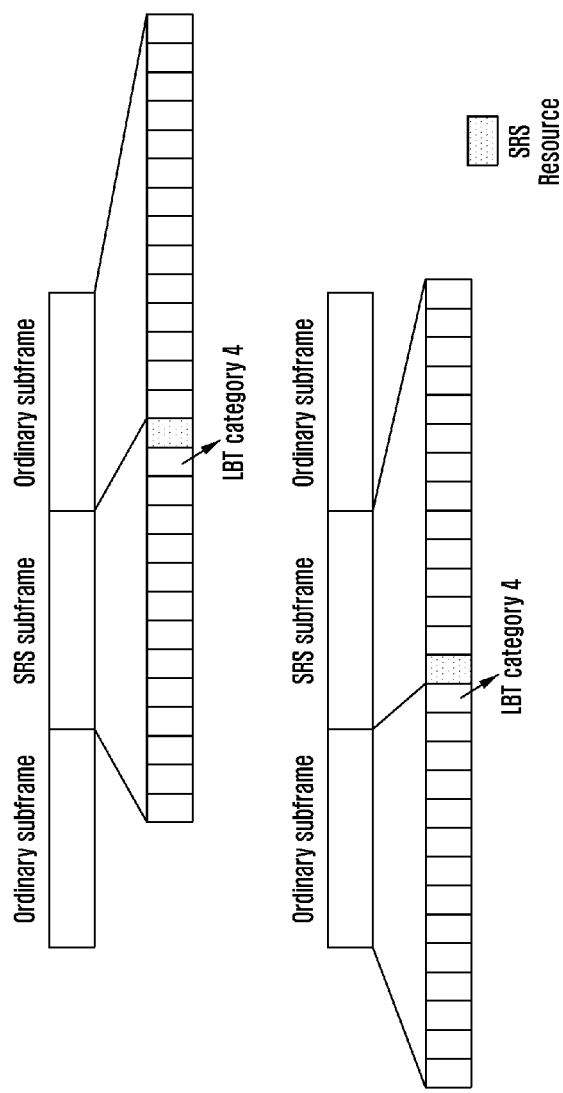

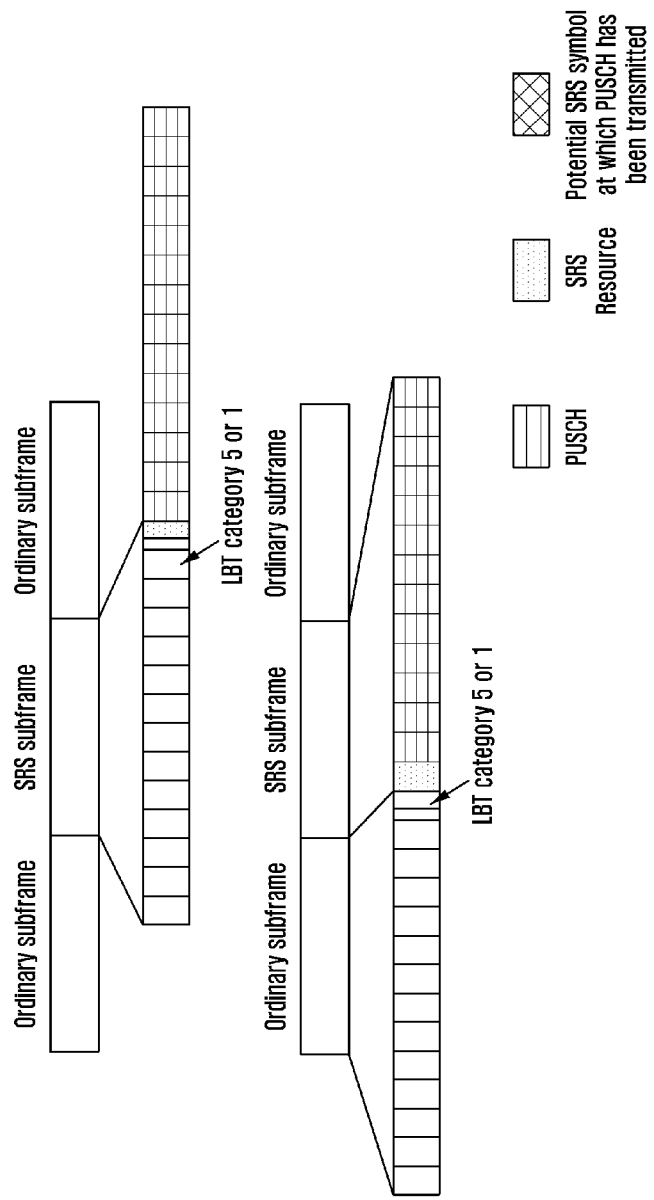
[Fig. 24]

[Fig. 25]
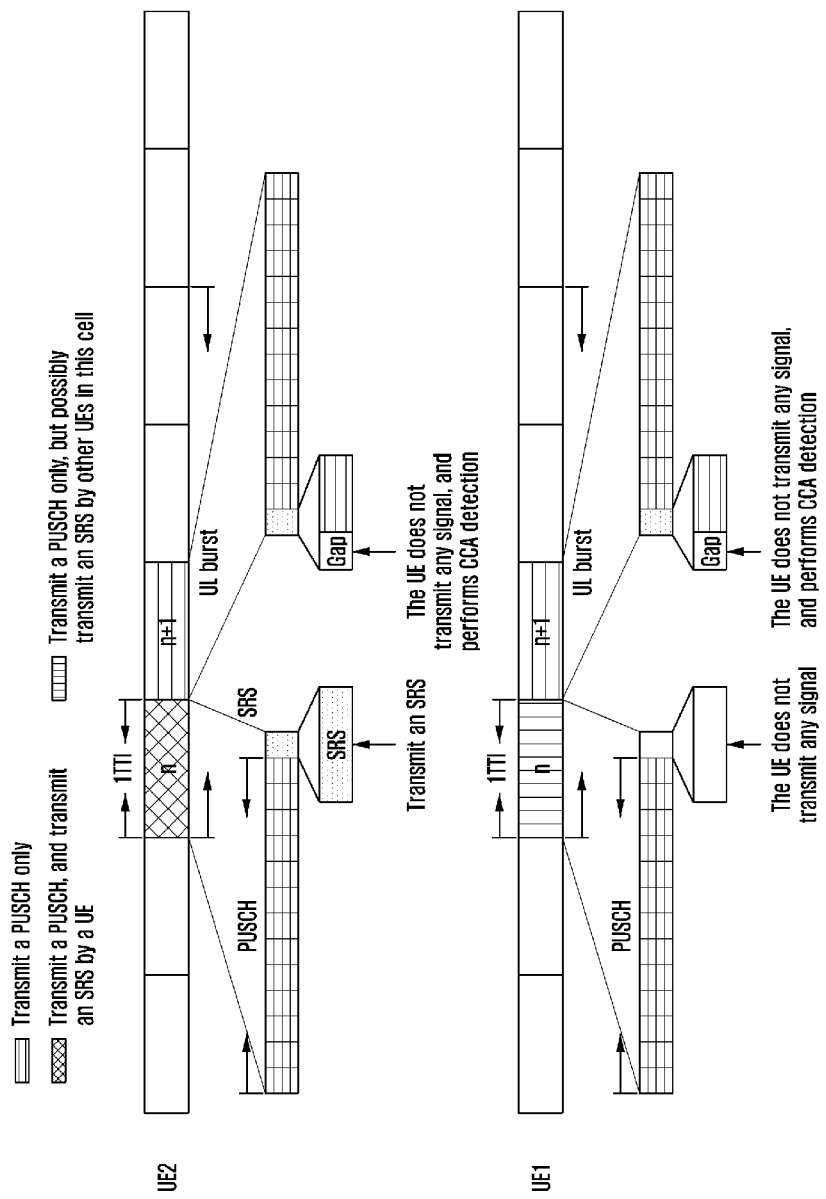

[Fig. 26]
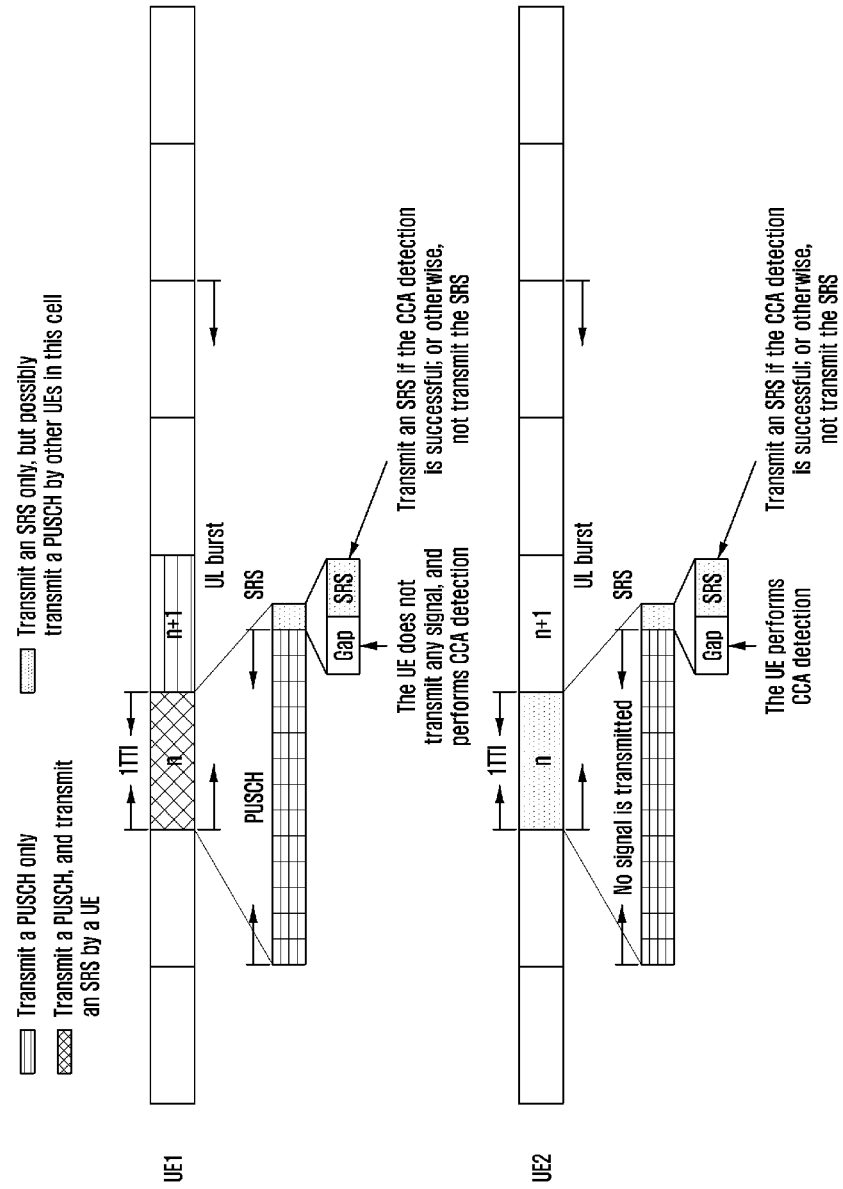

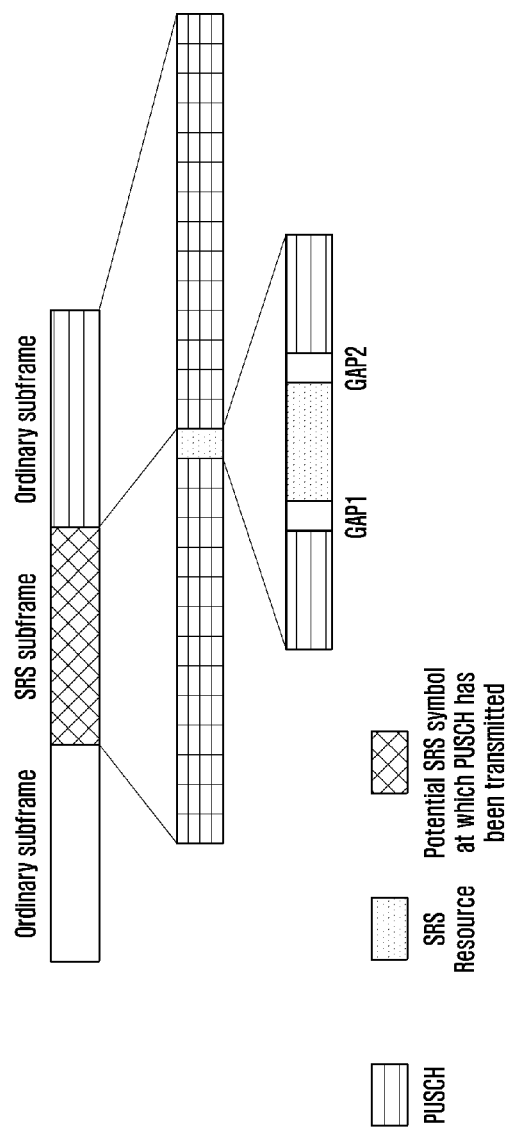
[Fig. 27]

[Fig. 28]
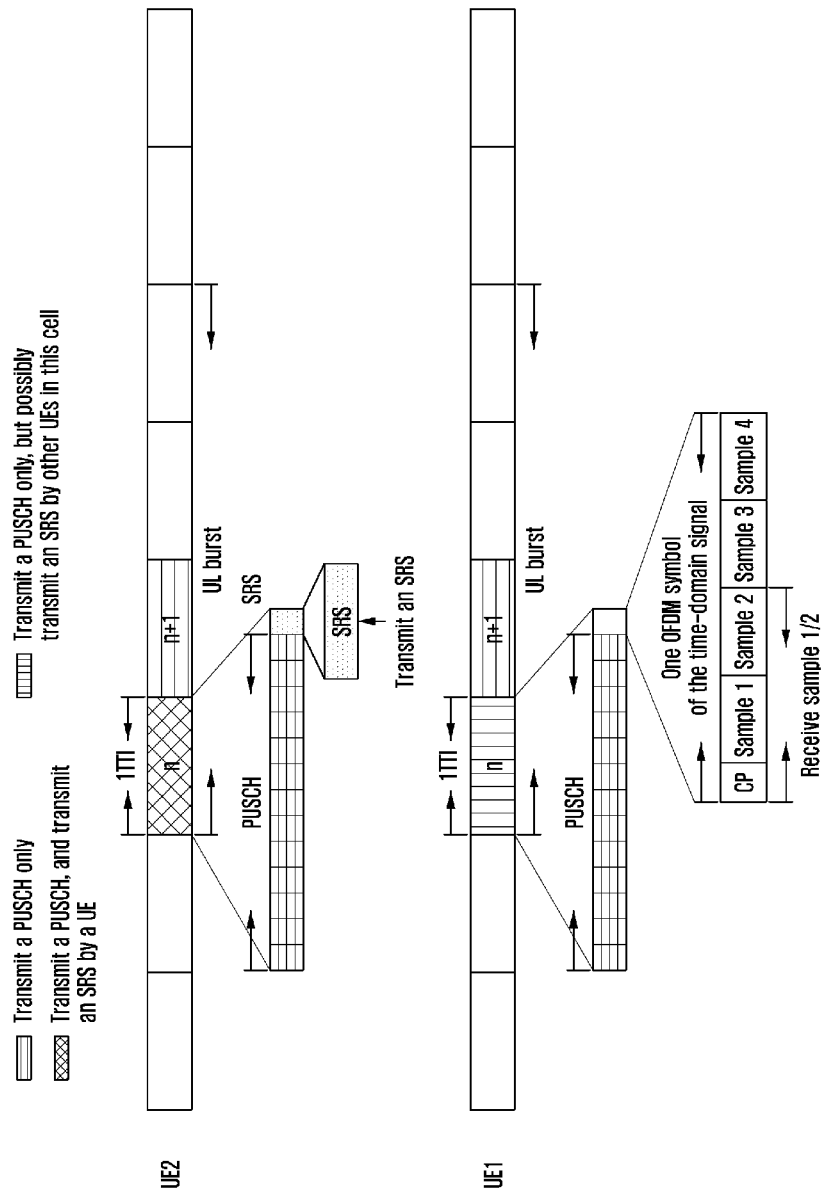

[Fig. 29]
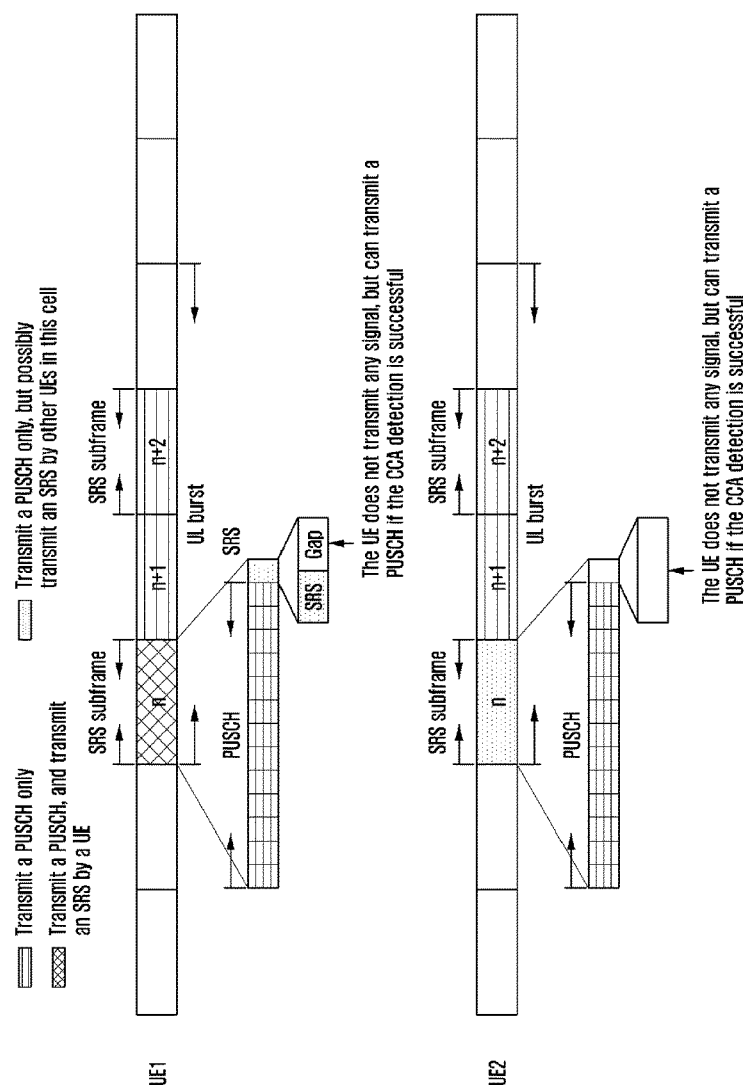
[Fig. 30]
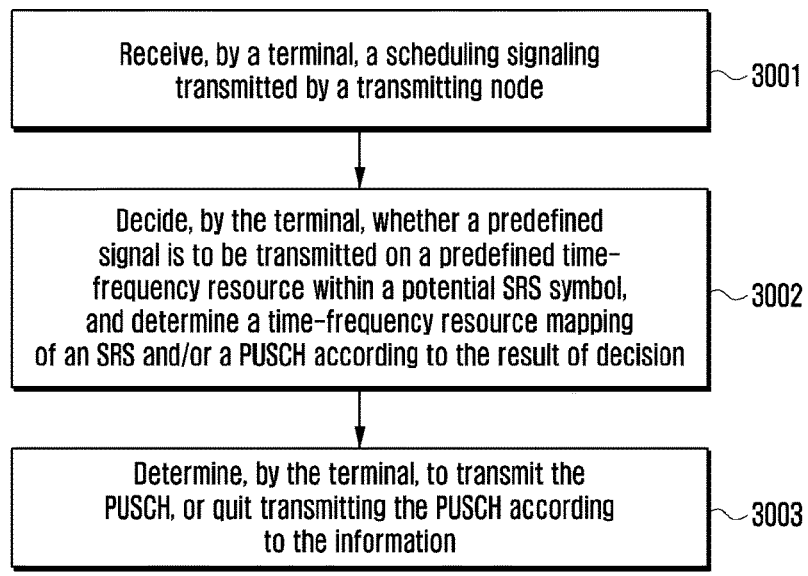

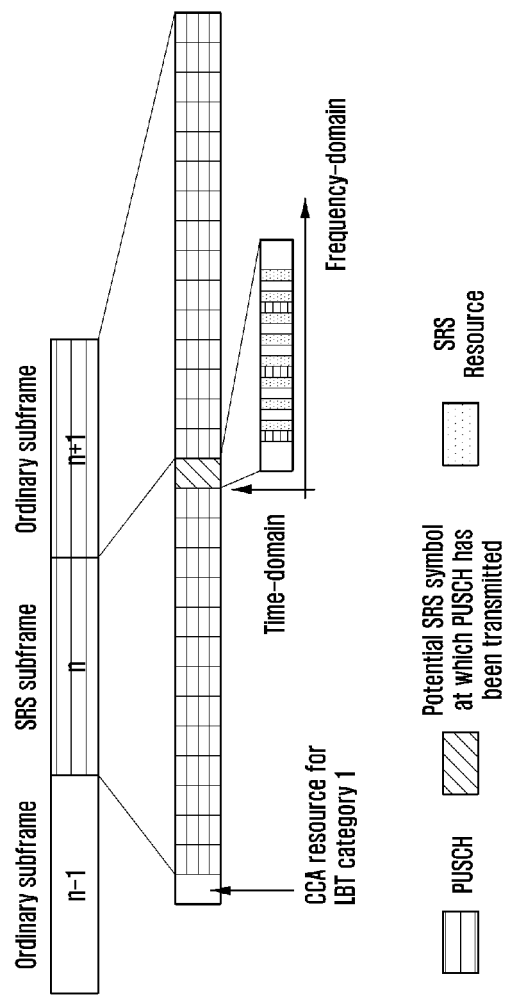
[Fig. 31]

[Fig. 32]
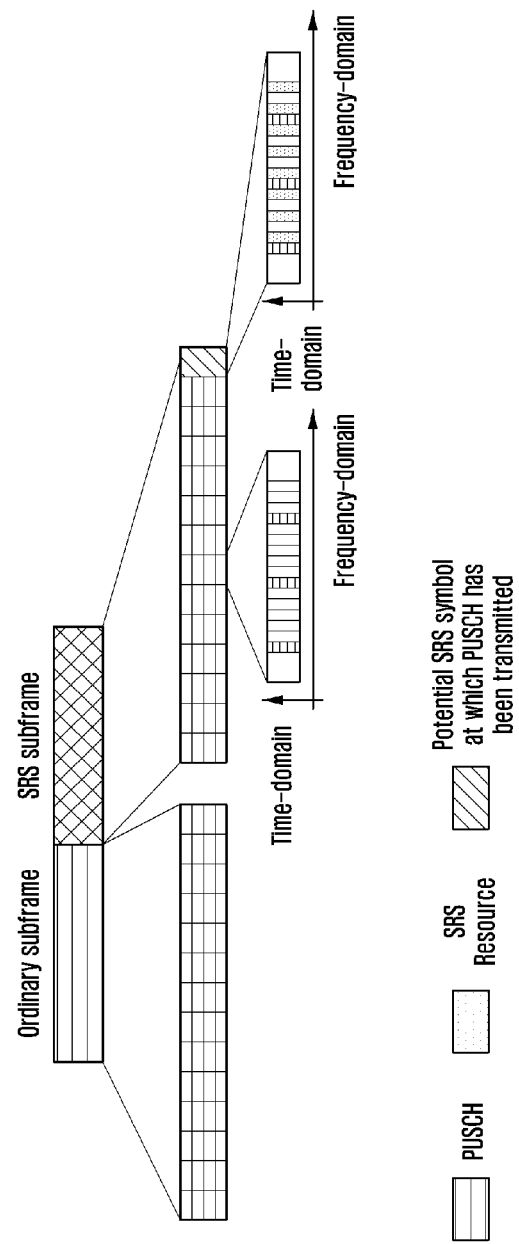

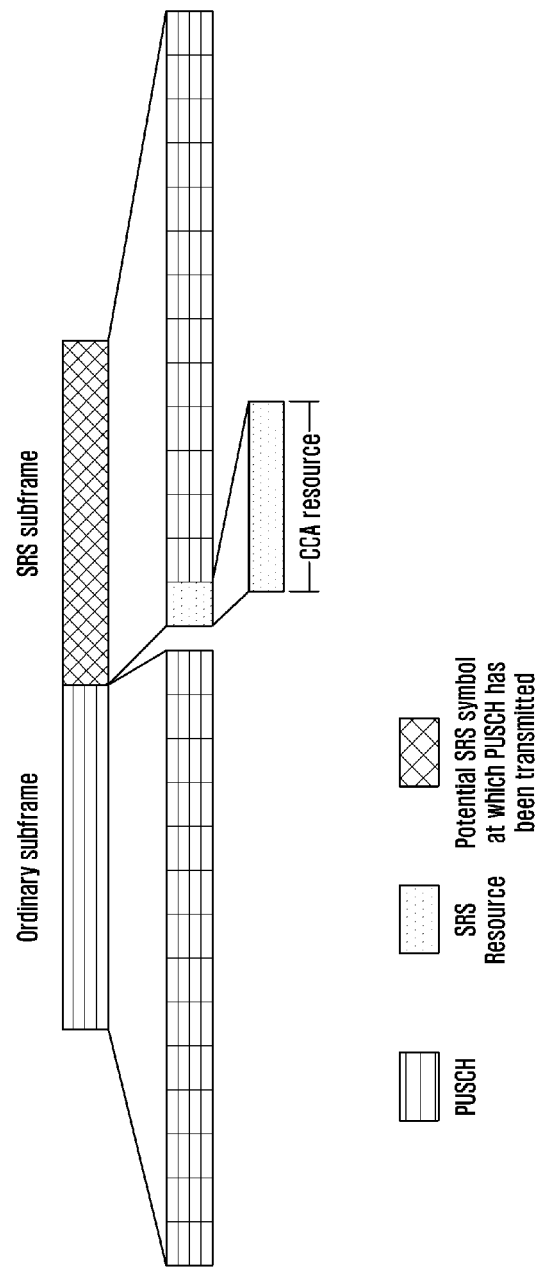
[Fig. 33]

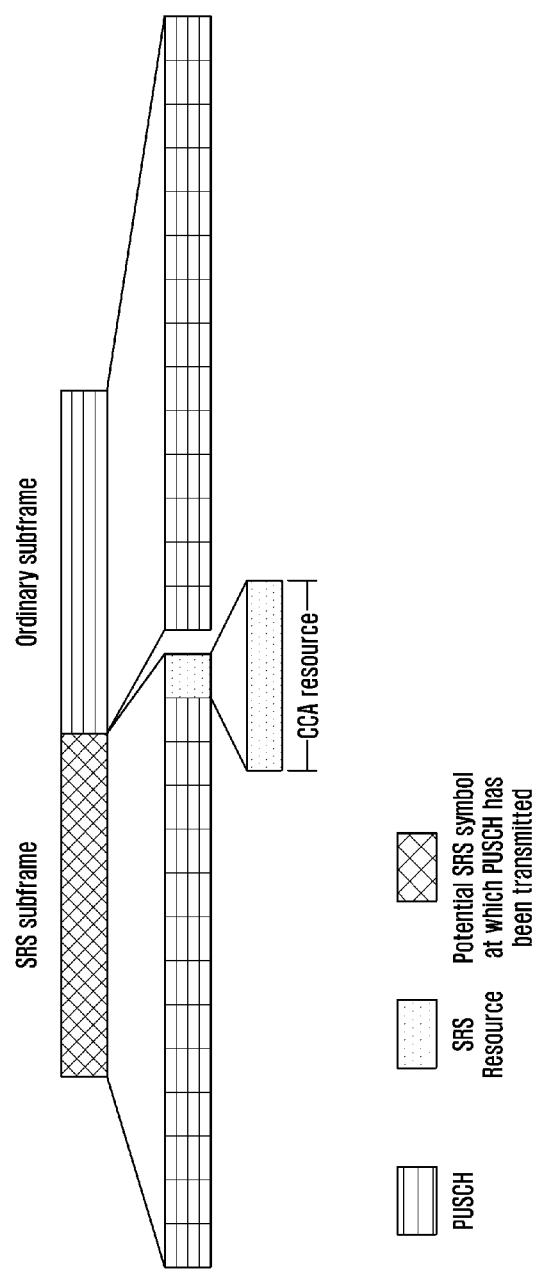
[Fig. 34]

[Fig. 35]
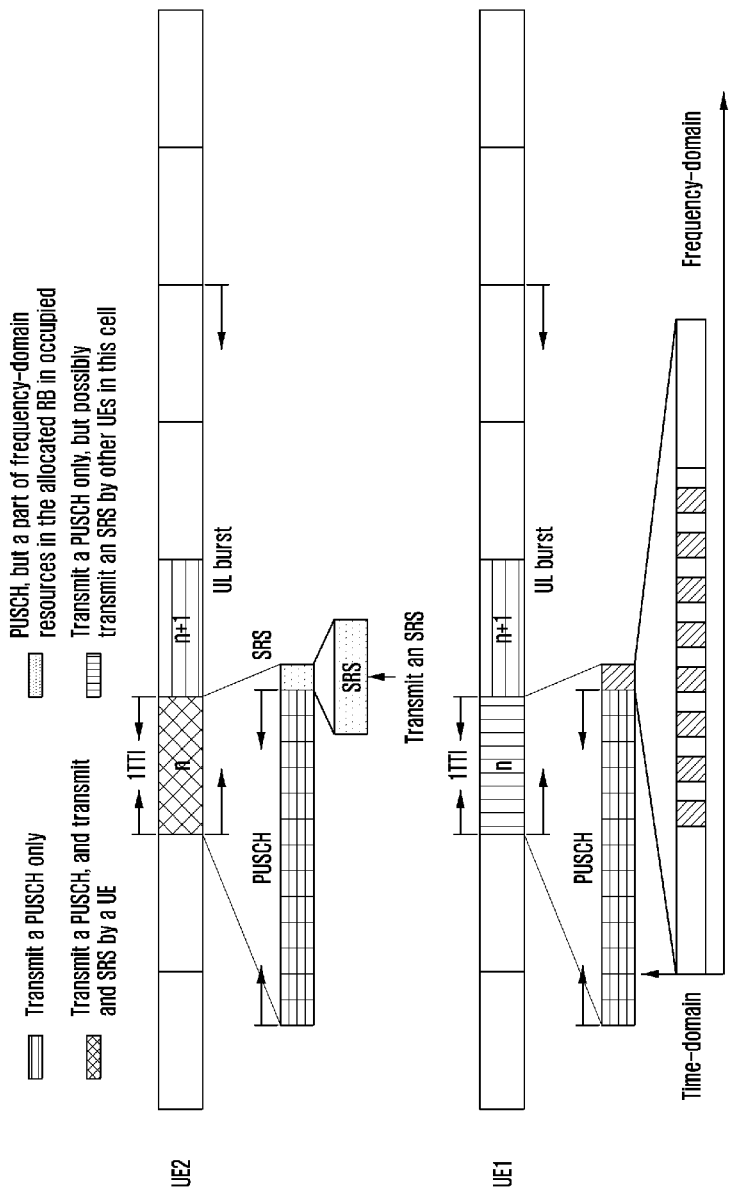
[Fig. 36]
[Fig. 37]
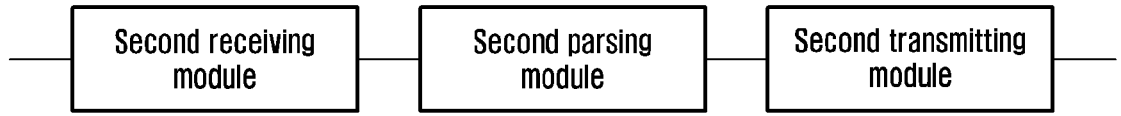

[Fig. 38]
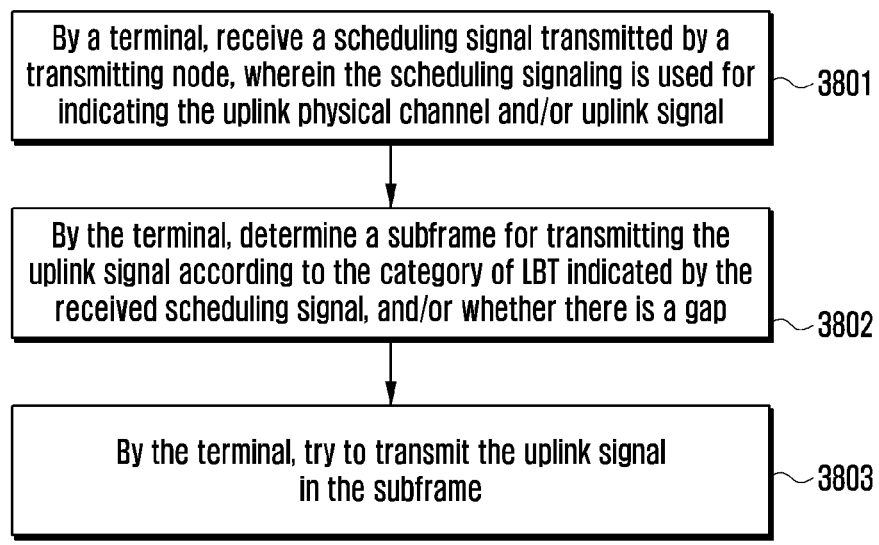

[Fig. 39]
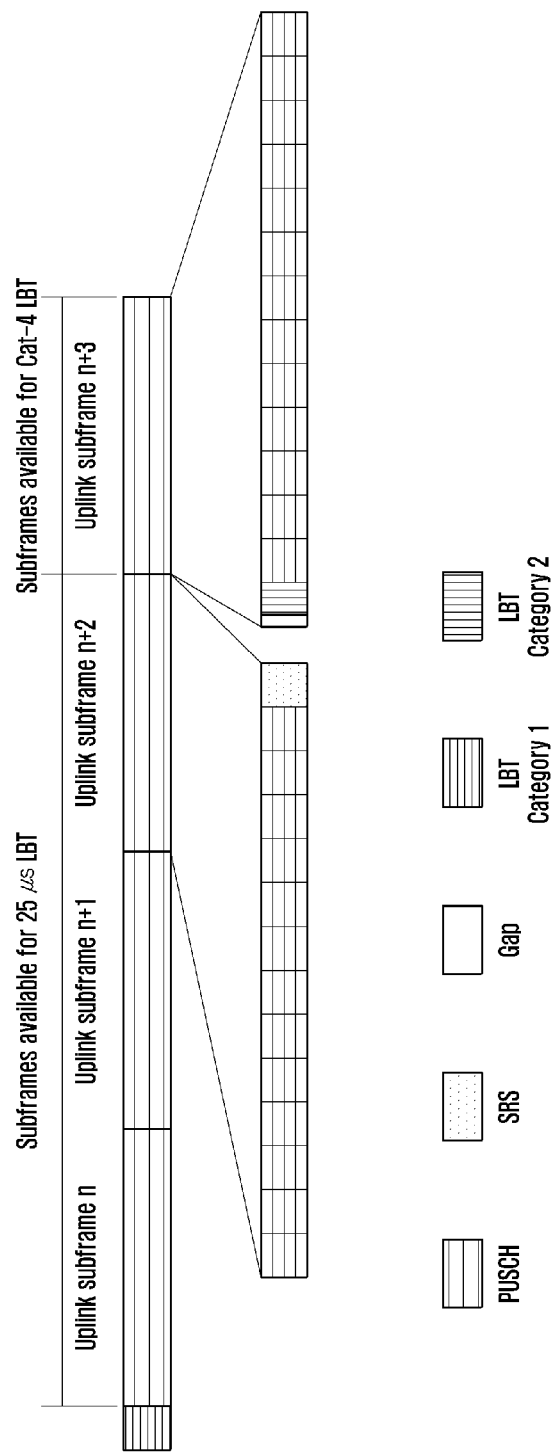

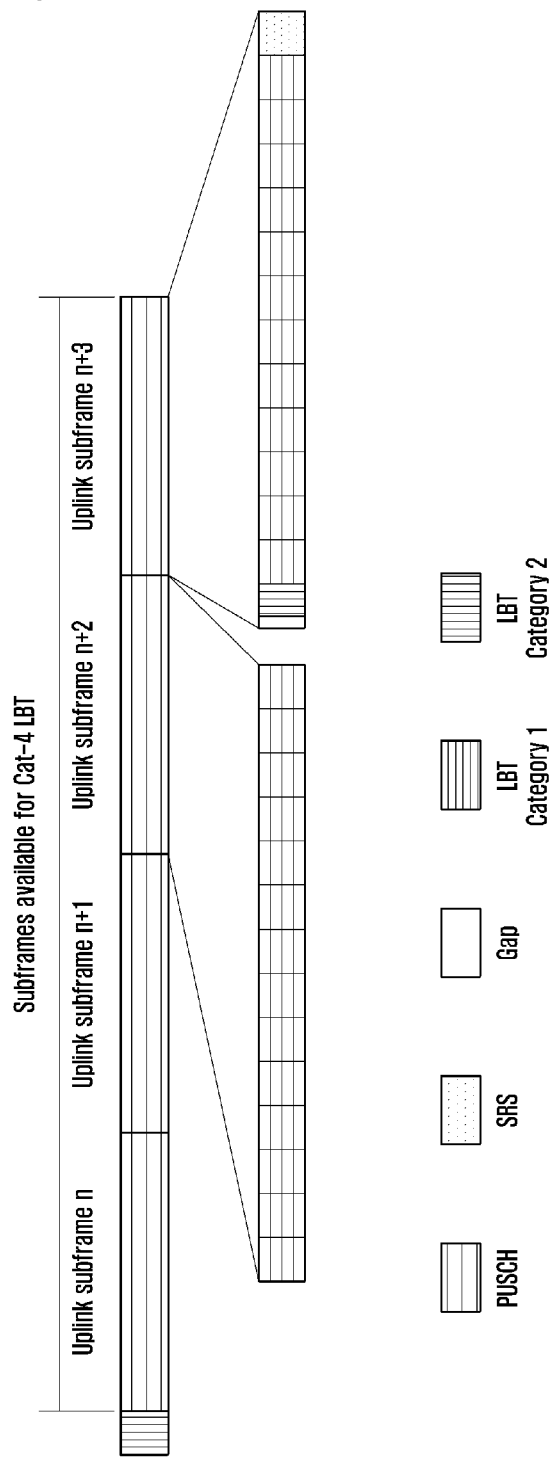
[Fig. 40]

METHOD AND USER EQUIPMENT FOR TRANSMITTING AND RECEIVING SIGNALS

PRIORITY

This application is a National Phase Entry of PCT International Application No. PCT/KR2017/001069 which was filed on Feb. 1, 2017, and claims priority to Chinese Patent Application Nos. 201610073518.7 and 201610353893.7, which were filed on Feb. 2, 2016 and May 25, 2016, respectively, the content of each of which is incorporated herein by reference.

TECHNICAL FIELD

The present application relates to the technical field of mobile communications, and in particular to a method and equipment for transmitting and receiving a signal.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the increasingly sharp contradiction between the burst of users' demands for high-bandwidth wireless services and the scarcity of frequency spectrum resources, mobile operators begin to consider unlicensed frequency bands as supplements for licensed frequency bands. Therefore, studying the deployment of the next generation of a Long Term Evolution (LTE) network on an unlicensed frequency band has been put on the agenda. The 3GPP has already began to study on how to effectively improve the utilization rate of the whole frequency spectrum through the effective carrier aggregation of the unlicensed frequency bands and the licensed frequency bands, without significantly influencing other technologies of the unlicensed frequency bands.

The unlicensed frequency band is generally allocated for some other purposes, for example, radar or Wireless Fidelity (WiFi) of 802.11 series. Thus, the interference level on the unlicensed frequency band is uncertain, and consequently, it is generally difficult to ensure the Quality of Service (QoS) of the LTE transmission. Despite this, the unlicensed frequency band can still be used for data transmission that requires a low QoS. Here, an LTE system deployed on the unlicensed frequency band is called an LAA system. How to avoid the mutual interference between the LAA system and a radar, WiFi or other wireless systems on the unlicensed frequency band is a critical issue. Clear Channel Assessment (CCA) is a collision avoidance mechanism universally adapted on the unlicensed frequency band. A mobile Station (STA) has to detect a wireless channel before transmitting signals, and can occupy the wireless channel to transmit signals only when detecting that the wireless channel is idle. The LAA system also needs to follow a similar mechanism to ensure less interference to other signals. As a simple method, an equipment in the LAA system (for example, an eNB or an end user) realizes dynamically switching according to the result of CCA, i.e., transmitting signals when it is detected that a channel is idle, and not transmitting signals when it is detected that the channel is busy. This mechanism is called Listen Before Talk (LBT).

In a conventional LTE system, an eNB can perform channel state estimation based on a Sounding Reference Signal (SRS) transmitted by a terminal, and then select a proper pre-coding matrix and a proper modulation encoding mode to realize uplink self-adaptive transmission. The SRS is classified into two types: cyclic SRS and non-cyclic SRS. Time frequency-domain resources for the two types of SRSs are configured by the eNB. If the SRS is located at the last Orthogonal Frequency Division Multiplexing (OFDM) symbol (i.e., the fourteenth OFDM symbol) of a corresponding SRS subframe, the corresponding SRS subframe configuration information is classified into cell-specific SRS subframe configuration (containing a cycle and a time offset) and UE-specific SRS subframe configuration (containing a cycle and a time offset). Wherein, the UE-specific SRS subframe set is a subset of the cell-specific SRS subframe set. The terminal transmits an SRS in a UE-specific SRS subframe (cannot transmit the SRS due to the power limitation); and if the terminal wants to transmit a Physical Uplink Shared Channel (PUSCH) in this subframe, the PUSCH occupies only the first 13 OFDM symbols in the UE-specific SRS subframe. However, in a subframe that is a cell-specific SRS subframe but not a UE-specific SRS subframe, if the cell-specific SRS bandwidth of the SRS is overlapped with the PUSCH of the terminal, the PUSCH also occupies only the first 13 OFDM symbols; or otherwise, all 14 OFDM symbols of a subframe can be occupied. A frequency-domain resource of the SRS is determined by the frequency-domain comb (transmissionComb) and frequency-domain position (freqDomainPosition) configured by the eNB, SRS bandwidth (comprising cell-specific SRS-Bandwidth and UE-specific SRS-Bandwidth), frequency-domain hopping (SRS-HoppingBandwidth) and other parameters, specifically referring to the TS 36.211 and TS 36.213. The frequency-domain comb density of the SRS is 2. In other words, on a frequency-domain, the SRS is mapped every a sub-carrier. In the Rel-13 system, the frequency-domain comb density of the SRS is expanded to 4, that is, the SRS is mapped every three sub-carriers.

It is to be noted that the introduction of the technical background is merely for clearly and completely describing the technical solutions of the present invention, and facilitating the understanding of those skilled in the art. The technical solutions shall not be considered as being wellknown to those skilled in the art only because these solutions have been stated in the background art of the present invention.

DISCLOSURE OF INVENTION

Technical Problem

In the LAA system, particularly in the LAA system based on LBT, the transmission of the SRS is based on the LBT mechanism, that is, CCA detection must be successfully performed every time the terminal transmits the SRS. If the CCA detection is failed, the terminal can only quit this SRS transmission. In an existing uplink signal transmitting structure, the first 13 OFDM symbols in a subframe are PUSCHs, while the last OFDM symbol is an SRS. There is no gap between the PUSCHs and the SRS. Therefore, if a terminal does not schedule PUSCH transmission and only needs to transmit an SRS in an SRS subframe, and the other terminal schedules PUSCH transmission and is transmitting a PUSCH in an SRS subframe, the terminal transmitting only the SRS is very likely not to pass the CCA detection. In other words, the PUSCH transmitted by the other terminal will influence the CCA detection performed on the terminal transmitting only the SRS. As a result, the terminal transmitting only the SRS cannot transmit the SRS. Therefore, it is necessary to provide a new SRS subframe structure or introduce a new LBT mechanism in order to improve the transmission probability of the SRS. In addition, in a cell-specific SRS subframe, a UE that does not transmit an SRS also needs to vacate the potential SRS OFDM symbol. In other words, if the UE transmits a PUSCH in the cell-specific SRS subframe, the UE occupies only the first 13 OFDM symbols but vacate the last OFDM symbol, and then continues to transmit the PUSCH in a next subframe. Since, in the LAA system, due to the discontinuous transmission of PUSCH in a time domain, other transmission-uncoordinated UEs (e.g., WiFi UEs) occupy a channel in one vacated OFDM symbol, the mutual interference with the PUSCH transmitted by the UE will be caused. To avoid this, CCA detection is to be performed before the UE transmitting the PUSCH continues to transmit the PUSCH. The UE can continue to transmit the PUSCH when and only when the CCA detection is successful. Thus, the interference of the PUSCH to the WiFi UEs can be effectively reduced. However, the transmission probability of the PUSCH is reduced. Hence, it is also necessary to introduce a new PUSCH transmission mechanism in order to avoid the collision with the WiFi UEs and avoid significantly reduction of the transmission probability of the PUSCH.

Solution to Problem

In view of this, the present application provides a method for transmitting and receiving a signal. By the method, when an uplink signal is transmitted on the basis of an LBT, the mutual hindrance between an uplink physical channel and an uplink detection signal can be effectively reduced, and the transmission probability of the uplink physical channel and the uplink detection signal can be increased. Meanwhile, when an uplink signal is transmitted on the basis of an LBT, the uplink signal can be transmitted in an uplink subframe that most likely transmits signals successfully.

The present application further provides a user equipment. By the user equipment, when an uplink signal is transmitted on the basis of an LBT, the mutual hindrance between an uplink physical channel and an uplink detection signal can be effectively reduced, and the transmission probability of the uplink physical channel and the uplink detection signal can be increased.

In accordance with the objectives, the present application adopts the following solutions.

A method for transmitting and receiving a signal is provided, comprising the following steps of:

receiving, by a terminal, a scheduling and/or configuration signaling transmitted by a transmitting node, wherein the scheduling signaling and/or the configuration signaling is used for indicating an uplink physical channel and/or uplink signal;

deciding, by the terminal, whether a gap is to be reserved between adjacent uplink signals and/or uplink physical channels;

if so, determining a time-frequency resource mapping of the uplink signal and/or the uplink physical channel, so that there is a gap between the uplink signals and/or the uplink physical channels; and transmitting, by the terminal, the uplink signal and/or the uplink physical channel, or quitting transmitting the uplink signal and/or the uplink physical channel.

Preferably, the uplink signal is a Sounding Reference Signal (SRS) symbol; and/or the uplink physical channel is a Physical Uplink Shared Channel (PUSCH).

Preferably, the determining a time-frequency resource mapping of the PUSCH is obtained according to an indication carried in the scheduling and/or configuration signaling or according to a presetting; and the determining a time-frequency resource mapping of the SRS is obtained according to an indication carried in the scheduling and/or configuration signaling or according to a presetting.

Preferably, the obtaining a time-frequency resource mapping of the PUSCH according to the presetting comprises:

in a case where a subframe transmitted between the terminal and the transmitting node is decided as an SRS subframe by the terminal, the time-frequency resource mapping is performed in one of or a combination of several of the following ways:

the time-frequency mapping of the PUSCH of the subframe meets the following condition: the length of a PUSCH symbol previous to a potential SRS symbol is less than that of an Orthogonal Frequency Division Multiplexing (OFDM) symbol, and a gap is reserved between the PUSCH symbol and the potential SRS symbol;

the time-frequency mapping of the PUSCH of the subframe meets the following condition: the length of a PUSCH symbol next to the potential SRS symbol is less than that of an OFDM symbol, and a gap is reserved between the potential SRS symbol and the PUSCH symbol; and the time-frequency mapping of the PUSCH of the subframe meets the following condition: the length of a PUSCH symbol previous to the potential SRS symbol is a complete symbol length, and the obtained frequency-domain resource occupied by the PUSCH is not used for CCA detection of the SRS.

Preferably, a PUSCH symbol previous to and/or next to the potential SRS symbol is mapped to a particular transmission comb, or consists of a CP and at least one time-domain sample value, or is obtained by truncating a set number of sampling points from the end of a complete OFDM symbol or from the starting point of a complete OFDM symbol.

Preferably, the obtaining the time-frequency resource mapping of the PUSCH according to the presetting comprises:

in a case where a subframe transmitted between the terminal and the transmitting node is decided as a subframe neighboring an SRS subframe by the terminal, the time-frequency resource mapping is performed in one of or a combination of several of the following ways:

if the potential SRS symbol is located at the first OFDM symbol of an SRS subframe, the time-frequency mapping of the PUSCH of the subframe meets the following condition: the length of a PUSCH symbol previous to the potential SRS symbol is less than that of an OFDM symbol, and a gap is reserved between the PUSCH symbol and the potential SRS symbol;

if the potential SRS symbol is located at the last OFDM symbol of an SRS subframe, the time-frequency mapping of the PUSCH of the subframe meets the following condition: the length of a PUSCH symbol next to the potential SRS symbol is less than that of an OFDM symbol, and a gap is reserved between the potential SRS symbol and the PUSCH symbol; and if the potential SRS symbol is located at the first symbol of an SRS subframe, the length of a PUSCH symbol previous to the potential SRS symbol is a complete symbol length, and the obtained frequency-domain resource occupied by the PUSCH is not used for CCA detection of the SRS.

Preferably, the indication carried in the scheduling and/or configuration signaling comprises one of or a combination of several of the following:

a predefined indication that the length of a PUSCH symbol previous to the potential SRS symbol is less than that of an OFDM symbol and a gap is reserved between the PUSCH symbol and the potential SRS symbol;

a predefined indication that the length of a PUSCH symbol next to the potential SRS symbol is less than that of an OFDM symbol and a gap is reserved between the potential SRS symbol and the PUSCH symbol; and a predefined indication that the PUSCH is mapped to the potential SRS symbol.

Preferably, the obtained time-frequency resource mapping of the PUSCH is useful for all subframes of the PUSCH scheduled by the scheduling and/or configuration signaling;

or useful for a cell-specific SRS subframe and/or subframes neighboring the cell-specific SRS subframe;

or useful for a user-specific SRS subframe and/or subframes neighboring the cell-specific SRS subframe; or useful for set particular subframes.

Preferably, the decision on whether the terminal transmits the PUSCH and/or the SRS or quits transmitting the PUSCH and/or the SRS is made after performing CCA detection on a predefined resource by the terminal.

Preferably, the CCA detection is determined according to whether the subframe received by the terminal is an SRS subframe, comprising:

if the subframe received by the terminal is an SRS subframe and the potential SRS symbol is previous to a PUSCH symbol, a predefined CCA resource at least comprises the potential SRS symbol;

if the subframe received by the terminal is an SRS subframe and the potential SRS symbol is previous to a PUSCH symbol, a predefined CCA resource at least comprises a predefined gap, and the gap is a gap between the potential SRS symbol and the first PUSCH symbol following the potential SRS symbol;

if the subframe received by the terminal is an SRS subframe and the potential SRS symbol is previous to a PUSCH symbol, a predefined CCA resource at least comprises a predefined gap and the potential SRS symbol;

if the subframe received by the terminal is an SRS subframe and the potential SRS symbol is next to a PUSCH symbol, a predefined CCA resource at least comprises the potential SRS symbol; and if the subframe received by the terminal is an SRS subframe and the potential SRS symbol is next to a PUSCH symbol, a predefined CCA resource at least comprises a gap between the potential SRS symbol and the first PUSCH symbol in a next subframe.

Preferably, the CCA detection is determined according to whether the subframe received by the terminal is a subframe immediately next to an SRS subframe, comprising:

if the subframe received by the terminal is a subframe immediately next to an SRS subframe and the potential SRS symbol in the SRS subframe is next to a PUSCH symbol, the predefined CCA resource at least comprises a predefined gap, and the gap is a gap between the potential SRS symbol and the first PUSCH symbol in the current subframe.

Preferably, CCA detection is performed on a predefined CCA resource in one of or a combination of several of the following ways:

if the terminal is scheduled to transmit a PUSCH only in the current subframe but not scheduled to transmit a PUSCH in a previous subframe, or if the terminal is scheduled but does not successfully transmit a PUSCH in the previous subframe, LBT category 1 is performed before the current subframe begins to transmit the PUSCH, where the CCA resource for the LBT category 1 in each subframe is fixed or the CCA resource for the LBT category 1 is variable, and the CCA resource for the LBT category 1 evades an SRS resource or the CCA time resource for the LBT category 1 should comprise an SRS time resource;

if the terminal is scheduled to transmit a PUSCH in the current subframe and the previous subframe, the terminal has transmitted the PUSCH in the previous subframe, and the PUSCH of the current subframe does not exceed a maximum occupancy time, the terminal continues to transmit the PUSCH in the current subframe without performing CCA detection if there is no gap between the two subframes; and the terminal needs to perform LBT category 2 if there is a gap between the two subframes; and when the terminal performs the LBT category 1 or category 2, the terminal receives a part of time-domain sampling points, then repeats the received time-domain sampling points and/or processes the received time-domain sampling points to restore complete time-domain sampling points or restore complete frequency-domain sampling points, converts them to a frequency-domain and performs CCA detection on a corresponding frequency-domain resource; or receives all time-domain sampling points, converts them to a frequency-domain and performs CCA detection on a corresponding frequency-domain resource.

Preferably, the scheduling and/or configuration signaling is, as a configuration signaling for the SRS, one of or a combination of several of the following:

the scheduling and/or configuration signaling comprises a cell-specific SRS subframe configuration, but does not comprise a UE-specific SRS subframe configuration;

the scheduling and/or configuration signaling comprises a cell-specific SRS subframe configuration and a UE-specific SRS subframe configuration, and the UE-specific SRS subframe configuration is the same as the cell-specific SRS subframe configuration;

the scheduling and/or configuration signaling comprises neither a UE-specific SRS subframe configuration nor a cell-specific SRS subframe configuration;

the scheduling and/or configuration signaling contains SRS subframe configuration information, the configuration information indicating a subframe offset from a predefined subframe as a UE-specific SRS subframe; and the scheduling and/or configuration signaling contains an SRS frequency-domain resource, the SRS frequency-domain resource at least containing transmission comb information which can be cell-specific transmission comb information and/or UE-specific transmission comb information.

Preferably, when the scheduling and/or configuration signaling comprises a cell-specific SRS subframe configuration but does not comprise a UE-specific SRS subframe configuration, the transmitting, by the terminal, the SRS and/or the PUSCH is: determining, by the terminal, a subframe for transmitting the SRS according to a cell-specific SRS subframe;

when the scheduling and/or configuration signaling comprises a cell-specific SRS subframe configuration and a UE-specific SRS subframe configuration and the UE-specific SRS subframe configuration is the same as the cell-specific SRS subframe configuration, the transmitting, by the terminal, the SRS and/or the PUSCH is: determining, by the terminal, a subframe for transmitting the SRS according to a UE-specific SRS subframe;

when the scheduling and/or configuration signaling comprises neither a UE-specific SRS subframe configuration nor a cell-specific SRS subframe configuration, the transmitting, by the terminal, the SRS and/or the PUSCH is: determining, by the terminal, a subframe for transmitting the SRS with the reference to a subframe for which the received configuration signaling is;

when the scheduling and/or configuration signaling contains SRS subframe configuration information and the configuration information indicating a subframe offset from a predefined subframe as a UE-specific SRS subframe, the transmitting, by the terminal, the SRS and/or the PUSCH is: determining, by the terminal, a subframe for transmitting the SRS according to the UE-specific SRS subframe; and when the scheduling and/or configuration signaling contains an SRS frequency-domain resource and the SRS frequency-domain resource at least contains transmission comb information which can be cell-specific transmission comb information and/or UE-specific transmission comb information, the transmitting, by the terminal, the SRS and/or the PUSCH is: determining, by the terminal, a resource for transmitting the SRS according to the cell-specific transmission comb information and/or the UE-specific transmission comb information.

Preferably, the obtaining the time-frequency resource mapping of the SRS according to the presetting comprises:

in a case where a subframe transmitted between the terminal and the transmitting node is decided as an SRS subframe by the terminal, the predefined subframe is a UE-specific SRS subframe and/or a cell-specific SRS subframe semi-statically configured by an eNB; and, if the predefined subframe is a predefined SRS subframe, the time-frequency resource mapping of the SRS comprises one of or a combination of several of the following:

the potential SRS symbol is a shortened OFDM symbol, and a gap is reserved between the potential SRS symbol and a previous PUSCH symbol;

the potential SRS symbol is a shortened OFDM symbol, and a gap is reserved between the SRS symbol and a next PUSCH symbol; and the potential SRS symbol is a complete OFDM symbol.

Preferably, the length of the gap is less than the length of one OFDM symbol.

Preferably, the time-frequency resource mapping of the SRS determined according to the indication carried in the scheduling and/or configuration signaling comprises one of or a combination of several of the following:

a predefined SRS subframe, the subframe transmitting an SRS in one or more predefined SRS subframes starting from the $(n+k)^{th}$ subframe, wherein the potential SRS symbol is a shortened OFDM symbol, a gap is reserved between the potential SRS symbol and the previous or next PUSCH symbol, and the subframe n is a subframe receiving the indication;

a predefined potential SRS symbol indicative of transmitting a complete OFDM symbol;

a predefined SRS subframe, the subframe transmitting an SRS in one or more subframes starting from $(n+k)^{th}$ subframe; and a predefined indication for not transmitting the SRS.

Preferably, the CCA detection is determined according to whether the subframe received by the terminal is an SRS subframe, comprising:

if the subframe received by the terminal is an SRS subframe and the potential SRS symbol is next to a PUSCH symbol, the predefined CCA resource at least comprises a gap, the gap is a gap between the potential SRS OFDM symbol and a previous PUSCH OFDM symbol, and the gap is the entire frequency-domain resources or a part of frequency-domain resources within the gap;

if the subframe received by the terminal is an SRS subframe and the potential SRS symbol is next to a PUSCH symbol, the predefined CCA resource at least comprises all of or a part of time-frequency resources for one PUSCH symbol; and the PUSCH symbol is a PUSCH symbol immediately previous to the potential SRS symbol.

Preferably, the CCA is determined according to whether the subframe received by the terminal is a subframe previous to the SRS subframe, comprising:

if the subframe received by the terminal is a subframe previous to the SRS subframe and the potential SRS symbol in the SRS subframe is a first OFDM symbol of the SRS subframe, the predefined CCA resource at least comprises a gap between the potential SRS symbol and the last PUSCH OFDM symbol in a subframe previous to the SRS subframe, and the gap can be the entire frequency-domain resources or a part of frequency-domain resources within the gap; and if the subframe received by the terminal is a subframe previous to the SRS subframe and the potential SRS symbol in the SRS subframe is a first OFDM symbol of the SRS subframe, the predefined CCA resource at least comprises all of or a part of frequency-domain resources, and the PUSCH symbol is a PUSCH symbol immediately previous to the potential SRS symbol.

Preferably, CCA detection is performed on a predefined CCA resource in one of or a combination of several of the following ways:

if the terminal has successfully transmitted the PUSCH prior to the SRS and the potential SRS symbol is within a maximum occupancy time, the terminal directly transmits the SRS without performing an LBT, the SRS and the PUSCH being chronologically continuous;

or, if the SRS is located at the first OFDM symbol of an SRS subframe and the terminal has scheduled PUSCH transmission in a subframe previous to the SRS subframe and successfully transmitted the PUSCH, the terminal does not need to perform an LBT;

if the terminal has successfully transmitted the PUSCH prior to the SRS and the potential SRS symbol is within a maximum occupancy time, or if the terminal has successfully transmitted the PUSCH prior to the SRS and schedules the PUSCH after the potential SRS symbol and both the potential SRS symbol and the PUSCH following the potential SRS symbol is within the maxim occupancy time, the terminal performs LBT category 3;

if the terminal has not successfully transmitted the PUSCH prior to the SRS but does not schedule the PUSCH after the SRS, the terminal can perform LBT category 4; and if the terminal has not successfully transmitted the PUSCH prior to the SRS and schedules the PUSCH after the SRS, the terminal performs LBT category 5.

The present application discloses a method for transmitting and receiving a signal, comprising the following steps of:

receiving, by a terminal, a scheduling and/or configuration signaling transmitted by a transmitting node, wherein the scheduling signaling and/or the configuration signaling is used for indicating an uplink physical channel and/or uplink signal;

transmitting, by the terminal, the uplink physical channel prior to or after the uplink signal;

deciding, by the terminal, whether the uplink signal is used to transmit an SRS by other UEs;

if so, mapping, by the terminal, a predefined signal on a predefined time-frequency resource in the uplink signal; and transmitting, by the terminal, the uplink signal and/or the uplink physical channel, or quitting transmitting the uplink signal and/or the uplink physical channel.

Preferably, the uplink signal is a Sounding Reference Signal (SRS) symbol; and/or the uplink physical channel is a Physical Uplink Shared Channel (PUSCH).

Preferably, the determining a time-frequency resource mapping of the PUSCH is obtained according to an indication carried in the scheduling and/or configuration signaling or according to a presetting; and the determining a time-frequency resource mapping of the SRS is obtained according to an indication carried in the scheduling and/or configuration signaling or according to a presetting.

Preferably, the obtaining a time-frequency resource mapping of the PUSCH according to the presetting comprises:

if a subframe transmitted between the terminal and the transmitting node is decided as an SRS subframe by the terminal, the PUSCH cannot be mapped to a predefined frequency-domain resource in the potential SRS symbol, specifically:

the PUSCH is not mapped to a transmission comb for transmitting the SRS of one or more UEs in a cell in the potential SRS symbol, or the PUSCH is not mapped to a transmission comb for CCA in the potential SRS symbol.

Preferably, the determining a time-frequency resource mapping of the PUSCH according to an indication carried in the scheduling and/or configuration signaling comprises:

if the signaling indication is a predefined value X1, the PUSCH cannot be mapped to a predefined frequency-domain resource in the potential SRS symbol; and if the signaling indication is a predefined value X2, the PUSCH is mapped to a predefined frequency-domain resource in the potential SRS symbol; and the obtained time-frequency resource mapping of the PUSCH is valid for any subframe of the PUSCH scheduled by the scheduling and/or configuration signaling, or is merely valid for a cell-specific SRS subframe, or is valid for a set subframe.

Preferably, the transmitting, by the terminal, the PUSCH and/or the SRS or quitting transmitting the PUSCH and/or the SRS is based on performing CCA detection on a predefined CCA resource, and the predefined CCA resource is determined in the following ways:

if the current subframe is an SRS subframe and the potential SRS symbol is previous to a PUSCH symbol, the predefined CCA resource at least comprises the potential SRS symbol;

if the current subframe is an SRS subframe and the potential SRS symbol is next to a PUSCH symbol, the predefined CCA resource at least comprises the potential SRS symbol; and if the current subframe is not an SRS subframe and the potential SRS OFDM symbol defined by the system is next to a PUSCH OFDM symbol, it is necessary to further decide whether the current subframe is a subframe next to the SRS subframe and then determine the CCA resource.

Preferably, the performing CCA detection comprises:

if the terminal is scheduled to transmit a PUSCH only in the current subframe but not scheduled to transmit a PUSCH in a previous subframe, or if the terminal is scheduled but does not successfully transmit a PUSCH in the previous subframe, LBT category 1 is performed before the current subframe begins to transmit the PUSCH, where each subframe of the CCA resource for the LBT category 1 is fixed or the CCA resource for the LBT category 1 is variable, and the CCA resource for the LBT category 1 evades an SRS resource or the CCA time resource for the LBT category 1 should contain an SRS time resource;

if the terminal is scheduled to transmit a PUSCH in the current subframe and the previous subframe, the terminal has transmitted the PUSCH in the previous subframe and the PUSCH of the current subframe does not exceed the maximum occupancy time, the terminal can continue to transmit the PUSCH in the current subframe without performing CCA detection if there is no gap between the two subframes; and when the terminal performs the LBT category 1, the terminal can receive a part of time-domain sampling points, then repeat the received time-domain sampling points and/or process the received time-domain sampling points to restore complete time-domain sampling points or restore the effect of complete time-domain sampling points, then be switched to a frequency-domain, and perform CCA detection on a corresponding frequency-domain resource; or can receive all time-domain sampling points, then be switched to a frequency-domain, and perform CCA detection on a corresponding frequency-domain resource.

Preferably, the scheduling and/or configuration signaling is, as a configuration signaling for the SRS, one of or a combination of several of the following:

the scheduling and/or configuration signaling comprises a cell-specific SRS subframe configuration, but does not comprise a UE-specific SRS subframe configuration;

the scheduling and/or configuration signaling comprises a cell-specific SRS subframe configuration and a UE-specific SRS subframe configuration, and the UE-specific SRS subframe configuration is the same as the cell-specific SRS subframe configuration;

the scheduling and/or configuration signaling comprises neither a UE-specific SRS subframe configuration nor a cell-specific SRS subframe configuration;

the scheduling and/or configuration signaling contains SRS subframe configuration information, the configuration information indicating a subframe offset from a predefined subframe as a UE-specific SRS subframe; and the scheduling and/or configuration signaling contains an SRS frequency-domain resource, the SRS frequency-domain resource at least containing transmission comb information which can be cell-specific transmission comb information and/or UE-specific transmission comb information.

Preferably, when the scheduling and/or configuration signaling comprises a cell-specific SRS subframe configuration but does not comprise a UE-specific SRS subframe configuration, the transmitting, by the terminal, the SRS and/or the PUSCH is: determining, by the terminal, a subframe for transmitting the SRS according to a cell-specific SRS subframe;

when the scheduling and/or configuration signaling comprises a cell-specific SRS subframe configuration and a UE-specific SRS subframe configuration and the UE-specific SRS subframe configuration is the same as the cell-specific SRS subframe configuration, the transmitting, by the terminal, the SRS and/or the PUSCH is: determining, by the terminal, a subframe for transmitting the SRS according to a UE-specific SRS subframe;

when the scheduling and/or configuration signaling comprises neither a UE-specific SRS subframe configuration nor a cell-specific SRS subframe configuration, the transmitting, by the terminal, the SRS and/or the PUSCH is: determining, by the terminal, a subframe for transmitting the SRS with the reference to a subframe for which the received configuration signaling is;

when the scheduling and/or configuration signaling contains SRS subframe configuration information and the configuration information indicating a subframe offset from a predefined subframe as a UE-specific SRS subframe, the transmitting, by the terminal, the SRS and/or the PUSCH is: determining, by the terminal, a subframe for transmitting the SRS according to the UE-specific SRS subframe; and when the scheduling and/or configuration signaling contains an SRS frequency-domain resource and the SRS frequency-domain resource at least contains transmission comb information which can be cell-specific transmission comb information and/or UE-specific transmission comb information, the transmitting, by the terminal, the SRS and/or the PUSCH is: determining, by the terminal, a resource for transmitting the SRS according to the cell-specific transmission comb information and/or the UE-specific transmission comb information.

Preferably, the obtaining a time-frequency resource of the SRS according to the presetting comprises:

when the PUSCH is transmitted in a same subframe and the subframe is a cell-specific SRS subframe, the subframe can transmit an SRS regardless of whether or not the subframe is a UE-specific SRS subframe, the SRS is located within a predefined potential SRS symbol, or the frequency-domain resource occupied by the SRS is predefined or configured by an eNB;

when the PUSCH is transmitted in a same subframe, the subframe can transmit an SRS regardless of whether or not the subframe is a cell-specific SRS subframe, the SRS is located within a predefined potential SRS symbol, or the frequency-domain resource occupied by the SRS can be predefined or configured by an eNB; and a specific SRS subframe performs resource mapping in accordance with the complete potential SRS symbol and according to the indicated SRS resource; or otherwise, an SRS signal does not need to be prepared.

Preferably, a method for determining a time-frequency resource mapping of the SRS according to an indication carried in the scheduling and/or configuration signaling comprises:

when the PUSCH is transmitted in a same subframe and the subframe is a cell-specific SRS subframe, the subframe can transmit an SRS regardless of whether or not the subframe is a UE-specific SRS subframe; and when the PUSCH is transmitted in a same subframe, the subframe can transmit an SRS regardless of whether or not the subframe is a cell-specific SRS subframe;

wherein the SRS is located within a predefined potential SRS symbol, or the frequency-domain resource occupied by the SRS is predefined or configured by an eNB.

Preferably, a method for determining a time-frequency resource mapping of the SRS according to an indication carried in the scheduling and/or configuration signaling or according to a presetting comprises:

determining an SRS subframe in one of or a combination of several of the following ways when the scheduling and/or configuration signaling schedules PUSCH transmission of N uplink subframes and triggers SRS transmission:

first N1 uplink subframes among the N uplink subframes are continuous, and there is a gap between the $(N1+1)^{th}$ subframe and the $(N1)^{th}$ subframe, if the first N1 uplink subframes are located within a time window which can adopt the LBT category 1, the $(N1+1)^{th}$ uplink subframe starts to be located within a time window adopting the LBT category 2, and the category of LBT indicated by an eNB is the LBT category 1 and the LBT category 2, respectively, the SRS subframe is the first uplink subframe of the N uplink subframes; and/or, if the first N1 uplink subframes are located within a time window which can adopt the LBT category 1, the $(N1+1)^{th}$ uplink subframe starts to be located within a time window adopting the LBT category 2, and the category of LBT indicated by an eNB is the LBT category 1 and the LBT category 2, respectively, the SRS subframe is the last subframe containing the potential SRS symbol of the N1 uplink subframes or the last uplink subframe of the N1 uplink subframes; and/or, if the first N1 uplink subframes are located within a time window which can adopt the LBT category 2, the SRS subframe is the first uplink subframe of the N uplink subframes; and/or, if the first N1 uplink subframes are located within a time window which can adopt the LBT category 2, the SRS subframe is the last subframe containing the potential SRS symbol of the N1 uplink subframes or the last subframe of the N1 uplink subframes; and/or, if the first N1 uplink subframes are located within a time window which can adopt the LBT category 2, the SRS subframe is the last subframe containing the potential SRS symbol of the N uplink subframes or the last subframe of the N1 uplink subframes.

Preferably, a method for determining a time-frequency resource mapping of the SRS according to an indication carried in the scheduling and/or configuration signaling or according to a presetting comprises:

determining an SRS subframe in one of or a combination of several of the following ways when the scheduling and/or configuration signaling schedules PUSCH transmission of N uplink subframes and triggers SRS transmission:

if first N2 uplink subframes among the N uplink subframes are located within a time window of the LBT category 1 and the category of LBT indicated by an eNB is the LBT category 1, the SRS subframe is the first uplink subframe of the N uplink subframes; and/or, if first N2 uplink subframes among the N uplink subframes are located within a time window of the LBT category 1 and the category of LBT indicated by an eNB is the LBT category 1, the SRS subframe is the last subframe containing the potential SRS symbol or the last subframe of the N2 uplink subframes; and/or, if first N2 uplink subframes among the N uplink subframes are located within a time window of the LBT category 2, the SRS subframe is the last subframe containing the potential SRS symbol or the last subframe of the N uplink subframes.

Preferably, the LBT category 1 occupies a channel faster than the LBT category 2.

The present application discloses a user equipment, comprising a first receiving module, a first parsing module and a first transmitting module, wherein the first receiving module is configured to receive a scheduling and/or configuration signaling transmitted by a transmitting node, wherein the scheduling signaling and/or configuration signaling is used for indicating the uplink physical channel and/or an uplink signal;

the first parsing module is configured to decide whether a gap is to be reserved between adjacent uplink signals and/or uplink physical channels; if so, determine a time-frequency resource mapping of the uplink signal and/or the uplink physical channel, so that there is a gap between the uplink signals and/or the uplink physical channels; and the first transmitting module is configured to transmit the uplink signal and/or the uplink physical channel, or quit transmitting the uplink signal and/or the uplink physical channel.

The present application discloses a user equipment, comprising a second receiving module, a second parsing module and a second transmitting module, wherein:

the second receiving module is configured to receive a scheduling and/or configuration signaling transmitted by a transmitting node, wherein the scheduling signaling and/or configuration signaling is used for indicating the uplink physical channel and/or uplink signal;

the second parsing module is configured to decide a subframe for transmitting the uplink signal; and, the second transmitting module is configured to transmit the uplink signal and/or the uplink physical channel on the determined uplink subframe, or quit transmitting the uplink signal and/or the uplink physical channel.

Advantageous Effects of Invention

It can be seen from the solutions that, first, a terminal receives a scheduling signaling transmitted by a transmitting node; then, the terminal decides whether a gap is to be reserved between a Sounding Reference Signal (SRS) symbol and a Physical Uplink Shared Channel (PUSCH) symbol, and then determine a time-frequency resource mapping of an SRS and/or a PUSCH; or, the terminal decides whether a predefined signal is to be transmitted on a predefined time-frequency resource within a potential SRS symbol, and then determines a time-frequency resource mapping of an SRS and/or a PUSCH; eventually, the terminal transmits the PUSCH and/or the SRS, or quits scheduling and transmitting the PUSCH and/or the SRS. Thus, in the present invention, when an uplink signal is transmitted on the basis of an LBT, the mutual hindrance between an uplink physical channel and an uplink detection signal can be effectively reduced, the transmission probability of the uplink physical channel and the uplink detection signal can be increased, and the influence on the uplink physical channel from the uplink detection signal can be effectively reduced.

It can be seen from the solutions that, a terminal receives a scheduling signaling transmitted by a transmitting node, and triggers SRS transmission when the scheduling signaling schedules a multiple of (N) uplink subframes for PUSCH transmission; and the terminal determines an uplink subframe transmitting an SRS according to whether there is a gap between the N uplink subframes, and/or a category of LBT that can be adopted by the N uplink subframes. By transmitting an SRS in an uplink subframe that occupies a channel easily, the transmission probability of the SRS is increased.

BRIEF DESCRIPTION OF DRAWINGS

FIG. 1 is a flowchart of a first method for transmitting and receiving a signal according to an embodiment of the present application;

FIG. 2 is a flowchart of a first instance in the first method according to an embodiment of the present invention;

FIG. 3 is a schematic diagram of a first SRS structure of the first instance in the first method according to an embodiment of the present invention;

FIG. 4 is a schematic diagram of a second SRS structure of the first instance in the first method according to an embodiment of the present invention;

FIG. 5 is a schematic diagram of a third SRS structure of the first instance in the first method according to an embodiment of the present invention;

FIG. 6 is a schematic diagram of a fourth SRS structure of the first instance in the first method according to an embodiment of the present invention;

FIG. 7 is a schematic diagram of a fifth SRS structure of the first instance in the first method according to an embodiment of the present invention;

FIG. 8 is a schematic diagram of a first subframe structure for CAA resource detection according to Embodiment 1 of the present invention;

FIG. 9 is a schematic diagram of a second subframe structure for CAA resource detection according to an embodiment of the present invention;

FIG. 10 is a schematic diagram of a third subframe structure for CAA resource detection according to an embodiment of the present invention;

FIG. 11 is a schematic diagram of a fourth subframe structure for CAA resource detection according to an embodiment of the present invention;

FIG. 12 is a schematic diagram of a fifth subframe structure for CAA resource detection according to an embodiment of the present invention;

FIG. 13 is a schematic diagram of a sixth subframe structure for CAA resource detection according to an embodiment of the present invention;

FIG. 14 is a schematic diagram of a seventh subframe structure for CAA resource detection according to an embodiment of the present invention;

FIG. 15 is a schematic diagram of a frame structure in Example 1 in the first method according to an embodiment of the present invention;

FIG. 16 is a schematic diagram of a frame structure in Example 2 in the first method according to an embodiment of the present invention;

FIG. 17 is a flowchart of a second instance in the first method according to an embodiment of the present invention;

FIG. 18 is a schematic diagram of a first structure between an SRS subframe and an ordinary subframe in the second instance in the first method according to the present invention;

FIG. 19 is a schematic diagram of a second structure between an SRS subframe and an ordinary subframe in the second instance in the first method according to the present invention;

FIG. 20 is a schematic diagram of a preferred example of the second structure between an SRS subframe and an ordinary subframe in the second instance in the first method according to the present invention;

FIG. 21 is a schematic diagram of a first subframe structure for CAA resource detection in Embodiment 2 of the first method according to the present invention;

FIG. 22 is a schematic diagram of a second subframe structure for CAA resource detection in Embodiment 2 of the first method according to the present invention;

FIG. 23 is a schematic diagram of a third subframe structure for CAA resource detection in Embodiment 2 of a second method according to the present invention;

FIG. 24 is a schematic diagram of a fourth subframe structure for CAA resource detection in Embodiment 2 of the second method according to the present invention;

FIG. 25 is a schematic diagram of a frame structure in a first specific example of the first method according to the present invention;

FIG. 26 is a schematic diagram of a frame structure in a second specific example of the first method according to the present invention;

FIG. 27 is a schematic diagram of a frame structure in a third specific example of the first method according to the present invention;

FIG. 28 is a schematic diagram of a frame structure in a fourth specific example of the first method according to the present invention;

FIG. 29 is a schematic diagram of a frame structure in a fifth specific example of the first method according to the present invention;

FIG. 30 is a flowchart of an instance method in a second method according to an embodiment of the present invention;

FIG. 31 is a schematic diagram of a frame structure in Example 1 of the second method according to the present invention;

FIG. 32 is a schematic diagram of a structure of a first SRS subframe example in the second method according to the present invention;

FIG. 33 is a schematic diagram of a first subframe structure of the second method according to the present invention;

FIG. 34 is a schematic diagram of a second subframe structure of the second method according to the present invention;

FIG. 35 is a schematic diagram of a frame structure in Example 3 of the second method according to the present invention;

FIG. 36 is a structural diagram of a first user equipment according to an embodiment of the present invention;

FIG. 37 is a structural diagram of a second user equipment according to an embodiment of the present invention;

FIG. 38 is a flowchart according to Embodiment 3 of the present invention;

FIG. 39 is a schematic diagram of determining an SRS subframe according to Embodiment 3 of the present invention; and FIG. 40 is another schematic diagram of determining an SRS subframe according to Embodiment 3 of the present invention.

MODE FOR THE INVENTION

To make the objectives, technical means and advantages of the present application clearer, the present application will be further described below in details with reference to the accompanying drawings.

In order to effectively reduce the mutual hindrance between different uplink physical channels/signals and increase the transmission probability of the uplink physical channels/signals when an uplink signal is transmitted on the basis of LBT, the present application adopts methods shown in FIG. 1 and FIG. 30.

The following description will be given by taking the uplink physical channel being a PUSCH and the uplink physical signal being an SRS as example. FIG. 1 is a flowchart of a first method for transmitting and receiving a signal according to an embodiment of the present application, specifically comprising the following steps.

Step 101: By a terminal, a scheduling signaling transmitted by a transmitting node is received, wherein the scheduling signaling and/or the configuration signaling is used for indicating an uplink physical channel and/or uplink signal.

In this step, the transmitting node can be an eNB.

Step 102: By the terminal, whether a gap is to be reserved between a potential SRS symbol and a PUSCH symbol is decided, and a time-frequency resource mapping of an SRS and/or a PUSCH is determined according to the result of decision.

In this step, the gap and the uplink physical channel and/or uplink signal share one OFDM symbol.

In this step, if the result of decision is YES, a gap is reserved between the uplink signal and/or the uplink physical channel when determining the time-frequency resource mapping of the SRS and/or the PUSCH.

Step 103: By the terminal, the PUSCH and/or the SRS is transmitted, or the PUSCH and/or the SRS is quit being scheduled and transmitted.

Preferably, this step can further comprise performing CCA detection on a predefined resource. The terminal determines whether to transmit a signal according to the result of the CCA detection.

In one embodiment, the present application is suitable not only for an unauthorized frequency band carrier, but also for carriers of other types, such as uplink physical channels of other types.

The following description will be given by taking two specific examples. In one example, the determination of a time-frequency resource for the PUSCH and various preferred solutions of the CCA detection performed for transmitting the PUSCH are provided. In the other example, the determination of a time-frequency resource for the SRS and various preferred solution of the CCA detection performed for transmitting the SRS are provided. The two embodiments can be used in combination.

In the following two examples, an unauthorized frequency band carrier is used as an application scenario.

First Instance

As shown in FIG. 2, FIG. 2 is a flowchart of a first instance in the first method according to an embodiment of the present invention, specifically comprising the following steps.

Step 201: By a terminal, a scheduling signaling transmitted by a transmitting node is received.

Preferably, the transmitting node can be an eNB, or can be a User Equipment (UE) or a terminal of other type. In this embodiment, the description is given by taking the transmitting node being an eNB as example.

Preferably, the terminal can be a UE, or can be a terminal of other type. In this embodiment, the description is given by taking the terminal being a UE as example.

Preferably, the scheduling signaling transmitted by the transmitting node can be an uplink channel grant signal (UL grant) for scheduling PUSCH transmission, or can be a physical layer signaling for scheduling SRS transmission only, or can be a physical layer signaling for scheduling DL physical channels and/or signals of other types.

Preferably, the scheduling signaling transmitted by the transmitting node can configure a resource for performing CCA detection by the terminal. For example, the eNB can configure, through a RRC signaling, a resource for performing a particular type of CCA detection by the UE. Further, the indicated resource for CCA detection is a certain frequency resource, for example, one or more frequency-domain transmission combs (transmissionComb).

Step 202: By the terminal, whether a gap is to be reserved between a potential SRS symbol and a PUSCH symbol is decided, and a time-frequency resource mapping of a PUSCH is determined according to the result of decision.

In this step, the determining a time-frequency resource mapping of a PUSCH according to predefined rules or according to the indication carried in the received scheduling signaling will be described below in details.

(1) A method for determining a time-frequency resource mapping of a PUSCH according to predefined rules is as follows.

(a) Whether a subframe transmitted between the terminal and the transmitting node is an SRS subframe is decided.

Way 1: If the subframe is an SRS subframe, the PUSCH cannot be mapped to a potential SRS OFDM symbol. Preferably, the potential SRS OFDM symbol is the last OFDM symbol of the SRS subframe, so that the PUSCH cannot be mapped to the last OFDM symbol of the subframe. Preferably, the potential SRS OFDM symbol is the first OFDM symbol of the SRS subframe, so that the PUSCH cannot be mapped to the first OFDM symbol of the subframe. If the subframe is not an SRS subframe, the PUSCH can be mapped to a potential SRS OFDM symbol. For example, the PUSCH can be mapped to all OFDM symbols of a subframe.

Way 2: If the subframe is an SRS subframe, the length of a PUSCH symbol previous to the potential SRS symbol is less than that of an OFDM symbol, and a gap is reserved between the PUSCH symbol and the potential SRS symbol. Otherwise, the length of a PUSCH symbol previous to the potential SRS symbol is equal to that of an OFDM symbol, and there is no gap between the PUSCH symbol and the potential SRS symbol. As shown in FIG. 3, FIG. 3 is a schematic diagram of a first SRS structure of the first instance in the first method according to an embodiment of the present invention.

Preferably, the length of the gap between the PUSCH symbol and the potential SRS symbol is about 25 μs.

Preferably, the length of the gap between the PUSCH symbol and the potential SRS symbol is about 34 μs.

Preferably, the shortened PUSCH symbol is merely mapped to a particular transmission comb on the frequency domain. For example, the particular transmission comb is a certain transmission comb within a PRB scheduled by the eNB. The transmission comb can be predefined or indicated by the eNB.

Preferably, the shortened PUSCH symbol consists of a CP and at least one time-domain sample value. The time-domain sample value is one of a multiple of repeated time-domain sample values generated in the time-domain by the frequency-domain PUSCH signal after time-frequency conversion.

Preferably, the shortened PUSCH symbol can be regarded as a result of truncating first X sampling points from the end of a complete OFDM symbol, i.e., removing the tail. Or, the shortened PUSCH symbol can be regarded as a result of truncating last X sampling points from the starting point of a complete OFDM symbol, i.e., removing the head.

Way 3: If the subframe is an SRS subframe and the potential SRS symbol is located at the first OFDM symbol of the SRS subframe, the length of a PUSCH symbol next to the potential SRS symbol is less than that of an OFDM symbol, and a gap is reversed between the potential SRS symbol and the PUSCH symbol. Otherwise, the length of a PUSCH symbol next to the potential SRS symbol is equal to that of an OFDM symbol, and there is no gap between the potential SRS symbol and the PUSCH symbol. As shown in FIG. 4, FIG. 4 is a schematic diagram of a second SRS structure of the first instance in the first method according to an embodiment of the present invention.

Preferably, the length of the gap between the potential SRS symbol and the PUSCH symbol is about 25 μs.

Preferably, the length of the gap between the potential SRS symbol and the PUSCH symbol is about 34 μs.

Preferably, the shortened PUSCH symbol is merely mapped to a particular transmission comb on the frequency domain. For example, the particular transmission comb is a certain transmission comb within a PRB scheduled by the eNB. The transmission comb can be predefined or indicated by the eNB.

Preferably, the shortened PUSCH symbol consists of a CP and at least one time-domain sample value. The time-domain sample value is one of a multiple of repeated time-domain sample values generated in the time-domain by the frequency-domain PUSCH signal after time-frequency conversion.

Preferably, the shortened PUSCH symbol can be regarded as a result of truncating first X sampling points from the end of a complete OFDM symbol, i.e., removing the tail. Or, the shortened PUSCH symbol can be regarded as a result of truncating last X sampling points from the starting point of a complete OFDM symbol, i.e., removing the head. As shown in FIG. 5, FIG. 5 is a schematic diagram of a third SRS structure of the first instance in the first method according to an embodiment of the present invention.

Way 4: If the subframe is an SRS subframe and if the potential SRS symbol is located at the last OFDM symbol of the SRS subframe, the length of a PUSCH symbol previous to the potential SRS symbol (i.e., the thirteenth OFDM symbol of the subframe) is the length of a complete OFDM symbol, and the occupied frequency-domain resource cannot contain a predefined resource reserved for the CCA detection of the SRS, that is, the occupied frequency-domain resource is not used for CCA detection of the SRS, for example, a particular transmission comb or PRB. Otherwise, the length of the last PUSCH OFDM symbol of the subframe is equal to that of an OFDM symbol, and mapping is performed according to the frequency-domain resource indicated in the UL grant.

The above ways can be used alone, or used in combination. Although only two examples have been given, the practical application is certainly not limited to the two examples. For example, Way 1 and Way 2 can be used together. In other words, in the SRS subframe, the PUSCH can only be mapped to the first 13 OFDM symbols, and the length of the last OFDM symbol (the thirteenth OFDM symbol) of the PUSCH is less than that of a complete OFDM symbol.

(b) Whether a subframe transmitted between the terminal and the transmitting node is a subframe adjacent to the SRS subframe is decided.

Way 1: If the subframe is a subframe immediately previous to the SRS subframe and if the potential SRS symbol is located at the first OFDM symbol of the SRS subframe, the length of a PUSCH symbol previous to the potential SRS symbol (i.e., the last OFDM symbol of the subframe) is less than that of an OFDM symbol, and a gap is reserved between the PUSCH symbol and the potential SRS symbol. Otherwise, the length of the last OFDM symbol of the subframe is equal to that of an OFDM symbol, and there is no gap between the PUSCH symbol and the potential SRS symbol.

The specific implementation can refer to Way 2 in (a). As shown in FIG. 6, FIG. 6 is a schematic diagram of a fourth SRS structure of the first instance in the first method according to an embodiment of the present invention.

Way 2: If the subframe is a subframe immediately next to the SRS subframe and if the potential SRS symbol is located at the last OFDM symbol of the SRS subframe, the length of a PUSCH symbol next to the potential SRS symbol (i.e., the first OFDM symbol of the subframe) is less than that of an OFDM symbol, and a gap is reserved between the potential SRS symbol and the PUSCH symbol. Otherwise, the length of the first OFDM symbol of the subframe is equal to that of an OFDM symbol, and there is no gap between the potential SRS symbol and the PUSCH symbol.

The specific implementation can refer to Way 3 in (a). As shown in FIG. 7, FIG. 7 is a schematic diagram of a fifth SRS structure of the first instance in the first method according to an embodiment of the present invention.

Way 3: If the subframe is a subframe immediately previous to the SRS subframe and if the potential SRS symbol is located at the first OFDM symbol of the SRS subframe, the length of a PUSCH symbol previous to the potential SRS symbol (i.e., the last OFDM symbol of the subframe) is the length of a complete OFDM symbol, and the occupied frequency-domain resource cannot contain a predefined resource reserved for CCA detection of the SRS, that is, the occupied frequency-domain resource is not used for CCA detection of the SRS, for example, a particular transmission comb or PRB. Otherwise, the length of the last OFDM symbol of the subframe is equal to that of an OFDM symbol, and mapping is performed according to the frequency-domain resource indicated in the UL grant.

Whether the subframe meets neither the (a) nor the (b) is decided. If so, the PUSCH can occupy all available time-domain resources. For example, for a complete uplink subframe, the PUSCH can occupy 14 complete OFDM symbols.

The ways can be used alone, or used in combination.

(2) A method for determining a time-frequency resource mapping of the PUSCH according to the indication carried in the received scheduling signaling is as follows.

Way 1: If the signaling indication is a predefined value X1, the PUSCH cannot be mapped to the potential SRS OFDM symbol. If the signaling indication is a predefined value X2, the PUSCH can be mapped to the potential SRS OFDM symbol. For example, X1="0", and X2="1".

Way 2: If the signaling indication is a predefined value X1, the length of a PUSCH symbol previous to the potential SRS symbol is less than that of an OFDM symbol and a gap is reserved between the PUSCH symbol and the potential SRS symbol. If the signaling indication is a predefined value X2, the length of a PUSCH symbol previous to the potential SRS symbol is equal to that of an OFDM symbol and there is no gap between the PUSCH symbol and the potential SRS symbol.

Note that Way 1 and Way 2 can be combined to form Way 2'. In other words, if the signaling indication is a predefined value X1, the PUSCH cannot be mapped to the potential SRS OFDM symbol, the length of a PUSCH symbol previous to the potential SRS symbol is less than that of an OFDM symbol, and a gap is reserved between the PUSCH symbol and the potential SRS symbol. If the signaling indication is a predefined value X2, the PUSCH can be mapped to the potential SRS OFDM symbol, the length of a PUSCH symbol previous to the potential SRS symbol is equal to that of an OFDM symbol, and there is no gap between the PUSCH symbol and the potential SRS symbol.

Way 3: If the signaling indication is a predefined value X1, the length of a PUSCH symbol next to the potential SRS symbol is less than that of an OFDM symbol and a gap is reserved between the potential SRS symbol and the PUSCH symbol. If the signaling indication is a predefined value X2, the length of a PUSCH symbol next to the potential SRS symbol is equal to that of an OFDM symbol and there is no gap between the potential SRS symbol and the PUSCH symbol.

Note that Way 1 and Way 3 can be combined to form Way 3'. In other words, if the signaling indication is a predefined value X1, the PUSCH cannot be mapped to the potential SRS OFDM symbol, the length of a PUSCH symbol next to the potential SRS symbol is less than that of an OFDM symbol, and a gap is reserved between the potential SRS symbol and the PUSCH symbol. If the signaling indication is a predefined value X2, the PUSCH can be mapped to the potential SRS OFDM symbol, the length of a PUSCH symbol next to the potential SRS symbol is equal to that of an OFDM symbol, and there is no gap between the PUSCH symbol and the potential SRS symbol.

Note that Way 1, Way 2 and Way 3 can be combined to form Way 3". In other words, if the signaling indication is a predefined value X1, the PUSCH cannot be mapped to the potential SRS OFDM symbol, the length a PUSCH symbol previous to the potential SRS symbol is less than that of an OFDM symbol, and a gap is reserved between the PUSCH symbol and the potential SRS symbol; and, the length of a PUSCH symbol next to the potential SRS symbol is less than that of an OFDM symbol, and a gap is reserved between the potential SRS symbol and the PUSCH symbol. If the signaling indication is a predefined value X2, the PUSCH can be mapped to the potential SRS OFDM symbol, the length of a PUSCH symbol previous to or next to the potential SRS symbol is equal to that of an OFDM symbol, and there is no gap between the PUSCH symbol and the potential SRS symbol.

Preferably, the methods for determining the time-frequency resource mapping of the PUSCH in Way 1, Way 2 and Way 3 are valid for any subframe that is scheduled to transmit the PUSCH. For example, if a UE receives an UL grant in a subframe n, a PUSCH of a subframe n+4 is scheduled, and the UL grant indicates a time-frequency resource mapping of the PUSCH, the PUSCH of the subframe n+4 is mapped in accordance with the indication.

Preferably, the methods for determining the time-frequency resource mapping of the PUSCH in Way 1, Way 2 and Way 3 are merely valid for a cell-specific SRS subframe only. In other words, for a non-cell-specific SRS subframe, the UE considers that the indication carried in the received scheduling signaling does not influence the time-frequency resource mapping of the PUSCH, that is, the PUSCH can be mapped to the potential SRS OFDM symbol. The eNB can set a corresponding indication bit as a predefined fixed value. For example, if the UE receives an UL grant in a subframe n, PUSCHs of subframes n+4 and n+5 are scheduled, and the UL grant indicates a time-frequency resource mapping of a PUSCH, where the subframe n+4 is not a cell-specific SRS subframe and subframe n+5 is a cell-specific SRS subframe, the PUSCH of only the subframe n+5 is mapped in accordance with the indication.

Preferably, the methods for determining the time-frequency resource mapping of the PUSCH in Way 1, Way 2 and Way 3 are merely valid for a particular subframe. For example, the methods are merely valid for the first subframe of an uplink transmission burst. For example, if a UE receives an UL grant in a subframe n, PUSCHs of subframes n+4 and n+5 are scheduled, and the UL grant indicates a time-frequency resource mapping of a PUSCH, the PUSCH of only the subframe n+4 is mapped in accordance with the indication.

The ways can be used alone, or used in combination.

Here, note that the PUSCH being unable to be mapped to the potential SRS OFDM symbol can be further classified into the following: if, in a cell-specific SRS subframe but not a UE-specific SRS subframe, when the cell-specific SRS bandwidth is overlapped with the PRB for the PUSCH, the PUSCH cannot be mapped to the potential SRS OFDM symbol; or otherwise, the PUSCH can be mapped to the potential SRS OFDM symbol. If in a UE-specific SRS subframe, the PUSCH cannot be mapped to the potential SRS OFDM symbol. This belongs to the prior art, and will not be repeated in the present application.

Step 203: By the terminal, the PUSCH is transmitted or quit being transmitted according to the information.

Preferably, this step can further comprise: by the terminal, performing CCA detection on a predefined CCA resource, and transmitting the scheduled PUSCH or quitting transmitting the scheduled PUSCH according to the result of the CCA detection.

(1) The determining, by the terminal, the predefined CCA resource can be performed by one or more of the following methods.

(a) Decide whether the subframe is an SRS subframe:

Way 1: If the subframe is an SRS subframe, and the potential SRS OFDM symbol is previous to a PUSCH OFDM symbol (for example, the potential SRS OFDM symbol is the first OFDM symbol of the SRS subframe), the predefined CCA resource at least contains the potential SRS OFDM symbol.

Preferably, Way 1 can be corresponding to Way 1 in the (a) of (1) of the step 202, or can be corresponding to Way 1 in (2) of the step 202. As shown in FIG. 8, FIG. 8 is a schematic diagram of a first subframe structure for CAA resource detection according to Embodiment 1 of the present invention.

Way 2: If the subframe is an SRS subframe, and the potential SRS OFDM symbol is previous to a PUSCH OFDM symbol (for example, the potential SRS OFDM symbol is the first OFDM symbol of the SRS subframe), the predefined CCA resource at least contains a predefined gap, and the gap is a gap between the potential SRS OFDM symbol and the first PUSCH OFDM symbol next to the potential SRS OFDM symbol. As shown in FIG. 9, FIG. 9 is a schematic diagram of a second subframe structure for CAA resource detection according to an embodiment of the present invention.

Preferably, Way 2 can be corresponding to "Way 3 or Way 3+Way 1" in the (a) of (1) of the step 202, or can be corresponding to "Way 3, or Way 3+Way 1, or Way 3+Way 2" in (2) of the step 202, or can also be corresponding to Way 2 in (b) of (1) of the step 202. In other words, the potential SRS OFDM symbol is a complete OFDM symbol, an OFDM symbol of the PUSCH next to the potential SRS OFDM symbol is a shortened OFDM symbol, and the predefined CCA resource at least comprises a gap between the both; or, the potential SRS OFDM symbol is a shortened OFDM symbol, an OFDM symbol for the PUSCH next to the potential SRS OFDM symbol is a complete OFDM symbol, and the predefined CCA resource at least comprises a gap between the both.

Way 3: If the subframe is an SRS subframe, and the potential SRS OFDM symbol is previous to a PUSCH OFDM symbol (for example, the potential SRS OFDM symbol is the first OFDM symbol of the SRS subframe), the predefined CCA resource at least contains a predefined gap and the potential SRS OFDM symbol. The gap is a gap between the potential SRS OFDM symbol and the first PUSCH OFDM symbol next to the potential SRS OFDM symbol. As shown in FIG. 10, FIG. 10 is a schematic diagram of a third subframe structure for CAA resource detection according to an embodiment of the present invention.

Preferably, Way 3 herein can be corresponding to "Way 3+Way 1" in (a) of (1) of the step 202, or can be corresponding to "Way 3+Way 1" in (2) of the step 202, or can also be corresponding to Way 2 in (1) of the step 1602.

For Way 1 to Way 3, if the current subframe is not an SRS subframe and the potential SRS OFDM symbol in the SRS subframe defined by the system is previous to a PUSCH OFDM symbol, the current subframe does not contain the CCA resource described in this embodiment, but can have a CCA resource of other types, for example, a CCA resource before an UL burst. This is not limited in the present application.

Way 4: If the subframe is an SRS subframe, and the potential SRS OFDM symbol is next to a PUSCH OFDM symbol (for example, the potential SRS OFDM symbol is the last OFDM symbol of the SRS subframe), the predefined CCA resource at least contains the potential SRS OFDM symbol. As shown in FIG. 11, FIG. 11 is a schematic diagram of a fourth subframe structure for CAA resource detection according to an embodiment of the present invention.

Preferably, Way 4 can be corresponding to Way 1 in (a) of (1) of the step 202, or can be corresponding to Way 1 in (2) of the step 202.

For Way 4, if the current subframe is not an SRS subframe and the potential SRS OFDM symbol defined by the system is next to a PUSCH OFDM symbol, it is necessary to further decide whether the current subframe is a subframe next to the SRS subframe according to the (b) so as to determine the CCA resource. For Way 4, if the current subframe is an SRS subframe, and the potential SRS OFDM symbol defined by the system is next to a PUSCH OFDM symbol, it is also necessary to further decide whether a subframe next to the SRS subframe also contains the CCA resource according to the (b), or directly decide that a subframe next to the SRS subframe does not contain the CCA resource. Similarly, the subframe can have CCA resources of other types, for example, a CCA resource before an UL burst. This is not limited in the present application.

Way 5: If the subframe is an SRS subframe, and the potential SRS OFDM symbol is next to a PUSCH OFDM symbol (for example, the potential SRS OFDM symbol is the last OFDM symbol of the SRS subframe), the predefined CCA resource at least contains a gap between the potential SRS OFDM symbol and the first PUSCH symbol of the next subframe, or the predefined CCA resource at least contains the potential SRS OFDM symbol and a gap between the potential SRS OFDM symbol and the first PUSCH symbol of the next subframe.

Preferably, Way 5 herein can be corresponding to Way 1+Way 3 in (a) of (1) of the step 202, or can be corresponding to "Way 3+Way 1" in (2) of the step 202, or can be corresponding to Way 2 in (1) of the step 1602, that is, the SRS is a shortened OFDM symbol and the tail is vacated. As shown in FIG. 12, FIG. 12 is a schematic diagram of a fifth subframe structure for CAA resource detection according to an embodiment of the present invention.

(b) Decide whether the subframe is a subframe immediately next to the SRS subframe:

Way 1: If the subframe is a subframe immediately next to the SRS subframe, and the potential SRS OFDM symbol in the SRS subframe is next to a PUSCH OFDM symbol (for example, the potential SRS OFDM symbol is the last OFDM symbol of the SRS subframe), the predefined CCA resource at least contains a predefined gap. The gap is a gap between the potential SRS OFDM symbol and the first PUSCH OFDM symbol of the current subframe. As shown in FIG. 12, FIG. 12 is a schematic diagram of a fifth subframe structure for CAA resource detection according to an embodiment of the present invention.

Preferably, Way 1 herein can be corresponding to Way 2 in the (b) of (1) of the step 202, or can be corresponding to Way 3 in (2) of the step 202.

Preferably, Way 1 can be corresponding to Way 3 in (a) of (1) of the step 202.

The CCA resource determined in the above ways contains two dimensions, i.e., a time-frequency resource and a frequency-domain resource. As a simpler method, it is assumed that all corresponding frequency-domain resources in the CCA time-domain resource determined in the above ways can be used for CCA detection. As another method, a part of corresponding frequency-domain resources in the CCA time-domain resource can be used for CCA detection, for example, a particular transmission comb or a particular PRB. The specific method can be corresponding to the method for determining PUSCH mapping in the step 202.

Note that examples of the ways corresponding to the ways in the step 202 are given in the various implementations described above. However, various implementations of this step can be combined with various corresponding ways in the step 202 in various forms, and the forms are not limited to the examples given above.

(2) Performing the CCA detection on the predefined resource can be determined by one or more of the following methods.

(a) If the UE has scheduled PUSCH transmission only in the current subframe but does not schedule PUSCH transmission in a previous subframe, or the UE has been scheduled but does not successfully transmit the PUSCH in the previous subframe, the US needs to perform LBT category 1.

The LBT category 1 is suitable for CCA detection before an UL burst. Preferably, LBT category 4 (Category 4, the specific LBT process can refer to a corresponding section in the TS 36.213, but specific parameters can be different) similar to the downlink LAA, or LBT category 2 (Category 2, FBE) can be adopted.

Preferably, the priority of the LBT category 1 is lower than that of the LBT category 2 described in (b). In other words, a contention window of the LBT category 1 is larger than that of the LBT category 2.

Preferably, the priority of the LBT category 1 is equal to that of the LBT category 2 described in (b).

Preferably, the CCA resource of the LBT category 1 should evade the SRS resource. For example, if the potential SRS OFDM symbol is located at the last OFDM symbol of the SRS subframe, the CCA resource for the LBT category 1 should completely evade the last OFDM symbol, or is at least prevented from being completely overlapped with the last OFDM symbol. For example, if the potential SRS OFDM symbol is located at the first OFDM symbol of the SRS subframe, the CCA resource for the LBT category 1 should completely evade the first OFDM symbol, or is at least prevented from being completely overlapped with the first OFDM symbol.

Preferably, the CCA resource for the LBT category 1 is fixed in each subframe. For example, if the eNB schedules the UE to transmit the PUSCH in a subframe n+4, regardless of whether or not the subframe n+4 or subframe n+3 is an SRS subframe, the CCA resource is the first OFDM symbol of the subframe n+4 or the last OFDM symbol of the subframe n+3.

Preferably, the CCA resource for the LBT category 1 is variable. As a preferred implementation, the CCA resource for the LBT category 1 changes in accordance with the SRS subframe, and always evades the potential SRS symbol. For example, it is assumed that the SRS is located at the last OFDM symbol of the SRS subframe. If the eNB schedules the UE to transmit the PUSCH in subframe n+4, and subframe n+3 is a cell-specific SRS subframe, the CCA resource is the first OFDM symbol of the subframe n+4, and the mapping of the PUSCH starts from the second OFDM symbol of the subframe n+4. As shown in FIG. 13, FIG. 13 is a schematic diagram of a sixth subframe structure for CCA resource detection according to an embodiment of the present invention. If the subframe n+3 is not a cell-specific SRS subframe, the CCA resource is the last OFDM symbol of the subframe n+3, and the mapping of the PUSCH starts from the first OFDM symbol of the subframe n+4. As shown in FIG. 4, FIG. 14 is a schematic diagram of a seventh subframe structure for CCA resource detection according to an embodiment of the present invention. For another example, if the subframe n+3 is a UE-specific SRS subframe, the CCA resource is the penultimate OFDM symbol of the subframe n+3, and the mapping of the PUSCH starts from the first OFDM symbol of the subframe n+4. Since the UE first transmits the SRS and then transmits the PUSCH in this case, this can be considered as LBT category 5 in the second instance. As a preferred implementation, the CCA resource for the LBT category 1 is determined according to the indication from the eNB. For example, the eNB can indicate the starting point of the CCA resource. Note that the LBT category 1 is merely limited to the case where the PUSCH is transmitted first, and the LBT, on which a case where the SRS is transmitted first and then followed by the PUSCH is based, is LBT category 5 described hereinafter.

(b) If the UE has scheduled PUSCH transmission in both the current subframe and a previous subframe, the UE has transmitted the PUSCH in the previous subframe and the PUSCH of the current subframe does not exceed the maximum occupancy time, the UE can continue to transmit the PUSCH in the current subframe without performing CCA detection if there is no gap between the two subframes.

For example, the previous subframe is a UE-specific SRS subframe, the potential SRS OFDM symbol is the last OFDM symbol of the SRS subframe, the length of the SRS is the length of a complete OFDM symbol, and the length of the first OFDM symbol of the current subframe is the length of a complete OFDM symbol. If the UE has transmitted the PUSCH in the previous subframe and has transmitted the SRS, the UE directly transmits the PUSCH in the current subframe without performing CCA.

If there is a gap between the two subframes, the UE needs to perform LBT category 2. The CCA length can be less than or equal to the time length of the CCA resource determined in (a) of the step 202.

If an LBT mechanism similar to the downlink LAA system (referring to the TS 36.213) is adopted in the LBT category 2, a contention window and/or a back-off counter of the LBT category 2 is less than or equal to that of the LBT category 1. The LBT category 2 can also adopt FBE.

Preferably, the back-off counter is 0 or 1, for example, one CCA.

Preferably, the CCA length is 25 μs (can be 16 μs defer+9 μs CCA slot) or 34 μs (16 μs defer+2*9 μs CCA slot).

Preferably, the CCA starting point of the LBT category 2 is fixed, i.e., the starting point of the CCA resource. Or, the CCA starting point of the LBT category 2 can be unfixed, that is, can be a proper position which is not prior to the starting point of the CCA resource and is before the ending point of the CCA resource.

Preferably, after the UE has passed the CCA of the LBT category 2, the UE directly transmits the scheduled physical channel and/or signal, without transmitting a signal for occupying the channel.

Preferably, after the UE has passed the CCA of the LBT category 2, the UE can transmit a signal for occupying a channel till to a boundary of the OFDM symbol or a predefined position, and then transmit the scheduled physical channel and/or signal. Wherein, the maximum length of the signal for occupying a channel is limited. Equivalently, the earliest starting point for transmitting the signal for occupying a channel is fixed, or the earliest starting point of the signal for occupying a channel is unfixed. The signal for occupying a channel can merely occupy a part of predefined frequency-domain resources, for example, a predefined PRB or a predefined transmission comb, or the occupied frequency-domain resources can also be not limited.

Preferably, in the LBT category 2, the CCA detection can be performed in a time-domain, or can also be performed in a frequency-domain. Preferably, when the CCA detection resource can contain entire frequency band resources, the UE is more suitable for performing CCA detection in a time-domain, and the CCA detection can be energy detection, not excluding sequence detection. Preferably, when the CCA detection resource merely contains a part of frequency band resources (for example, merely contains a part of transmission combs), the UE is more suitable for performing CCA detection in a frequency-domain, i.e., performing CCA detection on a frequency-domain reserved for the CCA or an equivalent time-domain detection.

The performing the frequency-domain CCA detection can be as follows: receiving complete time-domain sampling points, then converting them to a frequency-domain, and performing CCA detection on a corresponding frequency-domain resource. For example, the potential SRS OFDM symbol is a complete OFDM symbol, and there are total four transmission combs in the system. The SRS occupies the first transmission comb. Then, the UE can receive the complete potential SRS OFDM symbol on the time-domain, then convert it to the frequency-domain, and perform CCA energy detection on transmission comb 2.

As another implementation, the equivalent time-domain detection is as follows: the terminal can receive a part of time-domain sampling points first, then repeat the received time-domain sampling points and/or perform other processing on the received time-domain sampling points (e.g., multiplying by a phase factor and repeating or performing frequency-domain oversampling) so as to restore the effect of the complete time-domain sampling points, then convert them to the frequency-domain and perform CCA detection on a corresponding frequency-domain resource. For example, the potential SRS OFDM symbol is a complete OFDM symbol, and there are total four transmission combs in the system. The SRS occupies the first transmission comb. Then, the terminal can receive ½ of the potential SRS OFDM symbol on the time-domain, then repeat the received time-domain sampling points to restore the complete potential SRS OFDM symbol, then convert them to the frequency-domain and perform CCA energy detection on transmission comb 2.

(c) It is not required to perform CCA if there is no CCA resource.

(3) A method for transmitting the scheduled PUSCH or quitting transmitting the scheduled PUSCH according to the result of the CCA detection is as follows.

If it is not required to perform CCA, the scheduled physical channel and/or signal is transmitted directly.

If it is required to perform CCA, the CCA resource is determined according to (1) of the step 203, and CCA is performed according to (2) of the step 203. If the CCA is successful, the scheduled PUSCH can be transmitted; or otherwise, the PUSCH is quit being transmitted or delayed in transmitting. The mapping of the transmitted scheduled PUSCH is determined by the method described in (1) or (2) of the step 202.

It is to be noted that, the time for continuously transmitting the PUSCH and/or the SRS by the UE cannot exceed the maximum occupancy time, or the total time for continuously transmitting the PUSCH and/or the SRS by the UE and the PUSCH based on the LBT category 2 cannot exceed the maximum occupancy time. If the maximum occupancy time has been reached and the UE wants to continue to transmit the uplink signal, it is required to perform the LBT category 1.

To better explain the solutions of this embodiment, several examples will be given below, but the solutions of this embodiment are not limited to these examples. The present application supports all methods acquired by any combination of the steps and the implementations described above.

Example 1

It is assumed that the potential SRS OFDM symbol is located at the last OFDM symbol of the SRS subframe. In the SRS subframe, the terminal transmits the PUSCH but does not transmit the SRS, the PUSCH is mapped to first 13 OFDM symbols, each OFDM symbol is a complete OFDM symbol, and the last OFDM symbol is vacated, as described in Way 1 in (a) of (1) of the step 202.

It is assumed that the PUSCH is transmitted in a subframe immediately next to the SRS subframe, then the PUSCH of the first OFDM symbol is a shortened OFDM symbol, as described in Way 2 in (b) of (1) of the step 202.

It is assumed that subframe n is an SRS subframe, the terminal is scheduled the PUSCH transmission in the subframe n and subframe n+1, and the UE does not transmit the SRS in the subframe n.

Then, upon receiving a signaling for scheduling the subframe n and subframe n+1 to transmit the PUSCH, the terminal prepares the PUSCH in accordance with Way 1 in (a) of (1) of the step 202 and Way 2 in (b) of (1) of the step 202, respectively.

If the terminal has passed the CCA detection of the LBT category 1 in the subframe n and has successfully transmitted the PUSCH, the PUSCH is mapped to first 13 OFDM symbols, each OFDM symbol is a complete OFDM symbol and the last OFDM symbol is vacated, the terminal needs to perform CCA detection on the predefined CCA resource before transmitting the PUSCH in the subframe n+1. The predefined CCA resource contains the last OFDM symbol of the subframe n, and a gap between the first OFDM symbol of the subframe n+1 and the last OFDM symbol of the subframe n, as described in Way 3 in (a) of (1) of the step 202 and the way in (b) of (1) of the step 202. The terminal performs CCA detection on the CCA resource, for example, performs time-domain CCA from the starting point of the CCA resource. If one 25-μs CCA can be successful, a signal for occupying a channel begins to be transmitted, and the PUSCH begins to be transmitted after the gap. If there is no one successful CCA in the CCA resource, the PUSCH will not be transmitted. The whole process is shown in FIG. 15. FIG. 15 is a schematic diagram of an exemplary frame structure in the first method according to an embodiment of the present invention.

Example 2

It is assumed that the potential SRS OFDM symbol is located at the last OFDM symbol of the SRS subframe. In the SRS subframe, if the terminal transmits the SRS and the PUSCH, the PUSCH is mapped to first 13 OFDM symbols, each OFDM symbol is a complete OFDM symbol, and the last OFDM symbol transmits the SRS.

It is assumed that the PUSCH is not transmitted in a subframe immediately next to the SRS subframe, then the PUSCH of the first OFDM symbol is a shortened OFDM symbol.

It is assumed that subframe n is an SRS subframe, the terminal is scheduled the PUSCH transmission in subframe n and subframe n+1, the terminal transmits the SRS in subframe n.

Then, upon receiving a signaling for scheduling the subframe n and subframe n+1 to transmit the PUSCH, the terminal prepares the PUSCH in accordance with Way 1 in (a) of (1) of the step 202 and Way 2 in (b) of (1) of the step 202, respectively. If the terminal has passed the CCA detection of the LBT category 1 in the subframe n and has successfully transmitted the PUSCH, the PUSCH is mapped to first 13 OFDM symbols, each OFDM symbol is a complete OFDM symbol and the SRS is transmitted at the last OFDM symbol, the terminal needs to perform CCA detection on the predefined CCA resource before transmitting the PUSCH in the subframe n+1. The predefined CCA resource contains a gap between the first OFDM symbol of the subframe n+1 and the last OFDM symbol of the subframe n, as described in the way in (b) of (1) of the step 202. The UE performs CCA detection on the CCA resource, and the gap is assumed to be about 33.4 μs (the length of half of an OFDM symbol). Then, one time-domain CCA (the CCA length is 25 μs) is performed from the starting point of the CCA resource. If the CCA can be successful, the PUSCH is transmitted after the gap; or otherwise, the PUSCH is not transmitted. The whole process is shown in FIG. 16. FIG. 16 is a schematic diagram of a frame structure in Example 2 in the first method according to an embodiment of the present invention.

Example 3

It is assumed that the potential SRS OFDM symbol is located at the last OFDM symbol of the SRS subframe. In the SRS subframe, if the terminal transmits the PUSCH but does not transmit the SRS, how to transmit the PUSCH is determined according to the received indication via the signaling.

It is assumed that the PUSCH is transmitted in a subframe immediately next to the SRS subframe, each OFDM symbol of the PUSCH is a complete OFDM symbol.

It is assumed that subframe n is an SRS subframe, the terminal is scheduled the PUSCH transmission in subframe n and subframe n+1, the terminal does not transmit the SRS in subframe n. Then, upon receiving a signaling for scheduling the subframe n and subframe n+1 to transmit the PUSCH, the terminal prepares the PUSCH in accordance with Way 3 in (2) of the step 202.

If the terminal has successfully transmitted the PUSCH in the subframe n and if the signaling indication is a predefined value X1, the PUSCH prepared for the subframe n by the terminal cannot be mapped to the potential SRS OFDM symbol, and the length of the PUSCH symbol at the thirteenth OFDM symbol of the subframe n is less than the length of one OFDM symbol (that is, a gap (Gap1) is reserved between the PUSCH symbol and the potential SRS symbol), and the PUSCH for the subframe n+1 meets the condition that the length of the first PUSCH symbol is less than the length of one OFDM symbol (that is, a gap (Gap2) is reserved between the potential SRS symbol and the PUSCH symbol). If the signaling indication is a predefined value X2, the PUSCH for the subframe n can be mapped to the potential SRS OFDM symbol (i.e., can be mapped to 14 OFDM symbols), the PUSCH for the subframe n+1 can also be mapped to 14 OFDM symbols, and there is no gap between the PUSCHs for the two subframes.

If the signaling indication is the predefined value X1, and if the terminal has successfully transmitted the PUSCH in the subframe n, the terminal needs to perform CCA detection on a predefined CCA resource before transmitting the PUSCH in the subframe n+1. The predefined CCA resource contains Gap1, as described in the way in (b) of (1) of the step 202. The terminal performs CCA detection on the CCA resource, and the length of the gap is assumed to be 25 μs. Then, one time-domain CCA is performed from the starting point of the CCA resource. If the CCA can be successful, the PUSCH is transmitted after the gap; or otherwise, the PUSCH is not transmitted. If the signaling indication value is X2, and if the terminal has successfully transmitted the PUSCH in the subframe n, the UE can continue to transmit the PUSCH in the subframe n+1 without the LBT, as described in (a) of (1) of the step 202.

Second Instance

As shown in FIG. 17, FIG. 17 is a flowchart of a second instance in the first method according to an embodiment of the present invention, specifically comprising the following steps.

Step 1701: By a terminal, a scheduling signaling transmitted by a transmitting node is received.

The contents that are the same as the first instance will not be repeated here.

Preferably, the scheduling signaling for the SRS can contain SRS subframe information by indicating a subframe offset X from a predefined subframe as an SRS subframe. For example, the UE receives an SRS transmission trigger signaling in subframe n, and the subframe to transmit SRS can be indicated by the trigger signaling in the form of a subframe offset X from subframe n+4.

Preferably, the physical layer signaling for scheduling SRS transmission can be a trigger signaling indicative of multiple times of SRS transmission within a predefined time window. Preferably, the predefined time window is an uplink transmission burst, for example, a multiple of uplink subframes continuously transmitted by the scheduled UE at one time. Preferably, for the SRS, the SRS is transmitted in a UE-specific SRS subframe or a cell-specific SRS subframe or each uplink subframe or equal-gap subframes within the predefined time window. For example, the eNB transmits an UL grant in subframe n to schedule an uplink subframe of subframes n+4 to n+7 to transmit a PUSCH, and triggers the transmission of a non-cyclic SRS. It is assumed that subframes n+4 and n+6 are UE-specific SRS subframes. Then, the UL grant triggers the UE to transmit SRSs in two subframes n+4 and n+6 by using a same frequency-domain resource.

Step 1702: By the terminal, whether a gap is to be reserved between a potential SRS symbol and a PUSCH symbol is decided, and a time-frequency resource mapping of an SRS is determined according to the result of decision.

In this step, determining a time-frequency resource mapping of an SRS according to predefined rules or according to the indication carried in the received scheduling signaling will be described below in details.

(1) A method for determining a time-frequency resource mapping of an SRS according to predefined rules is as follows.

Whether the subframe is a predefined SRS subframe is decided. The predefined subframe is a UE-specific SRS subframe and/or cell-specific SRS subframe semi-statically configured by the eNB. If the subframe is not a predefined SRS subframe, it is not required to transmit an SRS; and, if the subframe is a predefined SRS subframe and it is required to transmit an SRS (it is expected to transmit the SRS, but whether the SRS is eventually transmitted can be determined according to whether the CCA is successful), the SRS mapping is prepared in one or more of the following ways:

Way 1: The potential SRS symbol is a shortened OFDM symbol, and a gap is reserved between the potential SRS symbol and a previous PUSCH symbol. As shown in FIG. 18, FIG. 18 is a schematic diagram of a first structure between an SRS subframe and an ordinary subframe in the second instance in the first method according to the present invention.

Way 2: The potential SRS symbol is a shortened OFDM symbol, and a gap is reserved between the potential SRS symbol and a next PUSCH symbol. As shown in FIG. 19, FIG. 19 is a schematic diagram of a second structure between an SRS subframe and an ordinary subframe in the second instance in the first method according to the present invention.

Preferably, the length of the gap between the PUSCH symbol and the potential SRS symbol is about 25 μs.

Preferably, the length of the gap between the PUSCH symbol and the potential SRS symbol is about 34 μs.

Preferably, the shortened potential SRS symbol consists of a CP and at least one time-domain sample value. The time-domain sample value is one of a multiple of repeated time-domain sample values generated in the time-domain by the frequency-domain SRS after time-frequency conversion. As shown in FIG. 20, FIG. 20 is a schematic diagram of a preferred example of the second structure between the SRS subframe and the ordinary subframe in the second instance in the first method according to the present invention.

Preferably, the shortened potential SRS symbol can be regarded as a result of truncating first X sampling points from the end of a complete OFDM symbol, i.e., removing the tail. Or, the shortened potential SRS symbol can be regarded as a result of truncating last X sampling points from the starting point of a complete OFDM symbol, i.e., removing the head.

Way 3: The potential SRS symbol is a complete OFDM symbol.

(2) A method for determining a time-frequency resource mapping of the SRS according to the indication carried in the received scheduling signaling is as follows.

Way 1: A value of the received physical layer triggering indication is decided. If the value is a predefined value X1, SRSs, to be transmitted in the subframe n+k (k=4+X) or multiple predefined SRS subframes starting from subframe n+k, wherein the subframe n is the subframe receiving the physical layer triggering indication (it is expected to transmit the SRSs, but whether the SRSs are eventually transmitted can be determined according to whether the CCA is successful). Wherein, the potential SRS symbol is a shortened OFDM symbol, and a gap is reserved between the potential SRS symbol and a previous PUSCH symbol. If the signaling indication is a predefined value X2, the potential SRS symbol is a complete OFDM symbol. For example, X1="0", and X2="1". The predefined subframe is a UE-specific SRS subframe and/or cell-specific SRS subframe semi-statically configured by the eNB.

Way 2: A value of the received physical layer triggering indication is decided. If the value is a predefined value X1, SRSs, to be transmitted in the subframe n+k (k=4+X) or multiple predefined SRS subframes starting from subframe n+k, wherein the subframe n is the subframe receiving the physical layer triggering indication (it is expected to transmit the SRSs, but whether the SRSs are eventually transmitted can be determined according to whether the CCA is successful). Wherein, the potential SRS symbol is a shortened OFDM symbol, and a gap is reserved between the potential SRS symbol and a next PUSCH symbol. If the signaling indication is a predefined value X2, the potential SRS symbol can be a complete OFDM symbol. For example, X1="0", and X2="1". The predefined subframe is a UE-specific SRS subframe and/or cell-specific SRS subframe semi-statically configured by the eNB.

Way 3: A value of the received physical layer triggering indication is decided. If the value is a predefined value X1, SRSs, to be transmitted in the subframe n+k (k=4+X) or multiple predefined SRS subframes starting from subframe n+k, wherein the subframe n is the subframe receiving the physical layer triggering indication (it is expected to transmit the SRSs, but whether the SRSs are eventually transmitted can be determined according to whether the CCA is successful). And if the value is a predefined value X2, SRS is not transmitted. For example, X1="0", and X2="1". It is to be noted that the subframe n+k in this way is not required to be a predefined SRS subframe, it is indicated by scheduling signaling in step 1701.

Preferably, the SRS to be transmitted can be a shortened OFDM symbol.

Preferably, the SRS to be transmitted can be a complete OFDM symbol.

Preferably, the methods for determining the time-frequency resource mapping of the SRS in Way 1, Way 2 and Way 3 can be merely valid for a particular subframe. For example, the methods are merely valid for a first subframe of an uplink transmission burst. For another example, the methods are merely valid for a cell-specific SRS subframe, or a user-specific SRS subframe, or a subframe in which a PUSCH is transmitted simultaneously.

The ways can be used alone, or used in combination.

Step 1703: By the terminal, the SRS is transmitted or quit being transmitted according to the information.

Preferably, this step can further comprise: by the terminal, performing CCA detection on a predefined CCA resource, and transmitting the SRS or quitting transmitting the SRS according to the result of the CCA detection.

(1) The determining, by the terminal, the predefined CCA resource can be performed by one or more of the following methods.

(a) Decide whether the subframe is an SRS subframe:

Way 1: If the subframe is an SRS subframe, and the potential SRS OFDM symbol is next to a PUSCH OFDM symbol (for example, the potential SRS OFDM symbol is located at the last OFDM symbol of the SRS subframe), the predefined CCA resource at least contains a gap. The gap is a gap between the potential SRS OFDM symbol and the previous PUSCH OFDM symbol. The gap can be entire frequency-domain resources or a part of frequency-domain resources within the gap.

Preferably, Way 1 can be corresponding to Way in (1) of the step 1702, or Way 1 in (2) of the step 1702, or Way 1, Way 3 or Way 1+Way 3 in (1) of the step 202.

Way 2: If the subframe is an SRS subframe, and the potential SRS OFDM symbol is next to a PUSCH OFDM symbol (for example, the potential SRS OFDM symbol is the last OFDM symbol of the SRS subframe), the predefined CCA resource at least contain a part of frequency-domain resources of one PUSCH OFDM symbol. The PUSCH symbol is a PUSCH OFDM symbol immediately previous to the potential SRS OFDM symbol.

Preferably, the frequency-domain resources are predefined transmission combs. On the predefined transmission combs, the eNB avoids scheduling PUSCH transmission or other signals transmitted by the UE. The predefined transmission combs are preserved for the CCA for SRS transmission.

Preferably, Way 1 can be corresponding to Way 4 in (a) of (1) of the step 202, or can be corresponding to Way 3 in (b) of (1) of the step 202.

(b) Decide whether the subframe is a subframe previous to the SRS subframe:

Way 1: If the subframe is a subframe previous to the SRS subframe and the potential SRS OFDM symbol in the SRS subframe is the first OFDM symbol of the SRS subframe, the predefined CCA resource at least contains a gap between the potential SRS OFDM symbol and the last PUSCH OFDM symbol of the subframe previous to the SRS subframe. The gap can be entire frequency-domain resources or a part of frequency-domain resources within the gap.

Way 2: If the subframe is a subframe previous to the SRS subframe and the potential SRS OFDM symbol in the SRS subframe is the first OFDM symbol of the SRS subframe, the predefined CCA resource at least contains a part of frequency-domain resource of one PUSCH OFDM symbol. The PUSCH OFDM symbol is the PUSCH OFDM symbol immediately previous to the potential SRS OFDM symbol.

Note that examples of the way of corresponding to the step 1702 are given in the various implementations described above. However, various implementations of this step can be combined with various corresponding ways in the step 1702 in various forms, and the forms are not limited to the examples given above.

(2) The performing the CCA detection on a predefined resource can be determined by one or more of the following methods. The CCA detection length is less than or equal to the length of the CCA resource determined in the step 1702.

(a) If the UE has successfully transmitted the PUSCH prior to the SRS and the PUSCH plus the potential SRS symbol does not exceed the maximum occupancy time, the UE can directly transmit the SRS without performing LBT. Preferably, the SRS and the PUSCH are chronologically continuous. Preferably, the chronological gap between the SRS and the PUSCH is less than L1. Preferably, L1 is approximately equal to 25 µs, 34 µs or a smaller value. For example, if the SRS is located at the last OFDM symbol of the SRS subframe, and the UE is scheduled the PUSCH transmission in the SRS subframe and has successfully transmitted the PUSCH, the UE can directly transmit the SRS without performing LBT. Or, if the SRS is located at the first OFDM symbol of the SRS subframe, and the UE is scheduled the PUSCH transmission in a subframe previous to the SRS subframe and has successfully transmitted the PUSCH, the UE can directly transmit the SRS without performing LBT. As shown in FIG. 21, FIG. 21 is a schematic diagram of a first subframe structure for CAA resource detection in Embodiment 2 of the first method according to the present invention.

(b) If the UE has successfully transmitted the PUSCH prior to the SRS and the PUSCH plus the potential SRS symbol does not exceed the maximum occupancy time, the UE can perform LBT category 3 and then transmit the SRS or SRS+PUSCH, and the PUSCH after summing the PUSCH prior to the SRS and the SRS does not exceed the maximum occupancy time. Preferably, the chronological gap between the SRS and the PUSCH is less than L1. Preferably, L1 is approximately equal to 25 µs, 34 µs or a smaller value. For example, if the SRS is located at the last OFDM symbol of the SRS subframe, and the UE is scheduled the PUSCH transmission in the SRS subframe and has successfully transmitted the PUSCH, the UE performs LBT category 3. Or, if the SRS is located at the first OFDM symbol of the SRS subframe, and the UE is scheduled the PUSCH transmission in a subframe previous to the SRS subframe and has successfully transmitted the PUSCH, the UE performs LBT category 3.

The LBT category 3 is based on the CCA resource defined in (1) of the step 1703.

As an implementation, the LBT category 3 can be the same as the LBT category 2.

The LBT category 3 can adopt an LBT mechanism similar to the downlink LAA system (referring to the TS 36.213), but its back-off counter is preferably 0 or 1. Or, the LBT category 3 can be one time CCA. As shown in FIG. 22, FIG. 22 is a schematic diagram of a second subframe structure for CAA resource detection in Embodiment 2 of the first method according to the present invention.

Preferably, the back-off counter of the LBT category 3 is 0 or 1, for example, one time CCA.

Preferably, the CCA length is 25 µs (can be 16 µs defer+9 µs CCA slot) or 34 µs (16 µs defer+2*9 µs CCA slot).

Preferably, the CCA starting point of the LBT category 3 is fixed, i.e., the starting point of the CCA resource. Or, the CCA starting point of the LBT category 3 can be unfixed, that is, can be a proper position which is not prior to the starting point of the CCA resource and is before the ending point of the CCA resource.

Preferably, after the UE has passed the CCA of the LBT category 3, the UE directly transmits the scheduled physical channel and/or signal, without transmitting a signal for occupying a channel.

Preferably, after the UE has passed the CCA of the LBT category 3, the UE can transmit a signal for occupying a channel till to a boundary of the OFDM symbol or a predefined position, and then transmit the scheduled physical channel and/or signal. Wherein, the maximum length of the signal for occupying a channel is limited. Equivalently, the earliest starting point for transmitting the signal for occupying a channel is fixed, or the earliest starting point of the signal for occupying a channel is unfixed. Wherein, the signal for occupying a channel can be mapped to a predefined frequency-domain resource, or is not limited.

Preferably, in the LBT category 3, the CCA detection can be performed in a time-domain, or can also be performed in a frequency-domain. Preferably, when the CCA detection resource can contain entire frequency band resources, the UE is more suitable for performing CCA detection in a time-domain, and the CCA detection can be energy detection, not excluding sequence detection. Preferably, when the CCA detection resource merely contains a part of frequency band resources (for example, merely contains a part of transmission combs), and the UE is more suitable for performing CCA detection in a frequency-domain, i.e., performing CCA detection on a frequency-domain reserved for the CCA or an equivalent time-domain detection.

The performing the frequency-domain CCA detection can be as follows: receiving complete time-domain sampling points, then converting to a frequency-domain, and performing CCA detection on a corresponding frequency-domain resource. For example, the PUSCH OFDM symbol previous to the potential SRS OFDM symbol is a complete OFDM symbol, and there are total four transmission combs in the system. The PUSCH occupies the first transmission comb. Then, the UE can receive the complete PUSCH OFDM symbol on the time-domain, then convert it to the frequency-domain, and perform CCA energy detection on transmission comb 2. As another implementation, the equivalent time-domain detection is as follows: the UE can receive a part of time-domain sampling points, then repeat the received time-domain sampling points and/or perform other processing on the received time-domain sampling points (e.g., multiplying by a phase factor and repeating or performing frequency-domain oversampling) so as to restore the effect of complete time-frequency sampling points, then convert them to the frequency-domain and perform CCA detection on a corresponding frequency-domain resource. For example, the PUSCH OFDM symbol previous to the potential SRS OFDM symbol is a complete OFDM symbol, and there are total four transmission combs in the system. The PUSCH occupies the first transmission comb. Then, the UE can receive ½ of the PUSCH OFDM symbol on the time-domain, repeat the received time-domain sampling points to restore the complete PUSCH OFDM symbol, then convert them to the frequency-domain and perform CCA energy detection on transmission comb 2.

(c) If the UE has not successfully transmitted the PUSCH prior to the SRS and there is no PUSCH scheduled after the SRS (the PUSCH is not transmitted), the UE can perform LBT category 4. For example, if the SRS is located at the last OFDM symbol of the SRS subframe, the UE does not transmit the PUSCH in the SRS subframe, and the UE does not schedule the PUSCH in a subframe next to the SRS subframe, the UE performs LBT category 4 before transmitting the SRS. Or, if the SRS is located at the first OFDM symbol of the SRS subframe, the UE does not transmit the PUSCH in a subframe previous to the SRS subframe and the SRS subframe does not schedule the PUSCH, the UE performs LBT category 4 before transmitting the SRS.

The LBT category 4 is based on the CCA resource defined in (1) of the step 1703.

Preferably, the LBT category 4 has the same LBT priority as the LBT category 3.

Preferably, the LBT category 4 has a higher or lower LBT priority than the LBT category 3. In other words, the back-off counter of the LBT category 4 can be smaller or larger.

The specific way of the LBT category 4 refers to the LBT category 3 described in (b).

The LBT category 4 can adopt an LBT mechanism similar to the downlink LAA system (referring to the TS 36.213), but its back-off counter is preferably 0 or 1. Or, the LBT category 4 can be one time CCA. As shown in FIG. 23, FIG. 23 is a schematic diagram of a third subframe structure for CAA resource detection in Embodiment 2 of the first method according to the present invention.

(d) If the UE has not successfully transmitted the PUSCH prior to the SRS, schedules the PUSCH after the SRS and wants to transmit the PUSCH, the UE can perform LBT category 5. For example, if the SRS is located at the last OFDM symbol of the SRS subframe, the UE does not transmit the PUSCH in the SRS subframe, and the UE does not schedule the PUSCH in a subframe next to the SRS subframe, the UE performs LBT category 5 before transmitting the SRS. Or, if the SRS is located at the first OFDM symbol of the SRS subframe, the UE does not transmit the PUSCH in a subframe previous to the SRS subframe and the SRS subframe does not schedule the PUSCH, the UE performs LBT category 5 before transmitting the SRS.

The LBT category 5 can be based on the CCA resource defined in (1) of the step 1703, or other CCA resources.

The LBT category 5 can adopt the same parameters as the LBT category 1. It is to be noted that the CCA resource can be different when both the LBT category 5 and the LBT category 1 adopt the same LBT parameters. For example, since the SRS is first transmitted in the LBT category 5, it is required to perform CCA on a resource previous to the potential SRS symbol; however, since the PUSCH is first transmitted in the LBT category 1, this limitation is not applicable.

Preferably, the LBT category 5 has a lower LBT priority than both the LBT category 3 and the LBT category 4. As shown in FIG. 24, FIG. 24 is a schematic diagram of a fourth subframe structure for CAA resource detection in Embodiment 2 of the first method according to the present invention.

(3) A method for transmitting the SRS or quitting transmitting the scheduled SRS according to the result of the CCA detection is as follows.

(a) If it is not required to perform CCA, the SRS is transmitted directly.

(b) If it is required to perform CCA, a CCA resource is determined according to (1) of the step 1703, and CCA is performed according to (2) of the step 1703. If the CCA is successful, the SRS can be transmitted; or otherwise, the SRS is quit being transmitted or delayed in transmitting. The mapping of the transmitted SRS is determined by the method in (1) or (2) of the step 1702.

(c) If there is no PUSCH that has been successfully transmitted (including the PUSCH not scheduled or scheduled but not transmitted successfully) at an OFDM symbol immediately previous to the potential SRS OFDM symbol, the UE does not need to transmit the SRS, or the UE does not need to transmit a cyclic SRS; or otherwise, (a) or (b) is carried out.

(d) If there is no PUSCH that has been successfully transmitted (including the PUSCH not scheduled or scheduled but not transmitted successfully) at an OFDM symbol immediately previous to the potential SRS OFDM symbol, and there is no scheduled PUSCH in a subframe immediately next to the potential SRS OFDM symbol, the UE does not need to transmit the SRS, or the UE does not need to transmit a cyclic SRS; or otherwise, (a) or (b) is carried out.

Example 1

It is assumed that the potential SRS OFDM symbol is located at the last OFDM symbol of the SRS subframe, the potential SRS OFDM symbol is a shortened OFDM symbol, and there is a gap of 34 µs between the potential SRS OFDM symbol and a PUSCH immediately previous to the potential SRS OFDM symbol. The UE prepares the SRS in the Way 1 in (1) of the step 1702.

It is assumed that subframe n is a UE-specific SRS subframe, the UE is scheduled the PUSCH transmission in the subframe n, and the UE has successfully transmitted the PUSCH in the subframe n. That is, the UE transmits the PUSCH at first 13 OFDM symbols of the subframe n. The UE performs LBT category 3 on a predefined CCA resource, i.e., performs CCA detection on the CCA resource determined in (b) of (2) of the step 1703. Then, the process is performed in accordance with the (b) of (3) of the step 1703. In other words, if the CCA is successful, the SRS is transmitted; and if the CCA is failed, the SRS is quit being transmitted or delayed in transmitting.

To better explain the combinations of the SRS solutions in this embodiment and the PUSCH solutions in this embodiment, several examples will be given below, but the present invention is not limited to these examples. The present invention supports all methods acquired by any combination of the steps and the implementations described above.

Example 1

It is assumed that the potential SRS OFDM symbol is located at the last OFDM symbol of the SRS subframe. In the SRS subframe, if the UE transmits the PUSCH but does not transmit the SRS, the PUSCH is mapped to first 13 OFDM symbols, each OFDM symbol is a complete OFDM symbol, and the last OFDM symbol is vacated, as described in Way 1 in (a) of (1) of the step 202. If the UE transmits both the SRS and the PUSCH in the SRS subframe, the PUSCH is mapped to first 13 OFDM symbols, and the SRS is mapped to the last OFDM symbol which is a complete OFDM symbol, as described in Way 1 in (a) of (1) of the step 202 and Way 3 in (1) of the step 1702. If the UE transmits the PUSCH in a subframe next to the SRS subframe, the PUSCH of the first OFDM symbol is a shortened OFDM symbol, so that there is a gap (for example, 33.4 µs) between the potential SRS symbol and a PUSCH OFDM symbol immediately next to the potential SRS symbol, as described in Way 2 in (b) of (1) of the step 202.

It is assumed that subframe n is a cell-specific SRS subframe, while subframe n+1 is not a cell-specific SRS subframe. UE1 is scheduled the PUSCH transmission in subframe n and subframe n+1 and the subframe n is not a UE-specific SRS subframe for the UE1, so the UE1 does not transmit the SRS. UE2 is scheduled the PUSCH transmission in subframe n and subframe n+1 and the subframe n is a UE-specific SRS subframe for the UE2, so the UE2 will transmit the SRS.

The UE1 prepares a PUSCH for the subframe n in the Way 1 in (a) of (1) of the step 202, where this PUSCH is mapped to 13 complete OFDM symbols (the first to thirteen OFDM symbols); and the UE1 prepares a PUSCH for the subframe n+1 in the Way 2 in (b) of (1) of the step 202, where this PUSCH is mapped to 13 complete OFDM symbols (the second to fourteen OFDM symbols) and a shortened OFDM symbol (the first OFDM symbol, with a gap reserved from the starting point). The UE2 prepares a PUSCH for the subframe n in the Way 1 in (a) of (1) of the step 202, where this PUSCH is mapped to 13 complete OFDM symbols (the first to thirteen OFDM symbols); the UE2 prepares a PUSCH for the subframe n+1 in the Way 2 in (b) of (1) of the step 202, where this PUSCH is mapped to 13 complete OFDM symbols (the second to fourteen OFDM symbols) and a shortened OFDM symbol (the first OFDM symbol, with a gap reserved from the starting point); and the UE2 prepares an SRS at a complete OFDM symbol (the fourteen OFDM symbol) to be transmitted in the subframe n in the Way 3 in (1) of the step 1702.

It is assumed that the UE1/UE2 has accomplished the LBT category 1 before the subframe n, the UE1 starts to transmit the PUSCH in the subframe n, and the UE2 starts to transmit the PUSCH and SRS in the subframe n. Meanwhile, the UE1 and UE2 perform CCA detection on predefined CCA resources, respectively, wherein the UE1 performs the LBT category 2 on a predefined CCA resource in the way in (b) of (1) of the step 203 and/or Way 4 in (a) of (1) of the step 203 and the way in (b) of (2) of the step 203 (FIG. 25 shows the ways in (b) of (1) of the step 203 and in (b) of (2) of the step 202); performs LBT category 2 on predefined CCA resources, and transmits the PUSCH in the subframe n+1 if the CCA detection is successful, where the first OFDM symbol of the transmitted PUSCH is a shortened OFDM symbol; or otherwise does not transmit the PUSCH if the CCA detection is failed. The UE2 performs LBT category 2 on a predefined CCA resource in the way in (b) of (1) of the step 203 and the way in (b) of (2) of the step 203; then transmits the PUSCH in the subframe n+1 if the CCA detection is successful, where first OFDM symbol of the transmitted PUSCH is a shortened OFDM symbol; or otherwise does not transmit the PUSCH if the CCA detection is failed. The whole process is shown in FIG. 25. FIG. 25 is a schematic diagram of a frame structure in the first specific example of the first method according to the present invention.

Example 2

It is assumed that the potential SRS OFDM symbol is located at the last OFDM symbol of the SRS subframe. In the SRS subframe, if the UE transmits the PUSCH but does not transmit the SRS, the PUSCH is mapped to first 13 OFDM symbols, each OFDM symbol is a complete OFDM symbol, and the last OFDM symbol is vacated, as described in Way 1 in (a) of (1) of the step 202. If the UE transmits both the SRS and the PUSCH in the SRS subframe, the PUSCH is mapped to first 13 OFDM symbols, and the SRS is mapped to the last OFDM symbol which is a shortened OFDM symbol so that there is a gap between the SRS and an OFDM symbol immediately previous to the SRS, as described in Way 1 in (a) of (1) of the step 202 and Way 1 in (1) of the step 1702. It is assumed that the UE transmits a PUSCH in a subframe immediately next to the SRS subframe, and the PUSCH of each OFDM is a complete OFDM symbol.

It is assumed that, in the SRS configuration information received by the UE in the step 1702, the configuration signaling for the SRS cannot contain a UE-specific SRS subframe configuration. Then, the UE considers all cell-specific SRS subframes as UE-specific SRS subframes, that is, the UE can transmit SRSs in all the cell-specific SRS subframes. In other words, all UEs in a same cell can transmit SRSs in a same subframe.

It is assumed that subframe n is a cell-specific SRS subframe, while subframe n+1 is not a cell-specific SRS subframe. UE1 is scheduled to transmit a PUSCH in subframe n and subframe n+1, and UE1 will transmit an SRS in the subframe n. UE2 is not scheduled to transmit a PUSCH in subframe n and subframe n+1, but UE2 will transmit an SRS in the subframe n.

In this case, the UE1 prepares a PUSCH for the subframe n in the Way 1 in (a) of (1) of the step 202, where this PUSCH is mapped to 13 complete OFDM symbols (the first to thirteen OFDM symbols); then prepares a PUSCH for the subframe n+1 in accordance with the prior art, where this PUSCH is mapped to 14 complete OFDM symbols; and prepares an SRS of a shortened OFDM symbol to be transmitted in the subframe n in the Way 1 in (1) of the step 1702 (it has a vacated head and is located at the fourteen OFDM symbol). The UE2 prepares an SRS of a shortened OFDM symbol to be transmitted in the subframe n in the Way 1 in (1) of the step 1702 (it has a vacated head and is located at the fourteen OFDM symbol).

It is assumed that the UE has accomplished the LBT category 1 before the subframe n, and the UE starts to transmit the PUSCH in the subframe n. Meanwhile, the UE1 and UE2 perform CCA detection on predefined CCA resources, respectively. The UE1 performs LBT category 3 detection on a predefined CCA resource in the Way 1 in (a) of (1) of the step 1703 and the way in (b) of (2) of the step 1703, while the UE2 performs LBT category 4 on a predefined CCA resource in the Way 1 in (a) of (1) of the step 1703 and the way in (c) of (2) of the step 1703. If the CCA detection for the UE2 is successful, the UE2 can transmit the SRS; or otherwise, the UE2 quits transmitting the SRS. If the CCA detection for the SRS of the UE1 is successful, the UE1 can transmit the SRS, and transmit the PUSCH for the subframe n+1; however, if the CCA detection is failed, the UE1 quits transmitting the SRS and can continue to perform LBT category 1 or 2. If the CCA detection is successful, the UE1 can transmit the PUSCH in the subframe n+1; or otherwise the UE1 cannot transmit the PUSCH. The whole process refers to FIG. 26. FIG. 26 is a schematic diagram of a frame structure in the second specific example of the first method according to the present invention.

Example 3

It is assumed that the potential SRS OFDM symbol is located at the last OFDM symbol of the SRS subframe. There is a gap (Gap1) between the last PUSCH previous to the potential SRS symbol and the potential SRS symbol. For example, the potential SRS OFDM symbol is a shortened OFDM symbol, with a resource reserved at the head; or the last PUSCH previous to the SRS is a shortened OFDM symbol, with a resource reserved at the tail. And, there is a gap (Gap2) between the first PUSCH next to the potential SRS symbol and the potential SRS symbol. For example, the first PUSCH next to the SRS is a shortened OFDM symbol, with a resource reserved at the head; or the potential SRS OFDM symbol is a shortened OFDM symbol, with a resource reserved at the tail.

Before transmitting the SRS, the UE performs LBT category 3 or 4 on all of or a part of resources in the Gap1; and, before transmitting the PUSCH for a first subframe next to the SRS subframe, the UE performs LBT category 2 on all of or a part of resources in the Gap2. The whole process refers to FIG. 27. FIG. 27 is a schematic diagram of a frame structure in the third specific example of the first method according to the present invention.

Example 4

It is assumed that the potential SRS OFDM symbol is located at the last OFDM symbol of the SRS subframe. In the SRS subframe, if the UE transmits the PUSCH but does not transmit the SRS, the PUSCH is mapped to first 13 OFDM symbols, each OFDM symbol is a complete OFDM symbol, and the last OFDM symbol is vacated, as described in Way 1 in (a) of (1) of the step 202. If the UE transmits both the SRS and the PUSCH in the SRS subframe, the PUSCH is mapped to first 13 OFDM symbols, and the SRS is mapped to the last OFDM symbol which is a complete OFDM symbol, as described in Way 1 in (a) of (1) of the step 202 and Way 3 in (1) of the step 1702. If the UE transmits the PUSCH in a subframe immediately next to the SRS subframe, the PUSCH of the first OFDM symbol is a shortened OFDM symbol, so that there is no gap between the potential SRS symbol and a PUSCH OFDM symbol immediately next to the potential SRS symbol, or between the potential SRS symbol and a PUSCH OFDM symbol immediately previous to the potential SRS symbol.

It is assumed that the SRS configuration information received by the UE in the step 1702 can contain an SRS frequency-domain resource. The SRS frequency-domain resource at least contains transmission comb information. The transmission comb information can be UE-specific transmission comb information. However, in a predefined case, the eNB needs to configure transmission combs of all UEs in this cell into one or more transmission combs, and reserve a part of transmission combs that are not used for SRS transmission. Preferably, the reserved transmission combs can be used for PUSCH transmission, or used for transmission of a signal for occupying a channel, or used for CCA detection. In this example, there are total four transmission comb available resources in the system, the SRSs of all UEs in the cell merely occupy the first or third transmission comb, and the second and fourth transmission combs are reserved and do not transmit any signal.

It is assumed that subframe n is a cell-specific SRS subframe, while subframe n+1 is not a cell-specific SRS subframe. UE1 is scheduled to transmit the PUSCH in subframe n and subframe n+1, the subframe n is not a UE-specific SRS subframe for the UE1, and the UE1 does not transmit the SRS. UE2 is scheduled to transmit the PUSCH in subframe n and subframe n+1, the subframe n is a UE-specific SRS subframe for the UE2, and the UE2 transmits the SRS.

In this case, the UE1 prepares a PUSCH for the subframe n in the Way 1 in (a) of (1) of the step 202, where this PUSCH is mapped to 13 complete OFDM symbols (the first to thirteen OFDM symbols); and prepares a PUSCH for the subframe n+1 in accordance with the prior art, where this PUSCH is mapped to 14 complete OFDM symbols. The UE2 prepares a PUSCH for the subframe n in the Way 1 in (a) of (1) of the step 202, wherein this PUSCH is mapped to 13 complete OFDM symbols (the first to thirteen OFDM symbols); then prepares a PUSCH for the subframe n+1 in accordance with the prior art, where this PUSCH is mapped to 14 complete OFDM symbols; and prepares a potential SRS symbol for the subframe n in accordance with the prior art, where the potential SRS symbol is mapped to a configured transmission comb (e.g., transmission comb 1) in the frequency-domain and mapped to a complete OFDM symbol in the time-domain.

It is assumed that the UE1/UE2 has accomplished the LBT category 1 before the subframe n, the UE2 starts to transmit the PUSCH and SRS in the subframe n and transmit the PUSCH in the subframe n+1 without performing any CCA, and the UE1 starts to transmit the PUSCH in the subframe n and performs CCA detection on all of or a part of predefined CCA resources. The time-domain resource of the predefined CCA resource is as described in the Way 3 in (a) of (1) of the step 203, and the CCA frequency-domain resource merely contains a corresponding particular transmission comb in the time-domain resource, for example, transmission comb 2. In other words, the predefined CCA resource is transmission comb 2 in the last OFDM symbol of the subframe n. The UE1 performs LBT category 2 on the CCA resource. For example, the first half of the last OFDM symbol is received to obtain a time-domain sample ½, then this process is repeated to generate a time-domain sample ¾, energy detection is performed on transmission comb 2 in the frequency-domain, and/or CCA detection is simultaneously performed in the time-domain. If the CCA detection is successful, the UE1 can transmit the PUSCH for the subframe n+1; or otherwise, the UE1 quits transmitting the PUSCH. The whole process is shown in FIG. 28. FIG. 28 is a schematic diagram of a frame structure in the fourth specific example of the first method according to the present invention.

Example 5

It is assumed that the potential SRS OFDM symbol is located at the last OFDM symbol of the SRS subframe. In a cell-specific SRS subframe but not in a UE-specific SRS subframe, whether the PUSCH can be mapped to the potential SRS OFDM symbol is indicated by the received dynamic physical layer signaling, as the Way 1 in (2) of the step 202. If the UE transmits an SRS and a PUSCH in a UE-specific SRS subframe, the SRS is mapped to the last OFDM symbol which is a shortened OFDM symbol with a vacated tail, so that there is a gap between the SRS and the first PUSCH signal of the next subframe, as the Way 2 in (1) of the step 1702.

It is assumed that subframe n and subframe n+2 are cell-specific SRS subframes, while subframe n+1 is not a cell-specific SRS subframe. UE1 is scheduled to transmit the PUSCH in subframes n to n+2, among which only subframe n is a UE-specific SRS subframe for the UE1, so the UE1 also transmits the SRS in the subframe n. UE2 is scheduled to transmit the PUSCH in subframes n to n+2 and the three subframes are not UE-specific SRS subframes for the UE2, so the UE2 does not transmit the SRS.

The UE1 prepares PUSCHs for subframes n to n+2 in the Way 1 in (2) of the step 202. It is assumed that the received dynamic physical layer signal indication value for the subframe n is X1 and the received dynamic physical layer signal indication value for the subframe n+2 is X2, then the PUSCH prepared for the subframe n by the UE1 is mapped to 13 complete OFDM symbols (the first to thirteen OFDM symbols), and the PUSCHs prepared for the subframes n+1 and n+2 by the UE1 are mapped to 14 complete OFDM symbols.

Meanwhile, the SRS prepared for the subframe n by the UE1 is mapped to the last OFDM symbol, the SRS is a shortened potential SRS OFDM symbol, with a gap vacated at the tail.

The UE2 prepares PUSCHs for subframes n to n+2 in the Way 1 in (2) of the step 202. It is assumed that the received dynamic physical layer signal indication value for the subframe n is X1 and the received dynamic physical layer signal indication value for the subframe n+2 is X2, then the PUSCH prepared for the subframe n by the UE2 is mapped to 13 complete OFDM symbols (the first to thirteen OFDM symbols), and the PUSCHs prepared for the subframes n+1 and n+2 by the UE2 are mapped to 14 complete OFDM symbols.

It is assumed that the UE1/UE2 has accomplished the LBT category 1 before the subframe n, the UE2 starts to transmit the PUSCH in the subframe n, and the UE1 starts to transmit the PUSCH and SRS in the subframe n. Meanwhile, the UE1 and UE2 perform CCA detection on predefined CCA resources, respectively, wherein the UE1 performs LBT category 2 on a predefined CCA resource in the Way 5 in (a) of (1) of the step 203 and the way in (b) of (2) of the step 202; transmits the PUSCH in the subframes n+1 and n+2 if the CCA detection is successful, where each OFDM symbol of the transmitted PUSCH is a complete OFDM symbol; or otherwise does not transmit the PUSCH if the CCA detection is failed. The UE2 performs LBT category 2 on a predefined CCA resource in the Way 4 and/or 5 in (a) of (1) of the step 203 and the way in (b) of (2) of the step 203; then transmits the PUSCH in the subframes n+1 and n+2 if the CCA detection is successful, where each OFDM symbol of the transmitted PUSCH is a complete OFDM symbol; or otherwise does not transmit the PUSCH. If the CCA detection is failed, the UE can also perform CCA LBT category 1; and if the CCA detection is successful, the UE can transmit the PUSCH in a scheduled subframe. This is not limited in this embodiment. The whole process is shown in FIG. 29. FIG. 29 is a schematic diagram of a frame structure in the fifth specific example of the first method according to the present invention.

Embodiment 2

The following description will be given by taking the uplink physical channel being a PUSCH and the uplink physical signal being an SRS as example. FIG. 30 is a flowchart of a second method for transmitting and receiving a signal according to an embodiment of the present application, specifically comprising the following steps.

Step 3001: By a terminal, a scheduling signaling transmitted by a transmitting node is received, wherein the scheduling signaling and/or the configuration signaling is used for indicating an uplink physical channel and/or uplink signal.

Preferably, the transmitting node can be an eNB, or can be a UE or a terminal of other type. In this embodiment, the description is given by taking the transmitting node being an eNB as example.

Preferably, the terminal can be a UE, or can be a terminal of other type. In present invention, the description is given by taking the terminal being a UE as example.

Preferably, the scheduling signal transmitted by the transmitting node can be an UL grant for scheduling a PUSCH, or can be a physical layer signaling merely for scheduling SRS transmission, or can be a physical layer signaling for scheduling DL physical channels and/or signals of other types, or can be merely a configuration signaling for the SRS. The configuration signaling for the SRS can be a high-layer signal, or a physical layer signaling.

Preferably, the configuration signaling for the SRS cannot contain a UE-specific SRS subframe configuration. In this case, the UE considers all cell-specific SRS subframes as UE-specific SRS subframes, that is, the UE can transmit SRSs in all the cell-specific SRS subframes. In other words, all UEs in a same cell can transmit SRSs in a same subframe.

Preferably, the UE-specific SRS subframe configuration contained in the SRS configuration signaling is the same as the cell-specific SRS subframe configuration. In this case, the UE considers all cell-specific SRS subframes as UE-specific SRS subframes, that is, the UE can transmit SRSs in all the cell-specific SRS subframes. In other words, all UEs in a same cell can transmit SRSs in a same subframe.

Its advantage is that SRSs of each UE are prevented from being dispersed in different subframes to influence the transmission of PUSCHs by other UEs.

Preferably, the configuration signaling for the SRS cannot contain a UE-specific SRS subframe configuration. The UE transmits a trigger signaling according to the received SRS, and determines that one or more subframes in the cell-specific SRS subframe can transmit the SRS. For example, if the UE transmits a trigger signaling according to the SRS received in subframe n, the UE can transmit the SRS in a cell-specific SRS subframe not prior to subframe n+4.

Preferably, the configuration signaling for the SRS can contain neither a UE-specific SRS subframe configuration nor a cell-specific SRS subframe configuration. The UE determines that one or more subframes can transmit the SRS according to the received SRS trigger signaling. For example, if the UE receives a trigger signaling in subframe n, the UE can transmit the SRS in subframe n+4. Preferably, the UE receives an SRS transmission trigger signaling in subframe n, and the received triggering signaling indicates a subframe offset X from a predefined subframe n+4, UE transmits SRS in subframe n+4+X.

Preferably, the configuration signaling for the SRS can contain an SRS frequency-domain resource. The SRS frequency-domain resource at least contains transmission comb information. The transmission comb information can be cell-specific transmission comb information. In other words, UEs in a same cell use the indicated cell-specific transmission comb, and the eNB will not configure UE-specific transmission comb information for UEs.

Preferably, the configuration signaling for the SRS can contain an SRS frequency-domain resource. The SRS frequency-domain resource at least contains transmission comb information. The transmission comb information can be UE-specific transmission comb information. However, in a predefined case, the eNB needs to configure transmission combs of all UEs in this cell into one or more transmission combs, and reserve a part of transmission combs that are not used for SRS transmission. Preferably, the reserved transmission combs can be used for PUSCH transmission, or used for transmission of a signal for occupying a channel, or used for CCA detection.

Preferably, the physical layer signaling for scheduling SRS transmission can be a trigger signaling indicative of multiple times of SRS transmission within a predefined time window. Preferably, the predefined time window is an uplink transmission burst, for example, a multiple of uplink subframes scheduled to continuously transmit by the UE at one time. Preferably, for the SRS, the SRS is transmitted in a UE-specific SRS subframe or a cell-specific SRS subframe or each uplink subframe or equal-gap subframes within the predefined time window. For example, the eNB transmits an UL grant in subframe n to schedule an uplink subframe of subframes n+4 to n+7 to transmit a PUSCH, and triggers the transmission of a non-cyclic SRS. It is assumed that subframes n+4 and n+6 are UE-specific SRS subframes. Then, the UL grant triggers the UE to transmit SRSs in two subframes n+4 and n+6 by using a same frequency-domain resource.

Preferably, the scheduling signaling transmitted by the transmitting node can configure a resource for performing CCA detection by the terminal. For example, the eNB can configure, through an RRC signaling, a resource for performing a particular type of CCA detection by the UE. Further, the indicated resource for CCA detection is a certain frequency resource, for example, one or more frequency-domain transmission combs (transmissionComb).

Preferably, when the scheduling and/or configuration signaling comprises a cell-specific SRS subframe configuration but does not comprise a UE-specific SRS subframe configuration, the transmitting, by the UE, the SRS and/or the PUSCH is: determining, by the UE, a subframe for transmitting the SRS according to a cell-specific SRS subframe;

when the scheduling and/or configuration signaling comprises a cell-specific SRS subframe configuration and a UE-specific SRS subframe configuration and the UE-specific SRS subframe configuration is the same as the cell-specific SRS subframe configuration, the transmitting, by the UE, the SRS and/or the PUSCH is: determining, by the UE, a subframe for transmitting the SRS according to a UE-specific SRS subframe;

when the scheduling and/or configuration signaling comprises neither a UE-specific SRS subframe configuration nor a cell-specific SRS subframe configuration, the transmitting, by the UE, the SRS and/or the PUSCH is: determining, by the UE, a subframe for transmitting the SRS with the reference to a subframe for which the received configuration signaling is;

when the scheduling and/or configuration signaling contains SRS subframe information and the information indicates a UE-specific SRS subframe by the indication of a subframe offset from a predefined subframe, the transmitting, by the UE, the SRS and/or the PUSCH is: determining, by the UE, a subframe for transmitting the SRS according to the UE-specific SRS subframe; and when the scheduling and/or configuration signaling contains an SRS frequency-domain resource and the SRS frequency-domain resource at least contains transmission comb information which can be cell-specific transmission comb information and/or UE-specific transmission comb information, the transmitting, by the UE, the SRS and/or the PUSCH is: determining, by the UE, a resource for transmitting the SRS according to the cell-specific transmission comb information and/or the UE-specific transmission comb information.

Step 3002: By the terminal, whether a predefined signal is to be transmitted on a predefined time-frequency resource within a potential SRS symbol is decided, and a time-frequency resource mapping of an SRS and/or a PUSCH is determined according to the result of decision.

In this step, the terminal subsequently transmits the uplink physical channel prior to or after the uplink signal. Here, the terminal decides whether the uplink signal is used for transmitting the SRS by other terminals. If so, the terminal maps a predefined signal on a predefined time-frequency resource within the uplink signal.

Step 3003: By the terminal, the PUSCH and/or the SRS is transmitted, or the PUSCH and/or the SRS is quit being scheduled and transmitted.

Preferably, this step can further comprise performing CCA detection on a predefined resource. Then, according to the result of the CCA detection, the SRS and/or the PUSCH is transmitted, or the SRS and/or the PUSCH is quit being transmitted.

In an embodiment, the present application is suitable not only for an unauthorized frequency band carrier, but also for carriers of other types, such as uplink physical channels of other types.

The following description will be given by taking two specific examples. In one example, the determination of a time-frequency resource for the PUSCH and various preferred solutions of the CCA performed for transmitting the PUSCH are provided. In the other example, the determination of a time-frequency resource for the SRS and various preferred solution of the CCA performed for transmitting the SRS are provided. The two embodiments can be combined.

In the following two examples, an unauthorized frequency band carrier is used as an application scenario.

Example 3

In the step 3002, whether a predefined signal is to be transmitted on a predefined time-frequency resource within a potential SRS symbol is decided according to the predefined rules or according to the indication carried in the received scheduling signaling, so that the time-frequency resource mapping of the PUSCH/SRS is determined. This will be specifically described below.

(1) A method for determining a time-frequency resource mapping of a PUSCH according to predefined rules is as follows.

Way 1: If the subframe is an SRS subframe, the PUSCH cannot be mapped to a predefined frequency-domain resource within a potential SRS OFDM symbol. Preferably, the PUSCH cannot be mapped to a transmission comb (transmissionComb) in the potential SRS OFDM symbol, by which one or more terminals in a cell can transmit the SRS. If the subframe is not an SRS subframe, the PUSCH can be mapped to a potential SRS OFDM symbol.

Preferably, for a case "the PUSCH cannot be mapped to a transmission comb (transmissionComb) in the potential SRS OFDM symbol, by which one or more terminals in a cell can transmit the SRS", the PUSCH can be mapped to a Physical Resource Block (PRB) which is not occupied by the SRS, or the PUSCH can be mapped to all of or a part of transmission combs which are not occupied by the SRS. For example, as shown in FIG. 32, FIG. 32 is a schematic structure diagram of Example 1 of an SRS subframe in the second method according to the present invention, wherein there are total four transmission comb resources in the LAA system, the SRS occupies two of the transmission comb resources (there is a subcarrier between the SRS resources on the frequency-domain), the PUSCH can occupy one of the transmission comb resources, and the other transmission comb resource is vacated and does not transmit any signal. The transmission comb occupied by the PUSCH can be located in a predefined PRB, or in a PRB scheduled by the eNB, for example, in a PRB indicated by the UL grant.

Furthermore, as another implementation of Way 1, if the subframe is an SRS subframe, the PUSCH cannot be mapped to a potential SRS OFDM symbol, but a signaling for occupying a channel can be transmitted on a frequency resource which is in the potential SRS OFDM symbol but is not occupied by the SRS.

(2) A method for determining a time-frequency resource mapping of the PUSCH according to the indication carried in the received scheduling signaling is as follows.

Way 1: If the signaling indication is a predefined value X1, the PUSCH cannot be mapped to a predefined frequency-domain resource within the potential SRS OFDM symbol. If the signaling indication is a predefined value X2, the PUSCH can be mapped to the potential SRS OFDM symbol.

Preferably, the methods for determining the time-frequency resource mapping of the PUSCH in the above ways are useful for any subframe that is scheduled the PUSCH transmission. For example, if a UE receives an UL grant in a subframe n, a PUSCH of a subframe n+4 is scheduled, and the UL grant indicates a time-frequency resource mapping of the PUSCH, the PUSCH of the subframe n+4 is mapped in accordance with the indication.

Preferably, the methods for determining the time-frequency resource mapping of the PUSCH in the above ways are merely valid for a cell-specific SRS subframe. In other words, for a non-cell-specific SRS subframe, the UE considers that the indication carried in the received scheduling signaling does not influence the time-frequency resource mapping of the PUSCH, that is, the PUSCH can be mapped to the potential SRS OFDM symbol. The eNB can set a corresponding indication bit as a predefined fixed value. For example, if the UE receives an UL grant in a subframe n, PUSCHs of subframes n+4 and n+5 are scheduled, and the UL grant indicates a time-frequency resource mapping of the PUSCHs, where the subframe n+4 is not a cell-specific SRS subframe and subframe n+5 is a cell-specific SRS subframe, the PUSCH of only the subframe n+5 is mapped in accordance with the indication.

Preferably, the methods for determining the time-frequency resource mapping of the PUSCH in the above ways are merely valid for a particular subframe. For example, the methods are merely valid for the first subframe of an uplink transmission burst. For example, if a UE receives an UL grant in a subframe n, PUSCHs of subframes n+4 and n+5 are scheduled, and the UL grant indicates a time-frequency resource mapping of a PUSCH, the PUSCH of only the subframe n+4 is mapped in accordance with the indication.

The ways can be used alone, or used in combination.

Here, note that the PUSCH being unable to be mapped to the potential SRS OFDM symbol can be further classified into the following: if, in a cell-specific SRS subframe but not a UE-specific SRS subframe, when the cell-specific SRS bandwidth is overlapped with the PRB for the PUSCH, the PUSCH cannot be mapped to the potential SRS OFDM symbol; or otherwise, the PUSCH can be mapped to the potential SRS OFDM symbol. If in a UE-specific SRS subframe, the PUSCH cannot be mapped to the potential SRS OFDM symbol. This belongs to the prior art, and will not be repeated in the present application.

Step 3003: By the terminal, whether the scheduled PUSCH is transmitted or quit being transmitted is determined according to the information.

Preferably, in the subframe, the terminal performs CCA detection on a predefined CCA resource, and transmits the scheduled PUSCH or quits transmitting the scheduled PUSCH according to the result of the CCA detection.

(1) The determining, by the terminal, the predefined CCA resource can be performed by one or more of the following methods.

Decide whether the subframe is an SRS subframe:

Way 1: If the subframe is an SRS subframe, and the potential SRS OFDM symbol is previous to a PUSCH OFDM symbol (for example, the potential SRS OFDM symbol is the first OFDM symbol of the SRS subframe), the predefined CCA resource at least contain the potential SRS OFDM symbol.

Preferably, Way 1 herein can be corresponding to Way 2 in (1) of the step 3002, or can be corresponding to Way 2 in (2) of the step 202. As shown in FIG. 33, FIG. 33 is a schematic diagram of a first subframe structure of the second method according to the present invention.

For Way 1, if the current subframe is not an SRS subframe and the potential SRS OFDM symbol defined by the system is previous to a PUSCH OFDM symbol, the current subframe does not contain the CCA resource described in this embodiment, but can have CCA resources of other types, for example, a CCA resource before an UL burst. This is not limited in the present application.

Way 2: If the subframe is an SRS subframe, and the potential SRS OFDM symbol is next to a PUSCH OFDM symbol (for example, the potential SRS OFDM symbol is the last OFDM symbol of the SRS subframe), the predefined CCA resource at least contains the potential SRS OFDM symbol. As shown in FIG. 34, FIG. 34 is a schematic diagram of a second subframe structure of the second method according to the present invention.

Preferably, Way 2 herein can be corresponding to Way 1 in (a) of (1) of the step 202 or Way 1 in (2) of the step 202, or can be corresponding to Way 1 in (1) of the step 3002.

For Way 2, if the current subframe is not an SRS subframe and the potential SRS OFDM symbol of the SRS subframe defined by the system is next to a PUSCH OFDM symbol, it is necessary to further decide whether the current subframe is a subframe next to the SRS subframe so as to determine the CCA resource. For Way 2, if the current subframe is an SRS subframe, and the potential SRS OFDM symbol defined by the system is next to a PUSCH OFDM symbol, it is also necessary to further decide whether a subframe next to the SRS subframe also contains the CCA resource, or directly decide that a subframe next to the SRS subframe does not contain the CCA resource. Similarly, the subframe can have CCA resources of other types, for example, a CCA resource before an UL burst. This is not limited in the present application.

Note that examples of the way of corresponding to the step 202 are given in the various implementations described above. However, various implementations of this step can be combined with various corresponding ways in the step 202 in various forms, and the forms are not limited to the examples given above.

(2) The performing the CCA detection on the predefined resource can be performed by one or more of the following methods.

(a) If the UE has scheduled PUSCH transmission only in the current subframe but does not schedule PUSCH transmission in a previous subframe, or the UE has been scheduled but does not successfully transmit the PUSCH in the previous subframe, the US needs to perform LBT category 1.

The LBT category 1 is suitable for CCA detection before an UL burst. Preferably, LBT category 4 (Category 4, the specific LBT process can refer to a corresponding section in the TS 36.213, but specific parameters can be different) similar to the downlink LAA, or LBT category 2 (Category 2, FBE) can be adopted.

Preferably, in the LBT category 1, the CCA detection can be performed in a time-domain, or can also be performed in a frequency-domain.

Preferably, the CCA resource of the LBT category 1 should evade the SRS resource. For example, if the potential SRS OFDM symbol is located at the last OFDM symbol of the SRS subframe, the CCA resource for the LBT category 1 should completely evade the last OFDM symbol, or is at least prevented from being completely overlapped with the last OFDM symbol. For example, if the potential SRS OFDM symbol is located at the first OFDM symbol of the SRS subframe, the CCA resource for the LBT category 1 should completely evade the first OFDM symbol, or is at least prevented from being completely overlapped with the first OFDM symbol.

Preferably, the time resource for the CCA of the LBT category 1 should contain an SRS time resource, but should evade the frequency-domain resource for the SRS. Preferably, when the UE performs CCA detection in a frequency-domain, the UE performs CCA detection on a frequency-domain resource reserved for the CCA, or equivalent time-domain detection.

The performing the frequency-domain CCA detection can be as follows: first receiving complete time-domain sampling points, then converting them to a frequency-domain, and performing CCA detection on a corresponding frequency-domain resource. For example, the potential SRS OFDM symbol is a complete OFDM symbol, and there are total four transmission combs in the system. The SRS occupies the first transmission comb. Then, the UE can receive the complete potential SRS OFDM symbol on the time-domain, then convert it to the frequency-domain, and perform CCA energy detection on transmission comb 2.

As another implementation, the equivalent time-domain detection is as follows: the terminal can receive a part of time-domain sampling points first, then repeat the received time-domain sampling points and/or perform other processing on the received time-domain sampling points (e.g., multiplying by a phase factor and repeating or performing frequency-domain oversampling) so as to restore the effect of the complete time-domain sampling points, then convert them to the frequency-domain and perform CCA detection on a corresponding frequency-domain resource. For example, the potential SRS OFDM symbol is a complete OFDM symbol, and there are total four transmission combs in the system. The SRS occupies the first transmission comb. Then, the terminal can receive ½ of the potential SRS OFDM symbol on the time-domain, then repeat the received time-domain sampling points to restore the complete potential SRS OFDM symbol, then convert them to the frequency-domain and perform CCA energy detection on transmission comb 2.

Preferably, the CCA resource for the LBT category 1 is fixed in each subframe. For example, if the eNB schedules the UE to transmit the PUSCH in a subframe n+4, regardless of whether or not the subframe n+4 or subframe n+3 is an SRS subframe, the CCA resource is the first OFDM symbol of the subframe n+4 or the last OFDM symbol of the subframe n+3.

Preferably, the CCA resource for the LBT category 1 is variable. As a preferred implementation, the CCA resource for the LBT category 1 changes in accordance with the SRS subframe, and always evades the potential SRS symbol. For example, it is assumed that the SRS is located at the last OFDM symbol of the SRS subframe. If the eNB schedules the UE to transmit the PUSCH in subframe n+4, and subframe n+3 is a cell-specific SRS subframe, the CCA resource is the first OFDM symbol of the subframe n+4, and the mapping of the PUSCH starts from the second OFDM symbol of the subframe n+4. If subframe n+3 is not a cell-specific SRS subframe, the CCA resource is the last OFDM symbol of the subframe n+3, and the mapping of the PUSCH starts from the first OFDM symbol of the subframe n+4. As a preferred implementation, the CCA resource for the LBT category 1 is determined according to the indication from the eNB. For example, the eNB can indicate the starting point of the CCA resource.

(b) If the UE is scheduled for PUSCH transmission in both the current subframe and a previous subframe, the UE has transmitted the PUSCH in the previous subframe and the PUSCH of the current subframe does not exceed the maximum occupancy time, the UE can continue to transmit the PUSCH in the current subframe without performing CCA detection if there is no gap between the two subframes.

For example, the previous subframe is a UE-specific SRS subframe, the potential SRS OFDM symbol is the last OFDM symbol of the SRS subframe, the length of the SRS is the length of a complete OFDM symbol, and the length of the first OFDM symbol of the current subframe is the length of a complete OFDM symbol. If the UE has transmitted the PUSCH in the previous subframe and has transmitted the SRS, the UE directly transmits the PUSCH in the current subframe without performing CCA. Or, if the previous subframe is a cell-specific SRS subframe but not a UE-specific SRS subframe, and the UE maps the PUSCH to a part of frequency-domain resource of the potential SRS OFDM symbol, the PUSCH of the previous subframe and the PUSCH of the next subframe are continuous in the time-frequency, and there is no gap between the two subframes, so that the UE does not need to perform CCA detection.

(3) A method for transmitting the scheduled physical channel and/or signal, or quitting transmitting the scheduled physical channel and/or signal, according to the result of the CCA detection is as follows.

(a) If it is not required to perform CCA, the scheduled PUSCH is transmitted directly.

(b) If it is required to perform CCA, a CCA resource is determined according to (1) of the step 3003, and CCA is performed according to (2) of the step 3003. If the CCA is successful, the scheduled PUSCH can be transmitted; or otherwise, the PUSCH is quit being transmitted or delayed in transmitting. The mapping of the transmitted scheduled PUSCH is determined by the method described in (1) or (2) of the step 3002.

It is to be noted that, the time for continuously transmitting the PUSCH and/or the SRS by the UE cannot exceed the maximum occupancy time, or the total time for continuously transmitting the PUSCH and/or the SRS by the UE and the PUSCH based on the LBT category 2 cannot exceed the maximum occupancy time. If the maximum occupancy time has been reached and the UE wants to continue to transmit the uplink signal, it is required to perform LBT category 1.

To better explain the solutions of this embodiment, several examples will be given below, but the solutions of this embodiment are not limited to these examples. The present application supports all methods acquired by any combination of the steps and the implementations described above.

Example 1

It is assumed that the potential SRS OFDM symbol is located at the last OFDM symbol of the SRS subframe. In the SRS subframe, if the terminal transmits a PUSCH but does not transmit an SRS, the PUSCH is mapped to first 13 OFDM symbols, each OFDM symbol is a complete OFDM symbol, and the PUSCH is mapped to a part of frequency-domain resources of the last OFDM symbol, for example, a second transmission comb (wherein the second transmission comb is a transmission comb that is reserved and not used for transmitting the SRS), or the signal for occupying a channel is mapped to a PRB, which is not occupied by the SRS, of the last OFDM symbol, as described in Way 1 in (1) of the step 3002.

It is assumed that the PUSCH is transmitted in a subframe immediately next to the SRS subframe, and each OFDM symbol of the PUSCH is a complete OFDM symbol.

It is assumed that subframe n is an SRS subframe, the terminal is scheduled to transmit the PUSCH in subframe n and subframe n+1, and the terminal does not transmit the SRS in subframe n. Then, upon receiving a signaling for scheduling the subframe n and subframe n+1 to transmit the PUSCH, the terminal prepares the PUSCH in accordance with Way 1 in (1) of the step 3002 and the prior art, respectively. If the terminal has successfully transmitted the PUSCH in the subframe n, the terminal can continue to transmit the PUSCH in the subframe n+1 without the LBT, as described in (a) of (3) of the step 3003. FIG. 31 is a schematic diagram of a frame structure in Example 1 of the second method according to the present invention.

Example 2

In step 3001, the configuration signaling for the SRS can further contain UE-specific subframe configuration information, and the cycle of the SRS subframe indicated by the UE-specific subframe configuration information is 1 ms.

In the step 3001, whether a predefined signal is to be transmitted on a predefined time-frequency resource within a potential SRS symbol is decided according to the predefined rules or according to the indication carried in the received scheduling signaling, so that the time-frequency resource mapping of the PUSCH/SRS is determined. This will be specifically described below.

In this case, the scheduling and/or configuration signaling is, as a configuration signaling for the SRS, one of or a combination of several of the following:

the scheduling and/or configuration signaling comprises a cell-specific SRS subframe configuration, but does not comprise a UE-specific SRS subframe configuration;

the scheduling and/or configuration signaling comprises a cell-specific SRS subframe configuration and a UE-specific SRS subframe configuration, and the UE-specific SRS subframe configuration is the same as the cell-specific SRS subframe configuration;

the scheduling and/or configuration signaling comprises neither a UE-specific SRS subframe configuration nor a cell-specific SRS subframe configuration;

the scheduling and/or configuration signaling contains SRS subframe configuration information, the configuration information indicating a subframe offset from a predefined subframe as a UE-specific SRS subframe; and the scheduling and/or configuration signaling contains an SRS frequency-domain resource, the SRS frequency-domain resource at least containing transmission comb information which can be cell-specific transmission comb information and/or UE-specific transmission comb information.

Preferably, when the scheduling and/or configuration signaling comprises a cell-specific SRS subframe configuration but does not comprise a UE-specific SRS subframe configuration, the transmitting, by the terminal, the SRS and/or the PUSCH is: determining, by the terminal, a subframe for transmitting the SRS according to a cell-specific SRS subframe;

when the scheduling and/or configuration signaling comprises a cell-specific SRS subframe configuration and a UE-specific SRS subframe configuration and the UE-specific SRS subframe configuration is the same as the cell-specific SRS subframe configuration, the transmitting, by the terminal, the SRS and/or the PUSCH is: determining, by the terminal, a subframe for transmitting the SRS according to a UE-specific SRS subframe;

when the scheduling and/or configuration signaling comprises neither a UE-specific SRS subframe configuration nor a cell-specific SRS subframe configuration, the transmitting, by the terminal, the SRS and/or the PUSCH is: determining, by the terminal, a subframe for transmitting the SRS with the reference to a subframe for which the received configuration signaling is;

when the scheduling and/or configuration signaling contains SRS subframe configuration information and the configuration information indicating a subframe offset from a predefined subframe as a UE-specific SRS subframe, the transmitting, by the terminal, the SRS and/or the PUSCH is: determining, by the terminal, a subframe for transmitting the SRS according to the UE-specific SRS subframe; and when the scheduling and/or configuration signaling contains an SRS frequency-domain resource and the SRS frequency-domain resource at least contains transmission comb information which can be cell-specific transmission comb information and/or UE-specific transmission comb information, the transmitting, by the terminal, the SRS and/or the PUSCH is: determining, by the terminal, a resource for transmitting the SRS according to the cell-specific transmission comb information and/or the UE-specific transmission comb information.

(1) A method for determining a time-frequency resource mapping of an SRS according to predefined rules is as follows.

Way 1: When the PUSCH is transmitted in a same subframe and the subframe is a cell-specific SRS subframe, the subframe can transmit an SRS regardless of whether or not the subframe is a UE-specific SRS subframe. The SRS is located within a predefined potential SRS OFDM symbol, for example, the last OFDM symbol of the subframe. The frequency-domain resource occupied by the SRS can be predefined or configured by the eNB. For the SRS resource configured by the eNB, information can be configured by the high-layer signaling obtained in the step 201 or 3001.

Way 2: When the PUSCH is transmitted in a same subframe, the subframe can transmit an SRS regardless of whether or not the subframe is a cell-specific SRS subframe. The SRS is located within a predefined potential SRS OFDM symbol, for example, the last OFDM symbol of the subframe. The frequency-domain resource occupied by the SRS can be predefined or configured by the eNB. For the SRS resource configured by the eNB, information can be configured by the high-layer signaling obtained in the step 201 and/or 3001.

Way 3: The time-frequency resource mapping of the SRS is determined in accordance with the prior art. In other words, if the subframe is a UE-specific SRS subframe, resource mapping is performed in accordance with the complete potential SRS symbol and according to the indicated SRS resource; or otherwise, the SRS will not be prepared.

(2) A method for determining the time-frequency resource mapping of the SRS according to the indication carried in the received scheduling signaling is as follows.

Way 1: When the PUSCH is transmitted in a same subframe and the subframe is a cell-specific SRS subframe, the subframe can transmit an SRS regardless of whether or not the subframe is a UE-specific SRS subframe. The SRS is located within a predefined potential SRS OFDM symbol, for example, the last OFDM symbol of the subframe. The frequency-domain resource occupied by the SRS can be predefined or configured by the eNB. The SRS resource configured by the eNB can be indicated by the physical layer signaling configuration information obtained in the step 201 and/or step 3001 (for example, a non-cyclic SRS trigger indicates one of a multiple of SRS resources configured by a high layer).

Way 2: When the PUSCH is transmitted in a same subframe, the subframe can transmit an SRS regardless of whether or not the subframe is a cell-specific SRS subframe. The SRS is located within a predefined potential SRS OFDM symbol, for example, the last OFDM symbol of the subframe. The frequency-domain resource occupied by the SRS can be predefined or configured by the eNB. The SRS resource configured by the eNB can be indicated by the physical layer signaling configuration information obtained in the step 3001 (for example, a non-cyclic SRS trigger indicates one of a multiple of SRS resources configured by a high layer).

In step 3003, when the PUSCH has been transmitted prior to the SRS and there is no gap between the PUSCH and the SRS, it is not required to perform LBT. When the PUSCH is not transmitted prior to the SRS, or when there is a gap between the SRS and the previous PUSCH signal, LBT can be performed by the method in Example 2 of Embodiment 1, and whether to transmit the SRS is decided.

To better explain the combinations of the SRS solutions in Embodiment 2 and the PUSCH solutions in Embodiment 2, several examples will be given below, but the present invention is limited to these examples. The present invention supports all methods acquired by any combination of the steps and the implementations described above.

Example 3

It is assumed that the potential SRS OFDM symbol is located at the last OFDM symbol of the SRS subframe. In a cell-specific SRS subframe, the PUSCH can be mapped to first 13 OFDM symbols, the frequency-domain resource is a PUSCH resource scheduled by the eNB (for example, a resource indicated by the UL grant), and the PUSCH can also be mapped to a frequency-domain resource predefined by the last OFDM symbol, for example, a part of frequency-domain resources within the PUSCH PRB scheduled by the eNB. The part of frequency-domain resources is preconfigured by the eNB, or predefined. Preferably, the part of frequency-domain resources is frequency-domain resources in the cell that are not occupied by the SRS. In a UE-specific SRS subframe, the SRS is mapped to the last OFDM symbol and occupies a complete OFDM symbol, and the frequency-domain resource is mapped according to a configured resource.

It is assumed that subframe n is a cell-specific SRS subframe, while subframe n+1 is not a cell-specific SRS subframe. UE1 is scheduled the PUSCH transmission in subframe n and subframe n+1 the subframe n is not a UE-specific SRS subframe for the UE1, and the UE1 does not transmit an SRS. UE1 determines the PUSCH mapping of the subframe n in the Way 1 in (1) of the step 3002, and determines the PUSCH mapping of the subframe n+1 in accordance with the prior art. UE2 is scheduled to transmit the PUSCH in subframe n and subframe n+1 the subframe n is a UE-specific SRS subframe for the UE2, and the UE2 transmits the SRS. UE1 determines the PUSCH mapping and SRS mapping of the subframe n and subframe n+1 in accordance with the prior art.

It is assumed that the UE1/UE2 has accomplished LBT category 1 before subframe n, the UE2 starts to transmit a PUSCH and an SRS in subframe n and transmit a PUSCH in subframe n+1 without performing any CCA, and the UE1 starts to transmit a PUSCH in subframe n and subframe n+1 without performing any CCA. The whole process is shown in FIG. 35. FIG. 35 is a schematic diagram of a frame structure in Example 3 of the second method according to the present invention.

Embodiment 1 and Embodiment 2 of the present invention can be combined, and specific examples will not be given again in the present invention.

FIG. 36 is a structural diagram of a first user equipment according to an embodiment of the present invention, comprising a first receiving module, a first parsing module and a first transmitting module, wherein:

the first receiving module is configured to receive a scheduling and/or configuration signaling transmitted by a transmitting node, wherein the scheduling signaling and/or configuration signaling is used for indicating the uplink physical channel and/or uplink signal;

the first parsing module is configured to decide whether a gap is to be reserved between adjacent uplink signals and/or uplink physical channels; if so, determine a time-frequency resource mapping of the uplink signal and/or the uplink physical channel, so that there is a gap between the uplink signals and/or the uplink physical channels; and the first transmitting module is configured to transmit the uplink signal and/or the uplink physical channel, or quit transmitting the uplink signal and/or the uplink physical channel.

Third Instance

Step 3801: By a terminal, a scheduling signaling transmitted by a transmitting node is received, wherein the scheduling signaling is used for indicating an uplink physical channel and/or uplink signal.

Preferably, the uplink signal is an SRS.

Preferably, the scheduling signaling is an UL grant for scheduling N uplink subframes, and/or contains an LBT-indicated control signaling for the N uplink subframes. The LBT-indicated control signaling for the N uplink subframes can be LBT indication information for LBT indication information of all UEs in a cell or UE-specific LBT indication information. For example, a cell-specific signaling transmitted in a downlink transmission burst indicates that 25 μs LBT is for which uplink subframes or no LBT is performed in which uplink subframes, and Cat-4 LBT is for which uplink subframes.

Preferably, the scheduling signaling indicates whether there is a gap between the N scheduled uplink subframes. For example, it can be indicated that the first symbol (#0) of the $(N1+1)^{th}$ subframe among the N uplink subframes is vacated, and/or the last symbol (#13) of the $(N1)^{th}$ uplink subframe is vacated, or symbols of more uplink subframes are vacated, or there is no gap in all the N uplink subframes.

Preferably, N>1, that is, the scheduling signal can schedule the uplink transmission of a multiple of uplink subframes.

Preferably, the scheduling signaling triggers SRS transmission.

Step 3802: By the terminal, a subframe for transmitting the uplink signal is determined according to the category of LBT or whether there is a gap indicated by the received scheduling signaling.

Preferably, the terminal can determine the category of LBT indicated by the eNB and/or whether there is a gap between the N scheduled uplink subframes, according to the scheduling signaling received in the step 3801.

Preferably, the determining, by the terminal, the subframe for transmitting the SRS according to the category of LBT indicated by the eNB and/or whether there is gap information between the N scheduled uplink subframes can be performed by one or more of the methods for category 1 or category 2.

Category 1:

Preferably, it is assumed that first N1 uplink subframes among the N uplink subframes are continuous, there is a gap between the $(N1+1)^{th}$ subframe and $(N1)^{th}$ subframe, and the gap is indicated by the scheduling signaling. Among the N uplink subframes, there can be no gap or gap between uplink subframes next to the $(N1+1)^{th}$ uplink subframe. Category 1 in this embodiment is merely specific to a case where an SRS is transmitted in an uplink subframe previous to the first gap of the N uplink subframes. The subframe for transmitting the SRS can be determined by one or more of the following methods.

(1) If the first N1 uplink subframes are located within a time window which can adopt the LBT category 1, the $(N1+1)^{th}$ uplink subframe starts to be located within a time window adopting the LBT category 2, and the category of LBT indicated by the eNB is the LBT category 1 and the LBT category 2, respectively, the subframe for transmitting the SRS is the first uplink subframe of the N uplink subframes.

Wherein, N1=N is an implementation of this method. In other words, if there is no gap between the N uplink subframes, the N uplink subframes are located within a time window which can adopt the LBT category 1, and the category of LBT indicated by the eNB is the LBT category 1, the subframe for transmitting the SRS is the first uplink subframe of the N uplink subframes.

Wherein, the LBT category 1 is more radical than the LBT category 2. For example, the LBT category 1 is no LBT or 25-μs LBT, and the LBT category 2 is Cat-4 LBT. In a typical scenario, if the uplink subframe is located within a time window that starts from the eNB occupying a channel by downlink Cat-4 but does not exceeds a maximum occupancy time (MCOT), the eNB can schedule the UE to perform 25-μs LBT; and if the time window is beyond the MCOT, the eNB needs to schedule the UE to perform uplink Cat-4 LBT. Of course, inclusively, the eNB can also schedule the UE to perform uplink Cat-4 LBT if the time window is within the MCOT.

It is to be noted that, if the category of LBT indicated by the eNB is not the LBT category 1 and the LBT category 2, respectively (for example, if the category of LBT indicated by the eNB is the LBT category 2), the SRS subframe shall be determined by the method of (3), (4) or (5).

For example, the eNB transmits a scheduling signal to indicate the UE to transmit an uplink signal from subframe n to subframe n+3, subframes n to n+2 are for 25-μs LBT, and subframe n+3 is for Cat-4 LBT. Meanwhile, if the eNB indicates that the first symbol of the subframe n+3 is vacated and there is no gap at any other position (that is, the subframes n and n+2 are continuous), the subframe for transmitting the SRS is the first uplink subframe of the four uplink subframes, i.e., subframe n.

(2) If the first N1 uplink subframes are located within a time window which can adopt the LBT category 1, the $(N1+1)^{th}$ uplink subframe starts to be located within a time window adopting the LBT category 2, and the category of LBT indicated by an eNB is the LBT category 1 and the LBT category 2, respectively, the subframe for transmitting the SRS is the last subframe containing the potential SRS symbol of the N1 uplink subframes or the last subframe of the N1 uplink subframes. Wherein, the potential SRS symbol is the fourteenth symbol of the subframe. If the $(N1)^{th}$ uplink subframe merely contains 13 symbols, the SRS is transmitted at the last symbol of the $(N1-1)^{th}$ uplink subframe. If the $(N1)^{th}$ uplink subframe contains 14 symbols, the SRS is transmitted at the last symbol of the $(N1)^{th}$ uplink subframe. Or, if the subframe for transmitting the SRS is the last subframe of the N1 uplink subframes, it can be assumed that the eNB ensures that the $(N1)^{th}$ uplink subframe contains 14 symbols.

Wherein, N1=N is an implementation of this method. In other words, if there is no gap between the N uplink subframes, the N uplink subframes are located within a time window which can adopt the LBT category 1, and the category of LBT indicated by the eNB is the LBT category 1, the subframe for transmitting the SRS is the last subframe containing the potential SRS symbol of the N uplink subframes.

Wherein, the LBT category 1 is more radical than the LBT category 2. For example, the LBT category 1 is no LBT or 25-μs LBT, and the LBT category 2 is Cat-4 LBT. For another example, the LBT category 1 is no LBT, and the LBT category 2 is 25-μs LBT or Cat-4 LBT.

It is to be noted that, if the category of LBT indicated by the eNB is not the LBT category 1 and the LBT category 2, respectively (for example, if the category of LBT indicated by the eNB is the LBT category 2), the SRS subframe shall be determined by the method of (3), (4) or (5).

For example, the eNB transmits a scheduling signal to indicate the UE to transmit an uplink signal from subframe n to subframe n+3, subframes n to n+2 are for 25-μs LBT, and subframe n+3 is for Cat-4 LBT. Meanwhile, if the eNB indicates that the first symbol of subframe n+3 is vacated and there is no gap at any other position (that is, subframes n and n+2 are continuous), the subframe for transmitting the SRS is subframe n+2. Or, if the eNB indicates that the first symbol of subframe n+3 is vacated and the last symbol of subframe n+2 is vacated, the subframe for transmitting the SRS is subframe n+1.

(3) If the first N1 uplink subframes are located within a time window which can adopt the LBT category 2, the subframe for transmitting the SRS is the first uplink subframe of the N uplink subframes.

(4) If the first N1 uplink subframes are located within a time window which can adopt the LBT category 2, the subframe for transmitting the SRS is the last subframe containing the potential SRS symbol of the N1 uplink subframes or the last subframe of the N1 uplink subframes. It is to be noted that there is no gap if N1=N. So, the subframe for transmitting the SRS is the last subframe containing the potential SRS symbol of the N uplink subframes or the last subframe of the N uplink subframes.

(5) If the first N1 uplink subframes are located within a time window which can adopt the LBT category 2, the subframe for transmitting the SRS is the last subframe containing the potential SRS symbol of the N uplink subframes or the last subframe of the N1 uplink subframes. It is to be noted that there is no gap if N1=N. In this case, the uplink subframe for transmitting the SRS is also determined in accordance with the way (5).

Wherein, the UE can determine whether the first N1 uplink subframes are located with a time window of the LBT category 1 or the LBT category 2 through the UL grant and/or the contained cell-specific signaling indicative of the category of LBT.

This embodiment can support any one of or a combination of several of the ways (1) to (5), or the ways (1) or (5) can be used alone. Several examples will be listed below, but the present invention is not limited to these examples.

For example, in the combination of (2) and (5), if the first N1 uplink subframes are located within a time window which can adopt 25-μs LBT, and the eNB indicates the 25-μs LBT, the uplink subframe for transmitting the SRS is the last uplink subframe containing the potential SRS symbol of the first N1 uplink subframes; or otherwise, the uplink subframe for transmitting the SRS is the last subframe containing the potential SRS symbol of the N uplink subframes. This is shown in FIGS. 39 and 40.

Or, in the combination of (2) and (4), the uplink subframe for transmitting the SRS is the last subframe containing the potential SRS symbol of the first N1 uplink subframes.

Or, in the combination of (1) and (4), if the first N1 uplink subframes are located within a time window which can adopt 25-μs LBT, and the eNB indicates the 25-μs LBT, the uplink subframe for transmitting the SRS is the first uplink subframe of the N uplink subframes; or otherwise, the subframe for transmitting the SRS is the last subframe containing the potential SRS symbol of the N1 uplink subframes or the last subframe of the N1 uplink subframes.

Or, in the combination of (1) and (5), if the first N1 uplink subframes are located within a time window which can adopt 25-μs LBT, and the eNB indicates the 25-μs LBT, the uplink subframe for transmitting the SRS is the first uplink subframe transmitting the SRS; or otherwise, the uplink subframe for transmitting the SRS is the last subframe containing the potential SRS symbol of the N uplink subframes.

Category 2: The subframe for transmitting the SRS can be determined by one or more of the following methods.

(1) Regardless of whether or not there is a gap between the N uplink subframes, if first N2 uplink subframes are located within a time window of LBT category 1 and the category of LBT indicated by the eNB is the LBT category 1, the subframe for transmitting the SRS is the first uplink subframe of the N uplink subframes.

(2) Regardless of whether or not there is a gap between the N uplink subframes, if first N2 uplink subframes are located within a time window of LBT category 1 and the category of LBT indicated by the eNB is the LBT category 1, the subframe for transmitting the SRS is the last uplink subframe containing the potential SRS symbol or the last subframe of the N2 uplink subframes.

(3) Regardless of whether or not there is a gap between the N uplink subframes, if first N2 uplink subframes are located within a time window of LBT category 2, the subframe for transmitting the SRS is the last subframe containing the potential SRS symbol or the last subframe of the N uplink subframes.

Wherein, the UE can determine whether the first N2 uplink subframes are located with a time window of the LBT category 1 or the LBT category 2 through the UL grant and/or the contained cell-specific signaling indicative of the category of LBT.

This embodiment can support any one of or a combination of several of the ways (1) to (3), or the ways (1) or (3) can be used alone.

For example, the eNB transmits a scheduling signal to indicate the UE to transmit an uplink signal from subframe n to subframe n+3, subframes n to n+2 are for 25-μs LBT, and subframe n+3 is for Cat-4 LBT. Regardless of whether or not there is a gap between the subframes, the UE determines the subframe for transmitting the SRS as subframe n in accordance with (1).

For another example, the eNB transmits a scheduling signal to indicate the UE to transmit an uplink signal from subframe n to subframe n+3, and all the subframes are for Cat-4 LBT. Regardless of whether or not there is a gap between the subframes, the UE determines the subframe for transmitting the SRS as subframe n+3 in accordance with (3).

Step 3803: The terminal attempts to transmit an uplink signal in the subframe.

Preferably, the subframe is the subframe for transmitting the SRS determined in the step 3802.

Preferably, if the terminal fails to pass the LBT in the subframe or before the subframe, the terminal does not transmit the uplink signal and the uplink physical channel.

Preferably, if the terminal has passed the LBT in the subframe or before the subframe, the terminal transmits the uplink signal and the uplink physical channel.

For example, the eNB transmits a scheduling signal to indicate the UE to transmit an uplink signal from subframe n to subframe n+3, subframes n to n+2 are for 25-μs LBT, and subframe n+3 is for Cat-4 LBT; and, the eNB indicates that the first symbol of subframe n+3 is vacated, and there is no gap at any other position, that is, subframes n to n+2 are continuous. If the UE fails to pass the 25-μs CCA detection in subframe n but has passed the 25-μs CCA detection in subframe n+1, the UE can transmit PUSCHs in subframes n+1 to n+2 and transmit a potential SRS symbol in subframe n+2; then, the UE performs CCA detection in subframe n+3; and the UE can transmit a PUSCH in subframe n+3 if the CCA detection is successful. If the UE fails to pass the 25-μs CCA detection in subframes n to n+2, the UE cannot transmit the PUSCH and the SRS. Subsequently, the UE performs CCA detection in subframe n+3, and the UE can transmit a PUSCH in subframe n+3 if the CCA detection is successful.

FIG. 37 is a structural diagram of a second user equipment according to an embodiment of the present invention, comprising a second receiving module, a second parsing module and a second transmitting module, wherein:

the second receiving module is configured to receive a scheduling and/or configuration signaling transmitted by a transmitting node, wherein the scheduling signaling and/or configuration signaling is used for indicating an uplink physical channel and/or uplink signal;

the second parsing module is configured to decide whether a subframe for transmitting an uplink signal is used to transmit an SRS by other terminals, and map a predefined signal onto a predefined time-frequency resource within the uplink signal if the subframe for transmitting the uplink signal is used to transmit an SRS by other terminals; and, the second transmitting module is configured to transmit an uplink physical channel before or after the determination of the uplink signal of the uplink subframe, and transmit the uplink signal and/or the uplink physical channel, or quit transmitting the uplink signal and/or the uplink physical channel.

The specific embodiments described above are used for further describing the objectives, technical solutions and beneficial effects of the present invention. It should be understood that, the forgoing description merely shows specific embodiments of the present application and is not intended to limit the protection scope of the present invention. Any modification, equivalent replacement or improvement made within the spirit and principle of the present invention shall fall into the protection scope of the present invention.

The invention claimed is:

1. A method performed by a terminal in a wireless communication system, the method comprising:
    receiving, from a base station, configuration information on sounding reference signal (SRS) parameters for an SRS transmission;
    receiving, from the base station, a physical layer signaling to trigger the SRS transmission for a licensed-assisted access (LAA) cell, in a subframe n, the physical layer signaling including information on an SRS timing offset value; and
    transmitting, to the base station, the SRS for the LAA cell in a subframe n+k, in case that the k is defined based on the information on the SRS timing offset value.

2. The method of claim 1, wherein the configuration information is transmitted by a higher layer signaling, and
    wherein the physical layer signaling is transmitted by downlink control information (DCI).

3. The method of claim 1,
    wherein the SRS is transmitted, in case that a channel is sensed to be idle by a channel access procedure.

4. The method of claim 1, wherein the SRS parameters further include at least one cell specific resource.

5. A terminal in a wireless communication system, comprising:
    a transceiver; and
    a controller configured to:
        control the transceiver to receive, from a base station, configuration information on sounding reference signal (SRS) parameters for an SRS transmission;
        control the transceiver to receive, from the base station, a physical layer signaling to trigger the SRS transmission for a licensed-assisted access (LAA) cell, in a subframe n, the physical layer signaling including information on an SRS timing offset value;
        control the transceiver to transmit, to the base station, the SRS for the LAA cell in a subframe n+k, in case that the k is defined based on the information on the SRS timing offset value.

6. The terminal of claim 5,
    wherein the configuration information is transmitted by a higher layer signaling, and
    wherein the physical layer signaling is transmitted by downlink control information (DCI).

7. The terminal of claim 5,
    wherein the SRS is transmitted, in case that a channel is sensed to be idle by a channel access procedure.

8. The terminal of claim 5, wherein the SRS parameters further include at least one cell specific SRS resource.

* * * * *